(12) United States Patent
Williams

(10) Patent No.: US 12,509,711 B1
(45) Date of Patent: Dec. 30, 2025

(54) SYSTEM AND PROCESS FOR IN VIVO MANUFACTURING NANOSTRUCTURE-ENDED DOUBLE-STRANDED COVALENTLY-CLOSED LINEAR DNA, THE RESULTING MOLECULES AND THEIR USES

(71) Applicants: Martin Williams, Buenos Aires (AR); SYTE.bio Inc., Chestnut Hill, MA (US)

(72) Inventor: Martin Williams, Buenos Aires (AR)

(73) Assignees: Martin Williams, Beunos Aires (AR); SYSTE.BIO INC., Chestnut Hill, MA (US)

( * ) Notice: Subject to any disclaimer, the term of this patent is extended or adjusted under 35 U.S.C. 154(b) by 0 days.

(21) Appl. No.: 18/799,681

(22) Filed: Aug. 9, 2024

(51) Int. Cl.
| | |
|---|---|
| *C12P 19/34* | (2006.01) |
| *C12N 9/12* | (2006.01) |
| *C12N 9/22* | (2006.01) |
| *C12N 15/79* | (2006.01) |

(52) U.S. Cl.
CPC ............ *C12P 19/34* (2013.01); *C12N 9/1276* (2013.01); *C12N 9/22* (2013.01); *C12N 15/79* (2013.01); *C12N 2310/20* (2017.05); *C12N 2820/55* (2013.01); *C12N 2830/008* (2013.01); *C12N 2830/50* (2013.01); *C12N 2840/206* (2013.01)

(58) Field of Classification Search
None
See application file for complete search history.

(56) References Cited

U.S. PATENT DOCUMENTS

2023/0128316 A1* 4/2023 Williams ............. C12N 15/907 435/320.1
2023/0235337 A1* 7/2023 Williams ................ C12P 21/02 435/91.4

FOREIGN PATENT DOCUMENTS

WO   WO 2020/168222 A1 *  8/2020 ............. C12N 15/11

OTHER PUBLICATIONS

Slavcev et al., "Optimized produciton of a safe and efficient gene therapeutic vaccine versus HIV via a linear covalently closed DNA minivector" 14(Suppl. 2) BMC Infectious Diseases P74 (Year: 2014).*

Sum et al., "Separation and purificaiton of linear covalently closed deoxyribonucleic acid by Q-anion exchange membrane chromatography" 1339 Journal of Chromatography A 214-218 (Year: 2014).*

* cited by examiner

*Primary Examiner* — Nancy J Leith
(74) *Attorney, Agent, or Firm* — D'Ambrosio & Menon, PLLC; Usha Menon

(57) ABSTRACT

The present invention relates to a novel biological in vivo manufacturing system and a process for generating nano-structure-ended double-stranded covalently-closed linear DNA molecules. These DNA molecules possess the ability to merge the information-storage and function-encoding attributes of nucleic acids with the structural properties and functional capabilities typically found in proteins, such as specific binding and catalysis, in a single nucleic acid-only molecular entity, making them useful for a wide variety of medical applications and industrial implementations.

7 Claims, 11 Drawing Sheets

Specification includes a Sequence Listing.

SYSTEM AND PROCESS FOR IN VIVO MANUFACTURING NANOSTRUCTURE-ENDED DOUBLE-STRANDED COVALENTLY-CLOSED LINEAR DNA, THE RESULTING MOLECULES AND THEIR USES

FIELD OF INVENTION

The present invention generally relates to an engineered DNA technology for the manufacturing of linear DNA molecules, and, in particular, to a system and process for the manufacturing of nanostructure-ended double-stranded covalently-closed linear DNA molecules which can function in a myriad of different medical applications, from gene therapy to immunotherapy, as well as in industrial processes.

INCORPORATION BY REFERENCE

The instant application includes a sequence listing encoded in eXtensible Markup Language (a "xml" file) that is submitted herewith named Sequence_Listing.xml created on Jun. 25, 2025, and is 69,042 bytes in size. This sequence listing is incorporated by reference herein.

BACKGROUND OF THE INVENTION

Nucleic acids are essential biological macromolecules that store genetic information in sequences of four nucleotides, guiding RNA and protein synthesis in cells. While traditionally, nucleic acids are carriers of genetic data and proteins serve structural, signaling, and enzymatic roles, nucleic acids can also perform protein-like functions such as specific binding and catalytic activity. Proteins, despite their functional diversity, face significant stability challenges due to their complex three-dimensional structures, which are highly sensitive to environmental factors. In contrast, nucleic acids can form stable, complex three-dimensional structures, like ribozymes and aptamers, that exhibit protein-like functionalities without the same stability concerns. Combining these nanostructures within a single DNA molecule through a double-stranded linear DNA linker, which may also serve as an expression cassette, offers extensive functional versatility. An innovative in vivo manufacturing system for producing these nanostructure-ended double-stranded covalently closed linear DNA molecules would overcome current production challenges, providing a scalable, cost-effective solution for creating DNA molecules with protein-like functions, beneficial for various industrial and medical applications.

SUMMARY

In one aspect of the present invention, there is provided a nanostructure-ended double-stranded covalently-closed linear DNA molecule in vivo manufacturing system comprising:
- a recombinant cell comprising:
  - a Repressor Protein Module comprising: a First Bacterial Constitutive Promoter, a First Ribosome Binding Site, a First Repressor Protein Coding sequence, a Second Ribosome Binding Site, a Second Repressor Protein Coding sequence, and a First Bacterial Terminator;
  - a Recombinase-Reverse Transcriptase Module comprising: a First Bacterial Inducible Promoter, a Third Ribosome Binding Site, a Recombinase Coding Sequence, a Fourth Ribosome Binding Site, a Reverse Transcriptase Coding Sequence, and a Second Bacterial Terminator; and
  - a Homing Endonuclease Module comprising: a Second Bacterial Inducible Promoter, a Fifth Ribosome Binding Site, a Homing Endonuclease Coding Sequence, and a Third Bacterial Terminator; and
- a Parental Plasmid DNA Platform, housed in the same recombinant cell, comprising:
  - a Retron Module comprising:
    - a Left Retron Unit comprising: a First Parental Bacterial Constitutive Promoter, a msr sequence, a 5'-msd sequence, a Left Sense Stem Recombination Sequence (L-SSR), a Left DNA Nanostructure Sequence (L-DNS) inserted in a First Multiple Cloning Site (MCS 1), a Left Antisense Stem Recombination Sequence (L-ASR), complementary to the L-SSR sequence, a 3'-msd sequence, and a First Parental Bacterial Terminator; and
    - a Right Retron Unit comprising: a Second Parental Bacterial Constitutive Promoter, a msr sequence, a 5'-msd sequence, a Right Sense Stem Recombination Sequence (R-SSR), a Right DNA Nanostructure Sequence (R-DNS) inserted in a Second Multiple Cloning Site (MCS 2), a Right Antisense Stem Recombination Sequence (R-ASR), complementary to the R-SSR sequence, a 3'-msd sequence, and a Second Parental Bacterial Terminator;
  - a Linear Module comprising: a First Acceptor Recombinase Recognition Sequence (A1), a sequence selected from a DNA Spacer and an Expression Cassette inserted in a Third Multiple Cloning Site (MCS 3), and a Second Acceptor Recombinase Recognition Sequence (A2); and
  - a Bacterial Backbone comprising: a Parental Bacterial Origin of Replication, a Parental Selection Marker, and a Parental Homing Endonuclease Recognition Sequence (HRE),
  - wherein the retron units, linear module, and bacterial backbone are contained in at least one Cloned Parental Plasmid DNA.

In another aspect of the invention, there is provided an engineered parental circular covalently closed synthetic plasmid DNA platform usable for manufacturing nanostructure-ended double-stranded covalently-closed linear DNA molecules, comprising:
- a Retron Module comprising:
  - a Left Retron Unit comprising: a First Parental Bacterial Constitutive Promoter, a msr sequence, a 5'-msd sequence, a Left Sense Stem Recombination Sequence (L-SSR), a First Multiple Cloning Site (MCS 1), a Left Antisense Stem Recombination Sequence (L-ASR), complementary to the L-SSR sequence, a 3'-msd sequence, and a First Parental Bacterial Terminator; and
  - a Right Retron Unit comprising: a Second Parental Bacterial Constitutive Promoter, a msr sequence, a 5'-msd sequence, a Right Sense Stem Recombination Sequence (R-SSR), a Second Multiple Cloning Site (MCS 2), a Right Antisense Stem Recombination Sequence (R-ASR), complementary to the R-SSR sequence, a 3'-msd sequence, and a Second Parental Bacterial Terminator;
- a Linear Module comprising: a First Acceptor Recombinase Recognition Sequence (A1), a Third Multiple Cloning Site (MCS 3), and a Second Acceptor Recombinase Recognition Sequence (A2); and a Bacterial Backbone comprising: a Parental Bacterial Origin of Replication, a Parental Selection Marker, and a Parental Homing Endonuclease Recognition Sequence (HRE), wherein the retron units, linear module, and bacterial backbone are contained in at least one Parental Plasmid DNA.

In a further aspect of the invention, there is provided a nanostructure-ended double-stranded covalently-closed linear DNA molecule in vivo manufacturing process comprising the steps of:

1. cloning DNA Nanostructured Sequences (DNS) in multiple cloning sites 1 (MCS1) and 2 (MCS2), and a sequence selected from a DNA spacer and an expression cassette in multiple cloning site 3 (MCS3) of a Parental Plasmid Platform comprising:
   a Retron Module comprising:
      a Left Retron Unit comprising: a First Parental Bacterial Constitutive Promoter, a msr sequence, a 5'-msd sequence, a Left Sense Stem Recombination Sequence (L-SSR), a First Multiple Cloning Site (MCS 1), a Left Antisense Stem Recombination Sequence (L-ASR), complementary to the L-SSR sequence, a 3'-msd sequence, and a First Parental Bacterial Terminator; and
      a Right Retron Unit comprising: a Second Parental Bacterial Constitutive Promoter, a msr sequence, a 5'-msd sequence, a Right Sense Stem Recombination Sequence (R-SSR), a Second Multiple Cloning Site (MCS 2), a Right Antisense Stem Recombination Sequence (R-ASR), complementary to the R-SSR sequence, a 3'-msd sequence, and a Second Parental Bacterial Terminator;
   a Linear Module comprising: a First Acceptor Recombinase Recognition Sequence (A1), a Third Multiple Cloning Site (MCS 3), and a Second Acceptor Recombinase Recognition Sequence (A2); and
   a Bacterial Backbone comprising: a Parental Bacterial Origin of Replication, a Parental Selection Marker, and a Parental Homing Endonuclease Recognition Sequence (HRE);

2. transforming a recombinant cell with the parental plasmid of step 1, in order to allow the constitutive promoters to transcribe Retron RNA Molecules from the retron units, the recombinant cell comprising:
   a Repressor Protein Module comprising: a First Helper Bacterial Constitutive Promoter, a First Helper Ribosome Binding Site, a First Repressor Protein Coding sequence, a Second Helper Ribosome Binding Site, a Second Repressor Protein Coding sequence, and a First Helper Bacterial Terminator;
   a Recombinase-Reverse Transcriptase Module comprising: a First Helper Bacterial Inducible Promoter, a Third Helper Ribosome Binding Site, a Recombinase Coding Sequence, a Fourth Helper Ribosome Binding Site, a Reverse Transcriptase Coding Sequence, and a Second Helper Bacterial Terminator; and
   a Homing Endonuclease Module comprising: a Second Helper Bacterial Inducible Promoter, a Fifth Helper Ribosome Binding Site, a Homing Endonuclease Coding Sequence, and a Third Helper Bacterial Terminator;

3. promoting the expression of the Reverse Transcriptase encoded in the recombinant cell by the addition of a suitable inducer, in order for the Reverse Transcriptase to recognize the Retron RNA Molecule templates and generate Left and Right Retron Donor DNA Molecules, comprising a Nanostructured DNA End and a Donor Sequence (D), wherein the Nanostructured DNA is formed by the DNS sequence and the Donor Sequence is formed by the annealing of ASR and SSR;

4. promoting the expression of the Recombinase protein encoded in the recombinant cell by the addition of a suitable inducer, in order for the Recombinase to produce a recombination of the Left and Right Retron Donor DNA Molecules with the First and Second Acceptor Recombination Sequences contained in the Linear Module of the parental plasmid platform so as to generate Nanostructure-Ended Double-Stranded Covalently-Closed Linear DNA molecules;

5. promoting the expression of the Homing Endonuclease encoded in the recombinant cell by addition of a suitable inducer in order to produce double-strand cuts in the Homing Endonuclease Recognition Sequences on residual DNA molecules; and 6. isolating the resulting nanostructure-ended double-stranded linear covalently closed DNA molecules from the recombinant cell.

An additional aspect of the invention provides a nanostructure-ended double-stranded covalently-closed linear DNA molecule obtainable by the aforementioned process.

Step 1: Cloning of the Parental Plasmid
  DNA nanostructured sequences (DNS) cloned into multiple cloning sites MCS1 and MCS2; spacer or expression cassette cloned into MCS3 of the parental plasmid (no SEQ IDs).

Step 2: Manufacturing System Formation Via Parental Plasmid Transformation
  Transformation of the recombinant cell with the cloned parental plasmid platform establishes the complete in vivo manufacturing system.
  Constitutive promoters on the parental plasmid initiate transcription of retron units to generate retron RNA molecules.

Step 3: Retron Donor DNA Synthesis by Induced Reverse Transcriptase
  Upon addition of inducer, reverse transcriptase expressed in the recombinant cell recognizes retron RNA templates and synthesizes left and right retron donor DNA molecules, each comprising a nanostructured DNA end (DNS-derived) and a donor sequence (formed by annealing ASR and SSR).

The schematic diagram identifies the following donor sequences:
D1: left donor sequence (SEQ ID NO: 5)
D2: right donor sequence (SEQ ID NO: 4).
Step 4: Recombinase-Mediated Recombination
Upon induction, recombinase catalyzes site-specific recombination of retron donor DNA molecules (D1: SEQ ID NO: 5; D2: SEQ ID NO: 4) with acceptor recombinase recognition sequences A1 (SEQ ID NO: 30) and A2 (SEQ ID NO: 31) within the linear module of the parental plasmid, generating the nanostructure-ended double-stranded covalently-closed linear DNA molecule. This resulting molecule displays terminal recombination junctions:
Left-end D1-A1 recombination product: SEQ ID NO: 32
Right-end D2-A2 recombination product: SEQ ID NO: 33.
Step 5: Homing Endonuclease Cleavage
Cleavage of homing endonuclease recognition sites for nuclease-directed digestion of the residual DNA resulting molecules of the process. In this step:
Residual parental DNA, left-end: SEQ ID NO: 34
Residual ssDNA loop, left-end: SEQ ID NO: 35
Residual parental DNA, right-end: SEQ ID NO: 36
Residual ssDNA loop, right-end: SEQ ID NO: 37.

Figure 3:
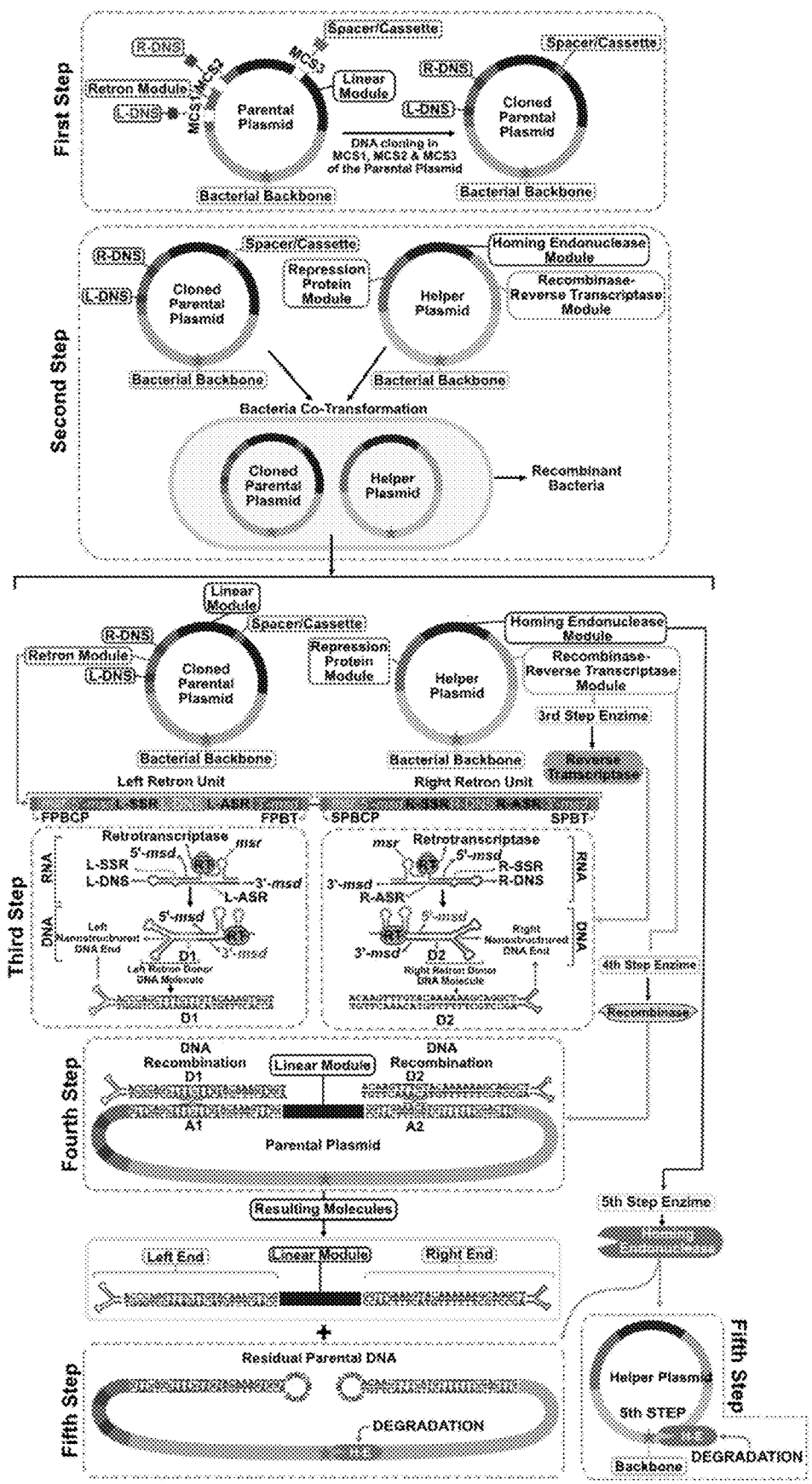
FIG. 3 schematically depicts the complete in vivo process for manufacturing nanostructure-ended double-stranded covalently-closed linear DNA molecules in accordance with an embodiment of the present invention. The nucleotide elements shown in this figure are identified by sequence identifiers as follows.
Figure 4:
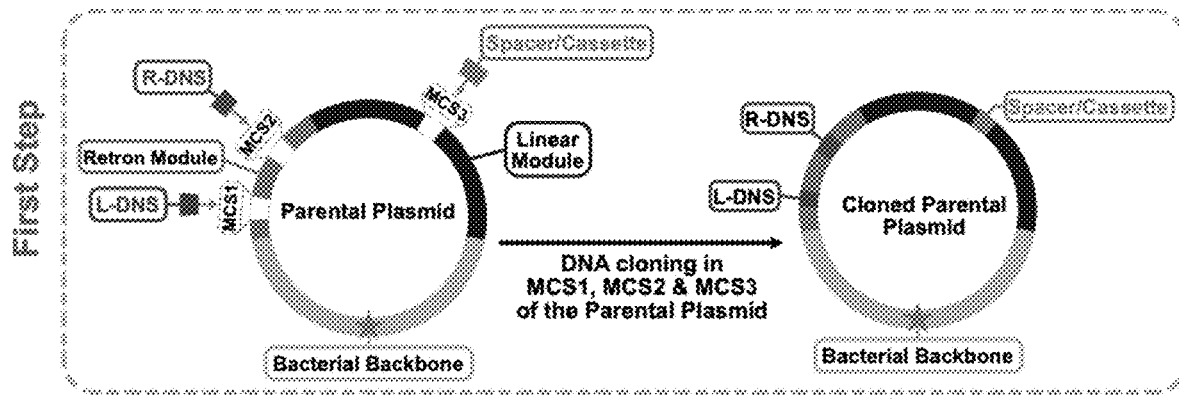

FIG. 4 shows in greater detail the First Step of the in vivo process for manufacturing nanostructure-ended double-stranded covalently-closed linear DNA molecules illustrated in FIG. 3.

Figure 5:
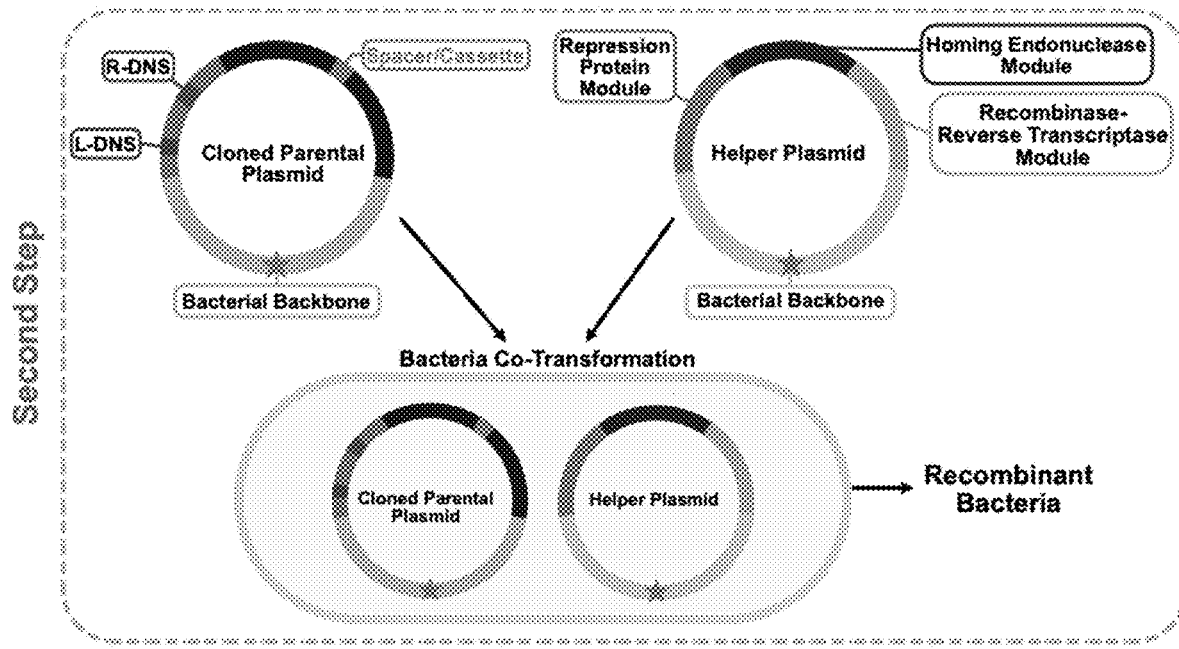

FIG. 5 shows in greater detail the Second Step of the in vivo process for manufacturing nanostructure-ended double-stranded covalently-closed linear DNA molecules illustrated in FIG. 3.

Figure 6:
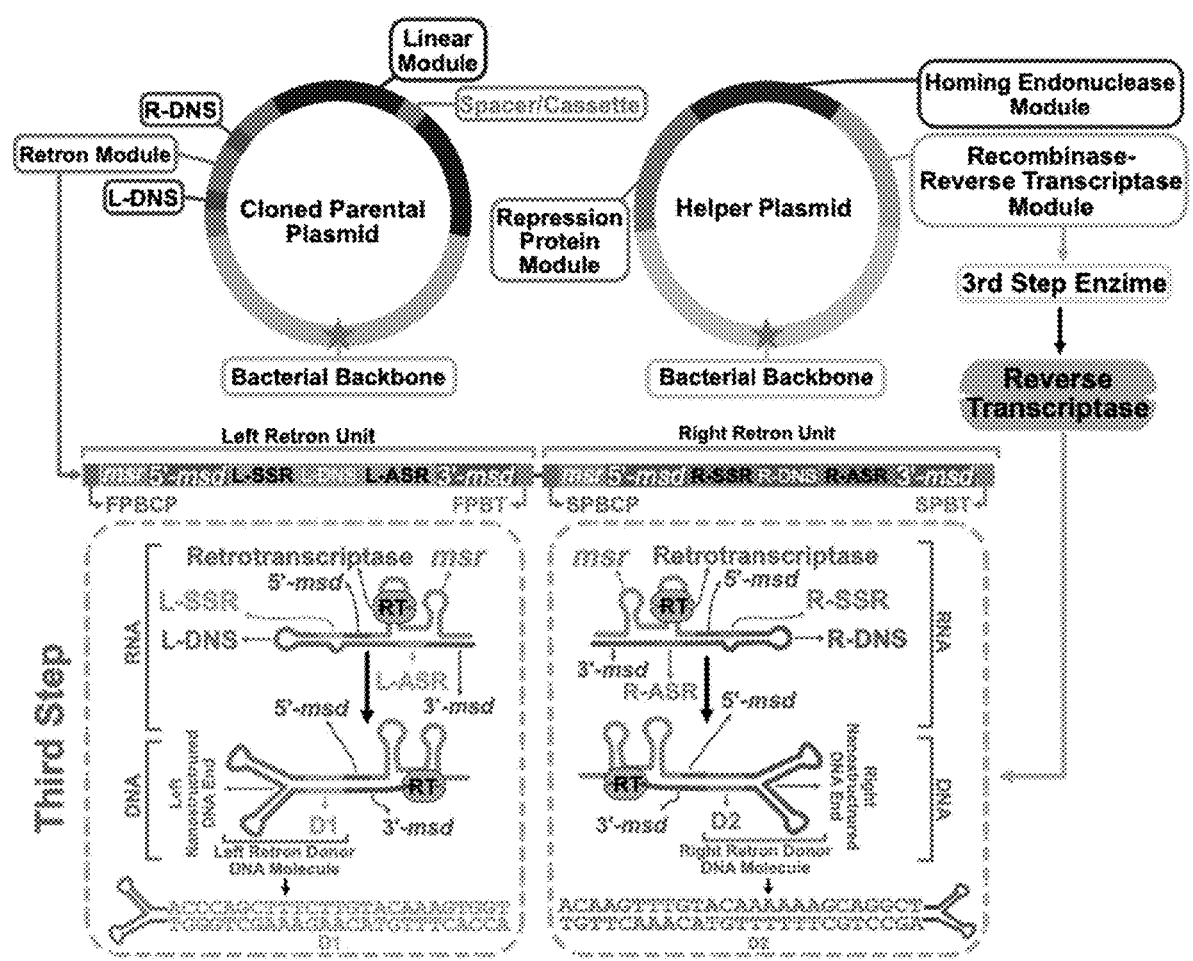

FIG. 6 shows in greater detail the Third Step of the in vivo process for manufacturing nanostructure-ended double-stranded covalently-closed linear DNA molecules illustrated in FIG. 3, highlighting the donor sequences:
D1 (SEQ ID NO: 5)
D2 (SEQ ID NO: 4).

Figure 7:
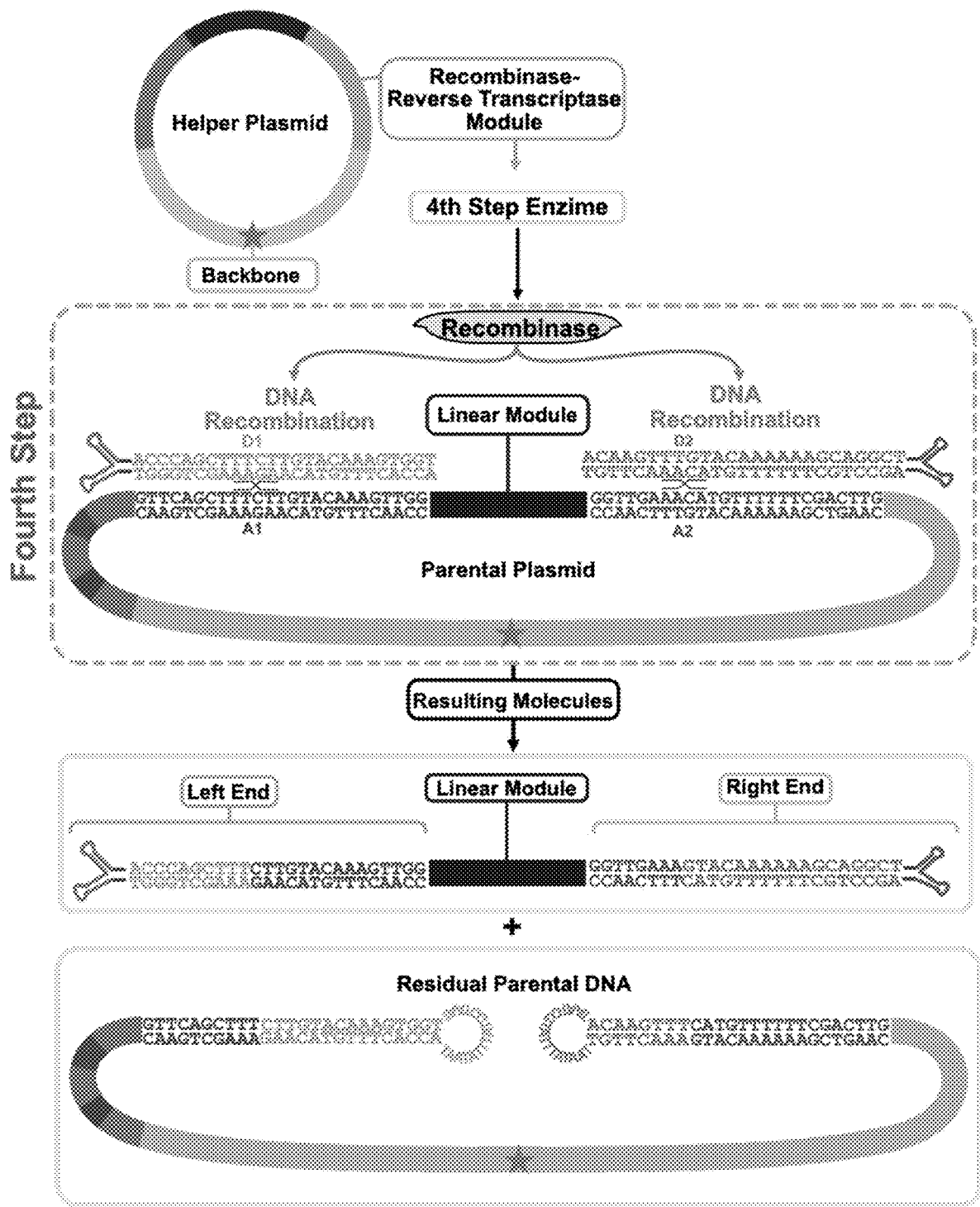

FIG. 7 shows in greater detail the Fourth Step of the in vivo process for manufacturing nanostructure-ended double-stranded covalently-closed linear DNA molecules illustrated in FIG. 3, depicting:
D1: left donor sequence (SEQ ID NO: 5) and D2: right donor sequence (SEQ ID NO: 4)
A1: first acceptor recombinase recognition sequence (SEQ ID NO: 30)
A2: second acceptor recombinase recognition sequence (SEQ ID NO: 31)
Left-end D1-A1 recombination product: SEQ ID NO: 32
Right-end D2-A2 recombination product: SEQ ID NO: 33
Residual parental DNA, left-end: SEQ ID NO: 34
Residual ssDNA loop, left-end: SEQ ID NO: 35
Residual parental DNA, right-end: SEQ ID NO: 36
Residual ssDNA loop, right-end: SEQ ID NO: 37.

Figure 8:
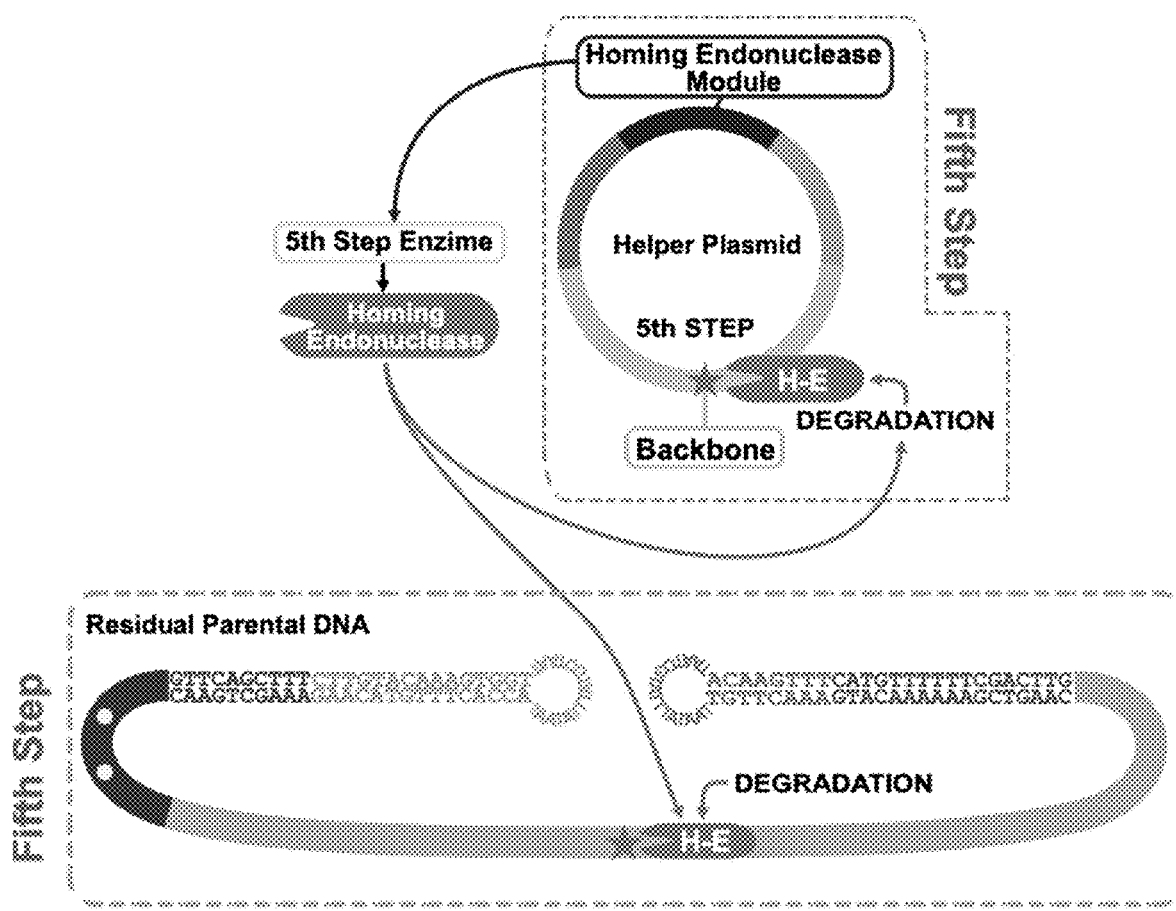

FIG. 8 shows in greater detail the Fifth Step of the in vivo process for manufacturing nanostructure-ended double-stranded covalently-closed linear DNA molecules illustrated in FIG. 3, highlighting residual parental fragments:
Residual parental DNA, left-end: SEQ ID NO: 34
Residual ssDNA loop, left-end: SEQ ID NO: 35
Residual parental DNA, right-end: SEQ ID NO: 36
Residual ssDNA loop, right-end: SEQ ID NO: 37.

Figure 9:
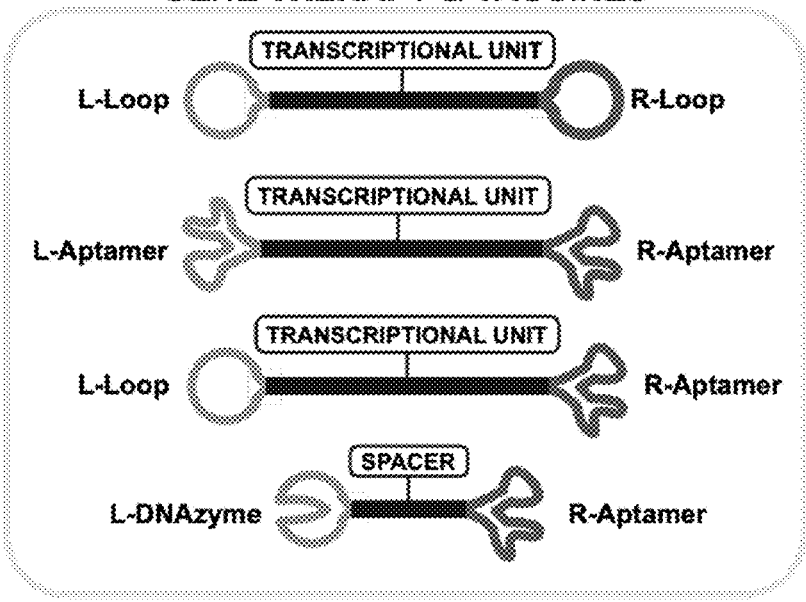
Figure 9:
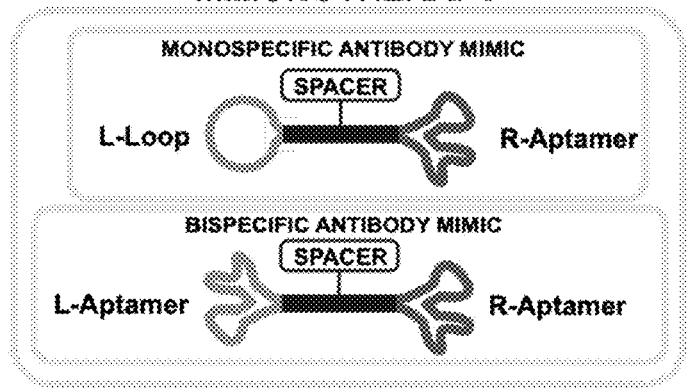
Figure 9:
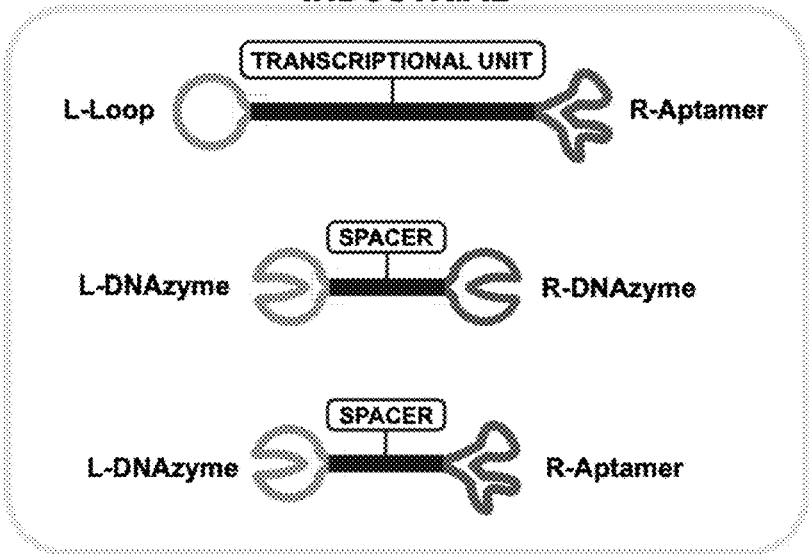

FIG. 9 depicts examples of different possible configurations that the Nanostructure-Ended Double-Stranded Covalently-Closed Linear DNA molecule can adopt, according to some embodiments of the present invention, to suit several functional needs.

Figure 10:
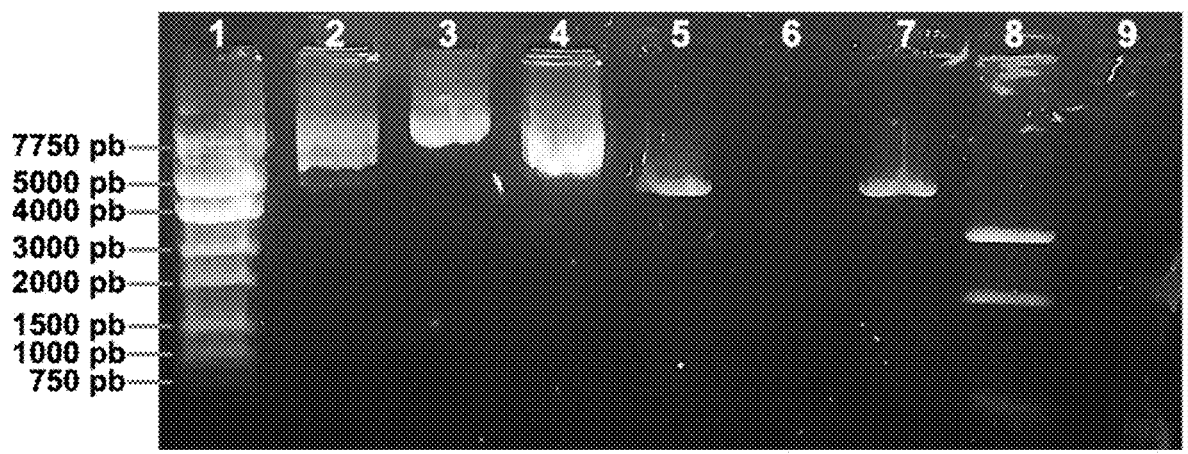

FIG. 10 represents the results of an agarose gel electrophoresis analysis of the DNA Parental and Helper plasmids, and of the resulting Nanostructure-Ended Double-Stranded Covalently-Closed Linear DNA molecules obtained after carrying out the manufacturing process described in the present application.

Figure 11:
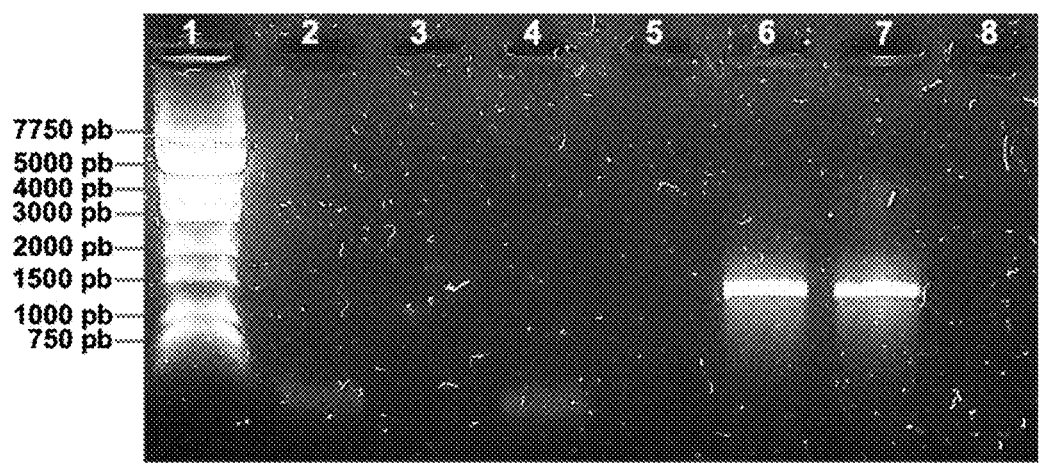
Figure 11:
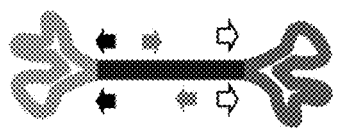
Figure 11:

FIG. 11 represents the results of an agarose gel electrophoresis analysis of the PCR products obtained using a specific set of primers designed to demonstrate the topology of the Nanostructure-Ended Double-Stranded Covalently-Closed Linear DNA molecules. In this figure, arrows indicate PCR primers:
Black arrows: forward primer (SEQ ID NO: 38) and reverse primer (SEQ ID NO: 39)
White arrows: forward primer (SEQ ID NO: 40) and reverse primer (SEQ ID NO: 41)
Grey arrows: forward primer (SEQ ID NO: 42) and reverse primer (SEQ ID NO: 43).

Figure 12:
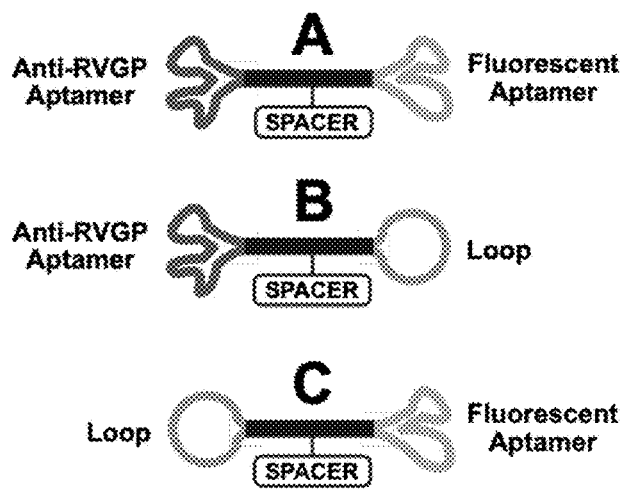

FIG. 12 shows a representation of three different nanostructure-ended double-stranded covalently-closed linear DNA molecules assayed for the fluorescent staining of cells expressing a specific protein on their surface.

Figure 13:
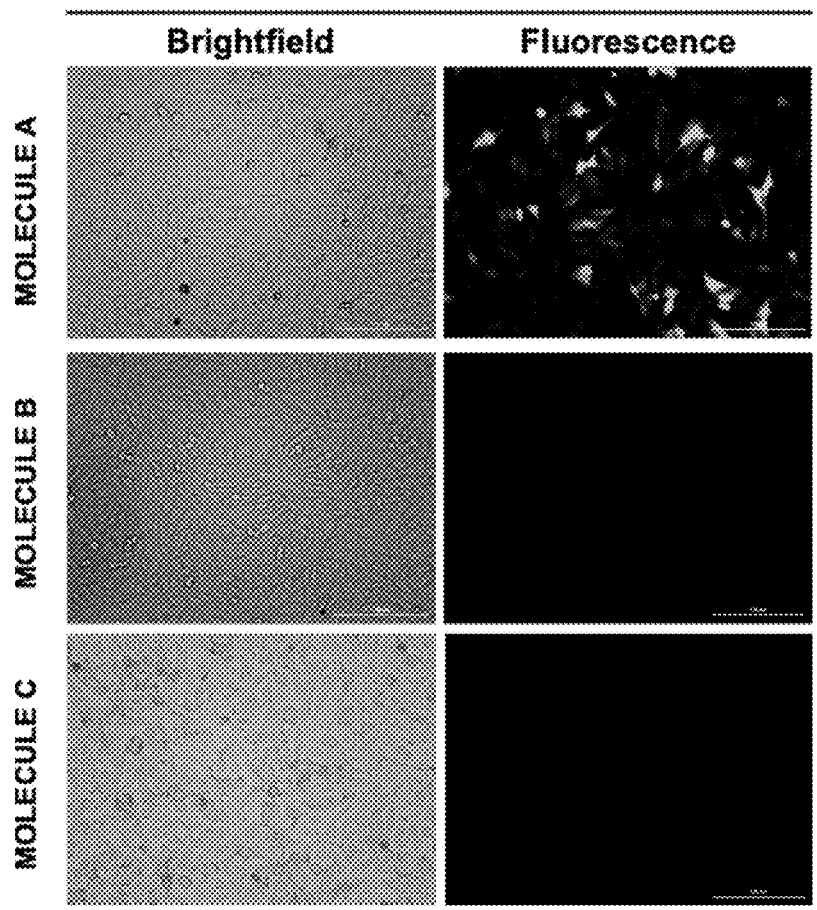

FIG. 13 shows the results of the application of nanostructure-ended double-stranded covalently-closed linear DNA molecules of FIG. 10 on HEK-293 cells expressing the RVGP from rabies virus.

Figure 14:
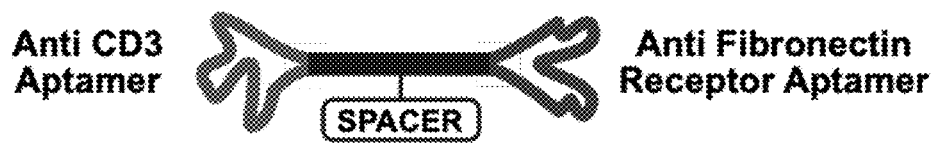

FIG. 14 is a schematic depiction of the bi-specific nanostructure-ended double-stranded covalently-closed linear DNA molecule designed for a cell-to-cell binding proof-of-concept assay.

Figure 15:
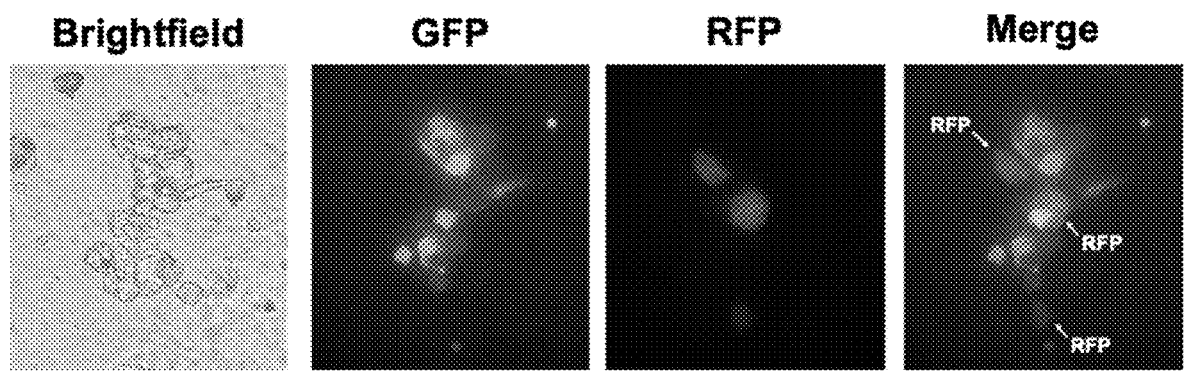

FIG. 15 shows the cell-to-cell linkage results using the bi-specific nanostructure-ended double-stranded covalently-closed linear DNA molecule of FIG. 12.

Figure 16:
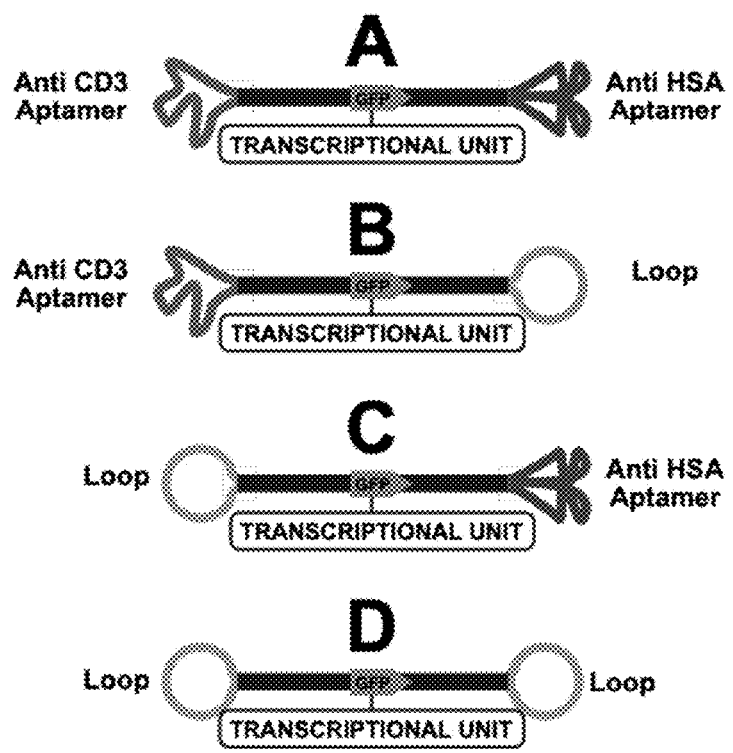

FIG. 16 depicts the four different nanostructure-ended double-stranded covalently-closed linear DNA molecules used in a transfection-expression assay.

Figure 17:
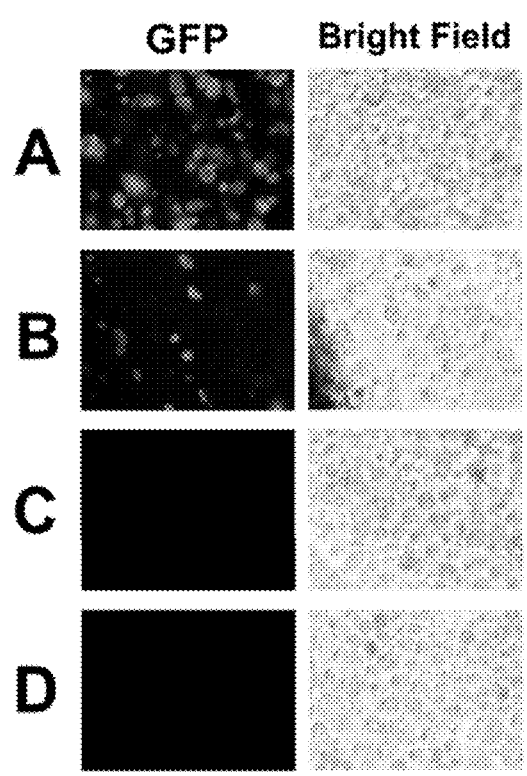

FIG. 17 shows the results of a nanostructure-ended double-stranded covalently-closed linear DNA molecule-mediated gene therapy proof-of-concept assay.

DETAILED DESCRIPTION OF THE INVENTION

The general operating characteristics and advantages of the present invention will now be described in greater detail in this section in connection with the preferred embodiments, which should be considered as exemplary only and not limiting of the present invention.

I. Manufacturing System

The present invention provides, in a first aspect, a novel in vivo system for manufacturing nanostructure-ended double-stranded covalently-closed linear DNA molecules. These resulting DNA molecules bear three distinct regions: Left End, Linear Module, and Right End, each of them being customizable to meet different needs according to all the possible applications.

In particular, a nanostructure-ended double-stranded covalently-closed linear DNA molecule in vivo manufacturing system is provided, wherein such system comprises:
a recombinant cell; and
a Parental Plasmid DNA platform housed in the same recombinant cell.

1. Parental Plasmid Platform

The Parental Plasmid Platform provides the physical sequences that will serve as raw material for the assembly of the nanostructure-ended double-stranded covalently-closed linear DNA molecules, namely the two (i.e., "Left" and "Right") nanostructured ends, and the linear DNA module (double-stranded linear DNA linker), which links both nanostructured ends together, and that can additionally function as a genetic expression unit.

Specifically, the Parental Plasmid Platform comprises a Retron Module, a Linear Module, and a Bacterial Backbone. Said modules are contained in at least one Parental Plasmid.

Figure 1:
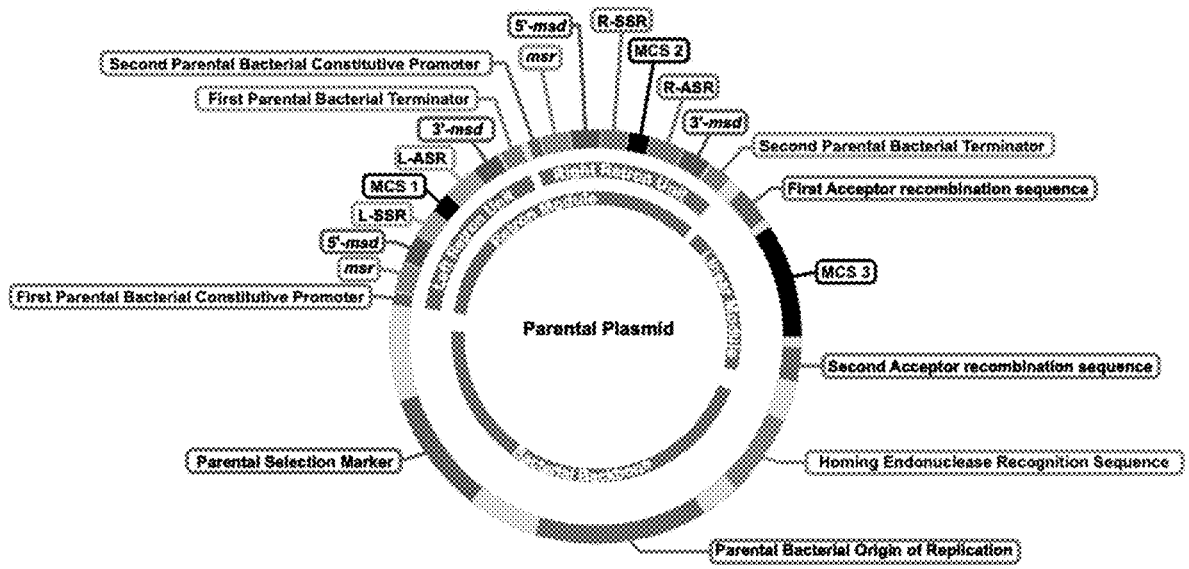
FIG. 1 is a schematic representation of a parental plasmid DNA before cloning the sequences of interest in the multiple cloning sites MCS 1-3, being this parental plasmid a component of the system for in vivo manufacturing nanostructure-ended double-stranded covalently-closed linear DNA, according to one aspect of the present invention.

Preferably, as shown in FIG. 1, the Parental Plasmid Platform comprises a single Parental Plasmid comprising a Retron Module, a Linear Module, and a Bacterial Backbone.

In other embodiments, the Retron Module may be contained in a Parental Plasmid different from the Parental Plasmid containing the Linear Module, the Parental Plasmid Platform thus comprising a plurality of Parental Plasmids.

Both nanostructured ends are generated by the retron module, which will be described in greater detail below.

a. Retron Module

Retrons, which are genetic elements found in various bacterial species, can synthesize single-stranded DNA molecules from an RNA template.

Retrons integrate two essential components: a reverse transcriptase enzyme (RT) and a non-coding RNA molecule known as the "retron RNA." These are transcribed from a specific retron locus within the bacterial genome. The resulting RNA molecule possesses a unique sequence, composed of two main regions, called msr and msd (for multi-copy single-stranded RNA and DNA, respectively). Msr sequence adopts a typical three-dimensional structure conformation which makes the retron RNA a proper substrate for the reverse transcriptase. The reverse transcriptase encoded by the retron gene then uses the retron RNA msd region as a template for the production of a complementary DNA strand. The resulting single-stranded DNA molecule containing the template sequence is referred to as "retron DNA".

The retron module of the present invention comprises a Left Retron Unit and a Right Retron Unit.

In turn, the Left Retron Unit comprises the following elements operably linked in the following order: a First parental Bacterial Constitutive Promoter, an msr sequence, a 5' msd, a Left Sense Stem Recombination Sequence (L-SSR), a First Multiple Cloning Site (MCS 1), a Left Antisense Stem Recombination Sequence (L-ASR) complementary to the L-SSR sequence, a 3' msd, and a First Parental Bacterial Terminator.

On the other hand, the Right Retron Unit comprises the following elements operably linked in the following order: a Second Parental Bacterial Constitutive Promoter, an msr sequence, a 5' msd, a Right Sense Stem Recombination Sequence (R-SSR), a Second Multiple Cloning Site (MCS 2), a Right Antisense Stem Recombination Sequence (R-ASR) complementary to the R-SSR sequence, a 3' msd, and a Second Parental Bacterial Terminator.

In some embodiments, the msr sequences present in the Retron Module of the Parental Plasmid Platform are selected from the group consisting of bacterial retron sequences such as, but not limited to, Ec1 (*E. coli*) bacterial retron sequence, Ec143 bacterial retron sequence, Ec42 bacterial retron sequence, Ec6 bacterial retron sequence, and Ec93 (*E. coli*) bacterial retron sequence, Ent4 (*Enterobacter cloacae*) bacterial retron sequence, Lpo2 (*Listeria monocytogenes*) bacterial retron sequence, Sal (*Staphylococcus aureus*) bacterial retron sequence, s1 (*Shigella sonnei*) bacterial retron sequence, Rc1 bacterial retron sequence, Rc2 and Rc3 (*Ralstonia solanacearum*) bacterial retron sequence, Ry1, Ry2 and Ry3 (*Rhizobium etli*) bacterial retron sequences, Ty1 (*Yersinia pestis*) bacterial retron sequence, Ty2 (*Yersinia pseudotuberculosis*) bacterial retron sequence, Ty3 (*Yersinia enterocolitica*) bacterial retron sequence, and Ty4 (*Yersinia ruckeri*) bacterial retron sequence.

In a preferred embodiment, the msr sequence is that of the Ec86 bacterial retron.

The naturally occurring msd sequence, which may be, but is not limited to, some of the examples mentioned for the msr sequence, is subjected to specific modifications to fulfill the intended purposes. These modifications comprise precise alterations in the nucleotide sequence, which confer improved functionality, stability, and specific interaction capabilities tailored to the target use.

The ability to generate single-stranded DNA molecules in vivo through the use of retrons is valuable for many applications in biotechnology. By engineering the msd sequence, retrons can be programmed to generate single-stranded DNA of a desired sequence and architecture.

The composition of the modified msd sequence is variable among different retrons, giving each retron a specific function, according to its adaptive value. This region can thus be adjusted to carry sequences of interest, such as aptamers, DNA-zymes, etc.

i. Multiple Cloning Sites

The First and Second Multiple Cloning Sites (MCS 1 and MCS 2) are each cloned with a DNA Nanostructure Sequence (DNS) before generating the manufacturing system of the present invention.

In some embodiments, the DNA Nanostructure Sequences (DNS) can be selected from the group of sequences consisting of, but not limited to, aptamers, DNAzymes, DNA cages, DNA Nanomachines. DNA Logic Gates, DNA Walkers, DNA Immune Modulators, DNA Origami Structures, G-Quadruplexes-containing sequences, i-Motifs, DNA Nanostructures for Imaging, DNA Tweezers, DNA Nanocontainers, DNA Antennas, DNA Hydrogels, and DNA Brushes.

DNAzymes (Deoxyribozymes)

DNAzymes are DNA molecules that have enzymatic activity. They can catalyze a variety of chemical reactions, including RNA cleavage, RNA ligation, covalent modifications of amino acid side chains, tyrosine-azido adenylation, phosphorylation and dephosphorylation, covalent modification of phosphorylated amino acid chains, amide and ester hydrolysis, copper-mediated azide-alkyne cycloaddition, Diels-Alder addition, glycosylation, porphyrin metalation, thymine-dimer repair, DNA depurination, DNA phosphorylation, DNA capping, DNA cleavage and ligation, all of which can be harnessed for different applications. For instance, some DNAzymes are designed to target and cleave the mRNA of disease-associated genes, effectively inhibiting their expression.

DNA Aptamers

DNA-based aptamers are single stranded deoxyribonucleic acid molecules having intrinsically complex secondary structure that confers them with the capability of binding to tspecific targets, including proteins, small molecules, or even cells, with high specificity and high affinity, through molecular interactions not involving the classic Watson-Crick base pairing. Through these interactions, aptameric DNA molecules are also capable of modulating their physiological activity and/or physicochemical properties. These aptamers can be de novo designed by an in vitro selection process from pools of random sequence oligonucleotides, called Systematic Evolution of Ligands by EXponential enrichment (SELEX). Several aptamers have been generated with specific binding capabilities against over 100 proteins, including growth factors, transcription factors, enzymes, immunoglobulins, and receptors. Typically, an aptamer is approximately 10-15 kDa (30-45 nucleotides) in size, binds to its target with subnanomolar affinity, and can distinguish between closely related targets, such as two proteins from the same family. Several studies show that aptamer-protein interactions are of the same nature, specificity and affinity as antibody-antigen or enzyme-ligand interactions (v.g., hydrogen bonding, electrostatic complementarity, hydrophobic contacts, steric exclusion, etc.).

Aptamers and aptamer-functionalized molecules have been used extensively for targeted therapeutics and molecular diagnostics, and have a high number of desirable characteristics such as high specificity and affinity, biological efficacy, and excellent pharmacokinetic properties. In addition, they also offer specific competitive advantages over antibodies and other protein-based biologics because its manufacture process is substantially fast and cost-effective, they are smaller, non-toxic, non-immunogenic, easily scalable, rapidly modifiable, and chemically robust. These DNA aptamers can be engineered to regain activity following exposure to factors such as heat, extreme pH values and denaturants, and can be stored for extended periods (more than 1 year) at room temperature as freeze-dried powders. Moreover, the nature of nucleic acid molecules provides additional regulatory functions; they can be modulated for desired therapy and drug delivery applications using the complementary oligo-antidote strategy. The spontaneous heteroduplex formation by hybridization of an aptamer to a cognate complementary DNA strand can abolish the interaction of the aptamer with its target, therefore, reversing its biological activity. Recently, there have been certain therapeutic advances through the development of DNA and RNA aptamers that can be functionalized with drugs or delivery vehicles to specifically target cell surface receptors, improving the specificity of the recognition and efficacy of internalization of therapeutic agents by the target cell.

The three-dimensional structure of DNA-based aptamers, can be stabilized by canonical and noncanonical intracatenary base pairing, G-quadruplexes, pseudo knots and i-motifs. The spatial structure of a DNA-Based Aptamer is simpler than those of antibodies, so it can be easily assembled and renatured. Target binding proceeds through the formation of noncovalent interactions: electrostatic, H-bonding, and hydrophobic between an aptamer and its ligand.

As chemical compounds, DNA aptamers have demonstrated little or no toxicity or immunogenicity. In chronic dosing in rats or woodchucks with high levels of aptamer (10 mg/kg daily for 90 days), no toxicity was observed by any clinical, cellular, or biochemical measure. While the efficacy of monoclonal antibody administration can be severely limited by the immune response elicited against the antibodies themselves (anti-antibodies), it is extremely difficult to raise antibodies against aptamers. This is most likely because aptamers—or their fragments—cannot be presented by T-cells via MHC molecules, and the immune response is generally trained not to recognize nucleic acid fragments.

Although antibodies can be made to recognize small molecules, the process for their manufacturing is cumbersome, and implies crosslinking of the small molecule to a wider molecular carrier allowing the establishment of additional interactions between the antibody and the small molecule-carrier complex.

Aptamers, on the other hand, can be easily designed to target small organic and inorganic substances, including metabolites, and can be consistently produced at low costs using automated oligomer synthesis methods.

DNA-Based Aptamers can thus be chemically synthesized and consequently be readily scaled as needed to meet large scale production demands. Whereas difficulties in scaling production are currently limiting the availability of some biologics and the capital cost of a large-scale protein production plant is quite considerable, a single large-scale oligonucleotide synthesizer can produce up to 100 kg of nucleic acids per year and requires a relatively modest initial investment. The current cost of goods for aptamer synthesis at the kilogram scale is estimated at $500/g, comparable to that for milligrams of highly optimized antibodies. Continuing improvements in process development are expected to lower the cost of oligomer manufacturing goods to <$100/g in five years.

According to state-of-the-art processes, original aptamers are generated by an entirely in vitro process, called SELEX. This process allows for the rapid generation of initial leads, including therapeutic leads. In vitro selection allows the specificity and affinity of the aptamer to be tightly controlled and continuously adjusted, enabling the generation of leads, including leads against both toxic and non-immunogenic targets.

DNA Nanomachines

DNA Nanomachines are DNA structures that can undergo controlled molecular movements in response to specific stimuli. These nanomachines can be used for various applications, such as targeted drug delivery, where the nanomachine delivers the drug payload only when it encounters a specific physicochemical trigger.

DNA Logic Gates

DNA can be used to create logic gates, similar to those used in computers, which carry out a specific action (such as releasing a drug) based on a set of input signals. For example, a DNA logic gate could be designed to release a drug only when it encounters two specific biomarkers, reducing off-target effects.

DNA Walkers

DNA Walkers are DNA structures that can move along a surface or another DNA molecule. They have potential applications in nanotechnology and material science, including molecular assembly and the transport of molecules.

Immune Modulators

DNA molecules, especially those with unmethylated CpG motifs, can modulate the immune response in mammals. Regarding this, synthetic DNA sequences with CpG motifs are used as adjuvants in vaccines to enhance the immune response.

DNA Origami Structures

DNA can be manipulated into a variety of complex three-dimensional shapes using a technique called DNA origami. These structures have potential applications in many fields, from nanotechnology to medicine. Some of these DNA molecules fold into shapes that favor cell internalization, and thus may act as a delivery adjuvant for other molecules, or the DNA itself.

Triplex DNA

Triplex DNA is a structure where a third strand of DNA binds to a DNA duplex. It can be used for gene regulation and has potential therapeutic applications, such as targeted gene modification or inhibition.

G-Quadruplexes

G-Quadruplexes are four-stranded DNA structures that can be formed by guanine-rich sequences. These structural motifs are found naturally in the genome and have been associated with gene regulation and genomic stability. They are also being explored as potential targets for therapeutic intervention, particularly in cancer.

i-Motifs i-Motifs are four-stranded DNA structures that can be formed by cytosine-rich sequences. Like G-quadruplexes, they have been associated with gene regulation and are being investigated as potential therapeutic targets.

DNA Nanostructures for Imaging

DNA structures can be used to improve imaging techniques. For example, gold nanoparticles can be attached to certain DNA structures and used to enhance contrast in electron microscopy. Other applications may include imaging with Magnetic resonance imaging (MRI) or Positron emission tomography (PET) scans.

DNA Tweezers

DNA Tweezers are DNA structures that can undergo controlled conformational changes in response to specific stimuli, similar to the opening and closing of tweezers. They could be used as biosensors or to control the activity of other molecules.

DNA Nanocontainers

DNA Nanocontainers are DNA structures that can encapsulate other molecules. They can be used for targeted drug delivery or to protect sensitive molecules from degradation.

DNA Antennas

DNA Antennas are DNA structures that can capture and transfer light energy. They could be used in solar cells or other light-harvesting applications.

DNA Hydrogels

DNA Hydrogels are networks of DNA strands that form a gel-like material. They can be used for controlled drug release, tissue engineering, or as scaffolds for cell culture.

DNA Brushes

DNA Brushes are DNA structures that extend out from a surface, like bristles on a brush. They can be used for bio-detection or to control the properties of surfaces.

DNA as a Scaffold for Protein Structure Determination

DNA can be used to spatially arrange proteins in a precise manner, aiding in the determination of protein structures using methods such as X-ray crystallography.

In some possible embodiments, the DNA Nanostructure Sequence (DNS) of one or both retron units is a simple unstructured single-stranded DNA loop with no a priori physical or physiological function.

According to some embodiments, the L-DNS and R-DNS are aptamers selected from, but not limited to, the group of known aptamers binding to specific protein and non-protein targets, such as Mucin1 aptamer, VEGF aptamer, Thrombin aptamer, Prostate-specific antigen (PSA) aptamer, Tumor necrosis factor alpha (TNF-α) aptamer, ATP aptamer, Dopamine aptamer, Lipopolysaccharide (LPS) aptamer, Ochratoxin A aptamer, and Mercury ion (Hg2+) aptamer, Fluorophore-binding aptamers, Drug-binding aptamers, and combinations thereof.

According to other embodiments of the present invention, the DNA Nanostructure Sequence (DNS) of both retron units is the Apta-SYTE Glucagon Receptor (GR) aptamer sequence (SEQ ID NO 29).

In yet other embodiments, the L-DNS and R-DNS are DNAzymes selected from the group of known DNAzymes such as, but not limited to, 10-23 DNAzyme (cleaves HIV RNA), 8-17 DNAzyme (cleaves Hepatitis C virus (HCV) RNA), E7 DNAzyme (cleaves Human papillomavirus (HPV) 16 E7 mRNA), Thrombin DNAzyme (Cleaves thrombin RNA, and VEGF DNAzyme (cleaves the Vascular Endothelial Growth Factor (VEGF) mRNA).

In some embodiments, the DNA Nanostructure Sequence (DNS) of both retron units can be different sequences.

In preferred embodiments, the DNA Nanostructure Sequence (DNS) of both retron units are flanked by specific restriction enzyme recognition sequences so any sequence of interest can be interchanged.

ii. Parental Plasmid Promoters

In some embodiments, the Parental Plasmid Bacterial Constitutive Promoters are $E.$ $coli$ σ70 promoters selected from the group consisting of, but not limited to, P(Bla) constitutive promoter, P(Cat) constitutive promoter, P(Kat) constitutive promoter, reverse lambda cI-regulated promoter, pBAD reverse constitutive promoter, lacQ constitutive promoter, GlnRS constitutive promoter, Trp operon constitutive promoter, tac constitutive promoter, PRNA1 promoter, Lambda Phage constitutive promoter, rrnB P1 constitutive promoter, Pspc constitutive promoter, J23119 constitutive promoter, and LacIq constitutive promoter, and combinations thereof.

In a preferred embodiment, the Parental Plasmid Bacterial Constitutive Promoters are the J23119 constitutive promoters.

b. Linear Module

The Linear Module comprises a Multiple Cloning Site (MCS) flanked by a First Acceptor Recombinase Recognition Sequence (A1) and a Second Acceptor Recombinase Recognition Sequence (A2).

i. Acceptor Recombinase Recognition Sequences

In preferred embodiments, the First Acceptor Recombinase Recognition Sequence (A1) is AttP2. In even more preferred embodiments, the Recombinase Recognition Sequence is SEQ ID NO. 7.

In preferred embodiments, the Second Acceptor Recombinase Recognition Sequence (A2) is AttP1. In even more preferred embodiments, the Recombinase Recognition Sequence is SEQ ID NO. 6.

ii. Third Multiple Cloning Site (MCS 3)

The linear DNA module of the Parental Plasmid Platform bears a Third Multiple Cloning Site (MCS 3), which is cloned with a sequence selected from a DNA spacer and an expression cassette before constituting the manufacturing system of the present invention.

When cloned with at least one expression cassette, it makes the generated nanostructure-ended double-stranded covalently-closed linear DNA molecules capable of gene expression. Alternatively, when cloned with a DNA spacer, said non expressing DNA sequence would serve merely as a physical linker between both retron-derived DNA ends.

According to some embodiments of the present invention, the Linear Module has an expression cassette, inserted in the multiple cloning site, comprising the following elements operably linked in the following order:

an Eukaryotic Enhancer;
an Eukaryotic Promoter;
an Eukaryotic Coding Sequence (CDS); and
an Eukaryotic Terminator/Polyadenylation Signal.

Eukaryotic Enhancer

In some embodiments, the Eukaryotic Enhancer is selected from the group consisting of, but not limited to, Cytomegalovirus Enhancer, SV40 Virus Enhancer, Chicken β-Globin Enhancer, and Interferon β Enhancer.

In preferred embodiments, the Eukaryotic Enhancer is the Cytomegalovirus enhancer.

In other preferred embodiments, the Eukaryotic Enhancer is the SV40 Enhancer.

Eukaryotic Promoter

The Eukaryotic Promoter Sequence of the linear Module is selected, in some embodiments, from the group consisting of, but not limited to, RNA polymerase II constitutive mammalian promoters, such as the human cytomegalovirus (CMV) immediate-early enhancer and promoter (pCMV), the early promoter of the simian virus 40 (pSV40), the polyubiquitin gene promoter (pUBC), the hybrid construct of the cytomegalovirus (CMV) enhancer fused to the chicken beta-actin promoter (pCAGG), the human elongation factor-1 alpha promoter (pEF1A), the human phosphoglycerate kinase 1 promoter (pGK), inducible promoters constituted by the minimal CMV promoter and different response elements such as bacterial operators (e.g., lac repressor, tetracycline repressor) and other DNA binding sequences where artificial transcription factors can be associated, and RNA polymerase III promoters such as the H1 RNA promoter (pH1), the U6 promoter, and the 7SK promoter.

In some embodiments, the sequence of the Eukaryotic Enhancer and/or Promoter is SEQ ID NO 12.

Eukaryotic Transcription Terminator Sequences

In some embodiments of the present invention, the transcription terminator sequence is selected from the group consisting of, but not limited to, human α-globin polyadenylation signal sequence, human β-globin polyadenylation signal sequence, rabbit α-globin polyadenylation signal sequence, rabbit β-globin polyadenylation signal sequence, mouse k-light chain polyadenylation signal sequence, chicken ovalbumin polyadenylation signal sequence, SV40 polyadenylation signal sequence (SV40 pA) such as SEQ ID NO 14, Bovine Growth Hormone polyadenylation signal sequence (BGH pA), Herpes Simplex Virus thymidine kinase polyadenylation signal sequence (HSV TK pA), Cytomegalovirus early enhancer/promoter polyadenylation signal sequence (CMV pA), woodchuck hepatitis virus post-transcriptional regulatory element (WPRE), and a small polyT stretch (5-6) for RNA pol III promoters.

Eukaryotic Origins of Replication

In some embodiments, the Linear Module may further comprise one or more Eukaryotic Origins of Replication.

Said eukaryotic origins of replication may be selected from the group consisting of, but not limited to, *Homo sapiens* LOC107198088 Origin of Replication, *Homo sapiens* LOC107133510 Origin of Replication, SV40 Origin of replication, Epstein Barr Origin of replication, Bovine Papilloma Virus Origin of replication, and combinations thereof.

In some embodiments, the expression cassette of the present invention further comprises at least one of:
a 5' Untranslated Region;
a 3' Untranslated Region;
an IRES (Internal Ribosome Entry Site); and
a MIRES (m6A induced ribosome engagement sites).

Eukaryotic Untranslated Regions

In some embodiments, the sequence of the 5' and 3' Eukaryotic Untranslated Regions (UTRs) are selected from the group consisting of, but not limited to, 5' and 3' UTRs from any known-in-the-art eukaryotic mRNA, riboswitches, riboregulators, zip-code structures, localization structures, RNA-binding protein recognition sequences, IRES, MIRES, temperature-sensitive regulators, regulatory structures, RNA-stabilizing elements, RNA-destabilizing elements, translational modulators, etc.

IRES (Internal Ribosome Entry Sites)

Internal Ribosome Entry Sites (IRES) are natural or artificial RNA sequences typically present in the 5' untranslated region of mRNAs that undergo intracatenary folding to render a three-dimensional structure that resembles that of eukaryotic factors involved in the initiation of translation. Hence, IRES make certain posttranscriptional modifications of the mRNA (such as capping) and said initiation factors superfluous, allowing the mRNA to enter directly into a translationally active state. When placed between different open reading frames in an mRNA, IRES can be used to achieve polycistronic translation in eukaryotes to render several proteins from a single mRNA molecule. Some IRES can even enhance translation of a downstream coding sequence.

In some embodiments, the IRES element is derived from a DNA sequence from an organism including, but not limited to, an animal, a plant, a fungus, a bacterium, a virus, an alga, and a protozoan.

In some embodiments, viral IRES are sequences at least partially derived from a virus including, but not limited to, encephalomyocarditis virus (ECMV) IRES, Coxsackievirus B3 (CVB3) IRES, Taura Syndrome Virus (TSV) IRES, *Triatoma* Virus (TV) IRES, Human mastadenovirus C (HAdV-C) IRES, Human adenovirus 5 (HAdV5) IRES, Human adenovirus 7 (HAdV7) IRES, Human mastadenovirus B (HAdV-B) IRES, Hepatitis GB virus B (HGBV-B) IRES, HPV31 IRES, Human Poliovirus 3 (HPV-3) IRES, Human papillomavirus type 11 (HPV11) IRES, Human immunodeficiency virus 1 (HIV 1) IRES, Human immunodeficiency virus 2 (HIV-2) IRES, Simian T-lymphotropic virus 1 (STLVs-1) IRES, Human Parvovirus B19 (HPB19) IRES, Human betaherpesvirus 6B (HHV-6B) IRES, Human alphaherpesvirus 3 (HHV-3) IRES, Human papillomavirus type 41 (HPV41) IRES, Human papillomavirus type 6b (HPV6b) IRES, Alphapapillomavirus 7 IRES, Friend murine leukemia virus IRES, Heilovirus (ThV) IRES, Rous sarcoma virus (RSV) IRES, Human mastadenovirus F (HAdv-F) IRES, Human papillomavirus type 4 (HPV4) IRES, Human papillomavirus type 63 (PHV63) IRES, Human mastadenovirus A IRES, Feline immunodeficiency virus (FIV) IRES, Human T-lymphotropic virus 2 (HTLV-2) IRES, Jaagsiekte sheep retrovirus (JSRV) IRES, Spleen focus-forming virus (SFFV) IRES, Mouse mammary tumor virus (MMTV) IRES, Murine osteosarcoma virus (MOV) IRES, Ovine lentivirus (OLV/OvLV) IRES, Squirrel monkey retrovirus (SMRV) IRES, Human papillomavirus type 16 (HPV16) IRES, Human papillomavirus type 5 (HPV5) IRES, Human polyomavirus 1 IRES, Rabies lyssavirus IRES, Simian immunodeficiency virus (SIV) IRES, Human papillomavirus type 10 (HPV10) IRES, Human papillomavirus type 26 (HPV26) IRES, Human papillomavirus type 32 (HPV32) IRES, Human papillomavirus type 34 (HPV34) IRES, Marburg margurgvirus IRES, Enterovirus A IRES, Rhinovirus A IRES, Human betaherpesvirus 6A (HHV-6A) IRES, *Macaca* mulatta polyomavirus 1 IRES, Snakehead retrovirus (SnRV) IRES, Bovine foamy virus (BFV) IRES, *Drosophila* C virus (DCV) IRES, Hendra henipavirus (HeV) IRES, Aichi virus 1 (AiV-1) IRES, Influenza B virus (IBV) IRES, Zaire ebolavirus (ZEBOV) IRES IRES, Human coronavirus 229E (HCoV-229E) IRES, Nipah henipavirus (NiV) IRES, Human respirovirus 1 (HPIV-1) IRES, Modoc virus (MODV) IRES, Sudan ebolavirus IRES, Human parvovirus 4 G1 IRES, Rotavirus C IRES, Human gammaherpesvirus 4 (Epstein-Barr virus) IRES, or eukaryotic IRES derived from *Homo sapiens, Aplysia californica, Canis lupus familiaris, Drosophila melanogaster, Gallus gallus, Mus pahari, Mus*

*musculus, Saccharomyces cerevisiae, Zea mays, Rattus norvegicus, Ovis aries*, and combinations thereof.

In some embodiments, eukaryotic IRES are sequences at least partially derived from mRNAs from different species including, but not limited to, *Homo sapiens* IRES, *Aplysia californica* IRES, *Canis lupus familiaris* IRES, *Drosophila melanogaster* IRES, *Gallus gallus* IRES, *Mus pahari* IRES, *Mus musculus* IRES, *Saccharomyces cerevisiae* IRES, *Zea mays* IRES, *Rattus norvegicus* IRES, and *Ovis aries* IRES.

m6A Induced Ribosome Engagement Sites (MIRES)

trM6-methyladenosine (m6A) is a reversible epitranscriptomic modification found in several eukaryotic mRNAs, and when present in the 5' untranslated region (5'UTR), even a single m6A, it promotes cap-independent translation. These sites are called m6A induced ribosome engagement sites (MIRES).

MIRES stimulate selective mRNA translation in stress conditions by a mechanism that involves the direct binding of the initiation factor eIF3. Cellular methylation of selected adenine bases on mRNAs is promoted by one or multiple DRACH (D=Guanine or Adenine or Uracil, R=Guanine or Adenine, H=Adenine or Cytosine or Thymine) consensus motifs.

Additionally, the cellular m6A writing/reading machinery allows nucleic acids to be marked as self or endogenous. When m6A DRACH motifs are incorporated into coding DNA sequences, RIG-1 mediated immunogenicity is decreased by 10,000-fold, compared to mutated m6A DRACH motifs. Thus, when designing the Nanostructure-Ended Double-Stranded Covalently-Closed Linear DNA molecules, it is beneficial to make use of an m6A-dependent translation process to avoid unwanted immune responses against foreign nucleic acid sequences.

When placed between different open reading frames in an mRNA, MIRES can be used to achieve polycistronic translation in eukaryotes to render several proteins from a single mRNA molecule. Some MIRES can even enhance translation of a downstream coding sequence.

In an embodiment of the present invention, the sequence of the expression cassette is SEQ ID NO 11.

In some embodiments, the Linear Module may further comprises at least one of:

a Scaffold Matrix Attachment Region (S/MAR); and
a DNA Nuclear Targeting Sequence (DNTS).

Scaffold Matrix Attachment Region

In a preferred embodiment, the nuclear scaffold matrix-association sequence (S/MAR) is selected from the group consisting of human b-interferon gene-derived S/MAR, human immunoglobulin heavy chain-derived S/MAR, human apolipoprotein B-derived S/MAR, chicken lysozyme-derived S/MAR, other vertebrate-derived S/MAR, SV40T mutated sequence, β-Globin Replicator sequence, Epstein-Barr virus (EBV) elements oriP, and EBNA1.

According to some embodiments, the nuclear scaffold matrix-association sequence (S/MAR) is SEQ ID NO 15.

DNA Nuclear Targeting Sequences

In some embodiment, the DNA nuclear targeting sequence is selected from the group consisting of SV40 enhancer DNA nuclear targeting sequence, NF-kB DNA nuclear targeting sequence, GRE DNA nuclear targeting sequence, smooth muscle-specific DNA nuclear targeting sequence, smooth muscle γ-actin (SMGA) promoter DNA nuclear targeting sequence, Sox2 regulatory region 2 (SRR2) DNA nuclear targeting sequence, Karyopherin (importin) β1, isoform 1 (Kpnβ1) DNA nuclear targeting sequence, RanBP7/importin 7 (Ipo7) DNA nuclear targeting sequence, RAN DNA nuclear targeting sequence, Ran binding protein 1 (RanBP1) DNA nuclear targeting sequence, Ran binding protein 3 (RanBP3) DNA nuclear targeting sequence, SYTE-DNTS1 DNA nuclear targeting sequence, and combinations thereof.

In a preferred embodiment, the DNA nuclear targeting sequence is the SV40 enhancer DNA nuclear targeting sequence. Preferably, the sequence of the SV40 enhancer is SEQ ID NO 16.

According to other embodiments of the present invention, the Linear Module has a Spacer Sequence (non expressing DNA sequence) inserted in the multiple cloning site.

In some embodiments, the multiple cloning site (MCS) sequences comprise one or more contiguous restriction endonuclease recognition sequences which facilitate the insertion of exogenous DNA fragments into the parental plasmid. Sites for known-in-the-art restriction endonucleases within the MCS may include, but are not limited to, EcoRI, XbaI, BamHI, XhoI, HindIII, EcoRV, PstI, KpnI, StuI, SalI, NcoI, NdeI, NotI, SpeI and BsteI.

In one specific embodiment of the present invention, the sequence of the Parental Plasmid Platform is SEQ ID NO 1.

2. Recombinant Cell

The recombinant cell provides all the regulatory functions needed for the generation of the final product, namely the nanostructure-ended double-stranded covalently-closed linear DNA molecules. These functions are: constitutive expression of two suitable protein repressors (e.g.: LacI and AraC) needed for: 1) Inducible expression of the reverse transcriptase (RT) along with the recombinase that catalyzes the fusion between the retrons and the linear DNA module, and 2) inducible expression of an endonuclease which promotes degradation of residual parental DNA after the generation of the nanostructure-ended double-stranded covalently-closed linear DNA molecules. Inducible expression of the Retrotranscriptase and Recombinase is catalyzed by addition of a suitable inducer (such as isopropyl-thiogalactoside—IPTG—in the case of LacI repressor) to the culture medium, while induction of the endonuclease is catalyzed by addition of another suitable inducer (such as L-Arabinose in the case of AraC repressor) to the culture medium. The endonuclease activity will degrade the residual DNA sequences of the nanostructure-ended double-stranded covalently-closed linear DNA molecules manufacturing process, derived from both the recombinant cell and the Parental Plasmid Platform, thus rendering the cells ready for nanostructure-ended double-stranded covalently-closed linear DNA molecules isolation and purification, as the sole small DNA molecules present in the bacteria.

Specifically, the recombinant cell of the present invention comprises a Repression Protein Module, a Recombinase-Reverse Transcriptase Module, and a Homing Endonuclease Module.

Figure 2:
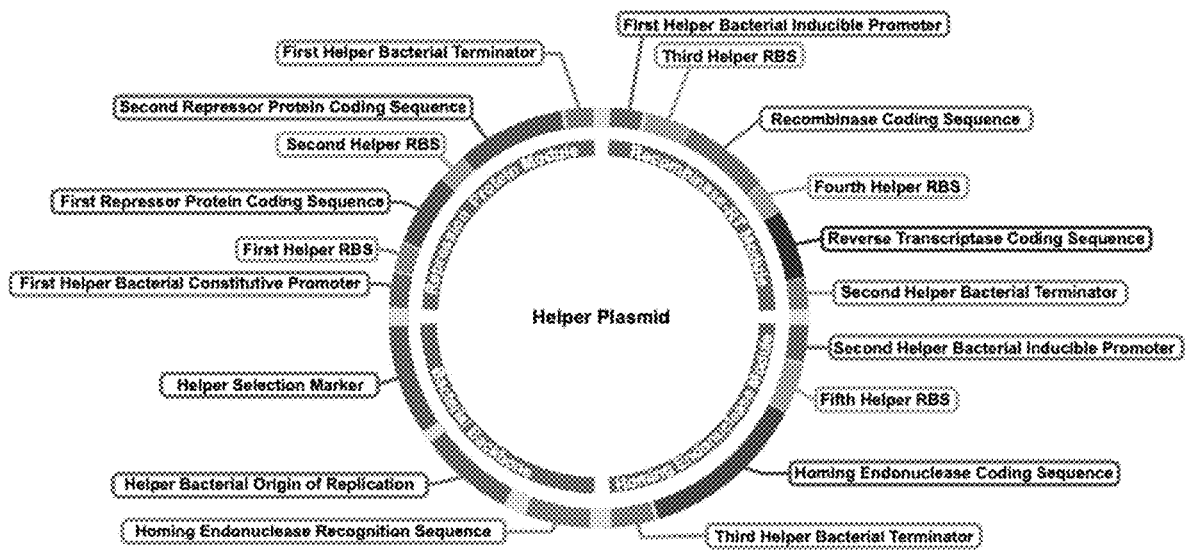
FIG. 2 is a schematic representation of a helper plasmid DNA, another component of the system for in vivo manufacturing nanostructure-ended double-stranded covalently-closed linear DNA, according to one aspect of the present invention.

Preferably, as shown in FIG. 2, the Repressor Protein Module, Recombinase-Reverse Transcriptase Module, and Homing Endonuclease Module are contained in a helper plasmid along with a Bacterial Backbone.

That is, the Repression Protein Module, the Recombinase-Reverse Transcriptase Module and the Homing Endonuclease Module may be part of a Helper Plasmid that is maintained episomally, or may be stably integrated into the bacterial chromosome of the recombinant cell by means of an homologous recombination process. In the latter case, the Homing Endonuclease Recognition Sequence of the Helper Plasmid should be kept outside the recombining fragment, in order to protect the bacterial genome from nuclease-dependent degradation.

a. Repression Protein Module

The Repression Protein Module comprises the following genetic elements operably linked in the following order:
- a First Bacterial Constitutive Promoter,
- a First Ribosome Binding Site,
- a First Repressor Protein Coding sequence,
- a Second Ribosome Binding Site,
- a Second Repressor Protein Coding sequence, and
- a First Bacterial Terminator.

Recombinant Cell Promoters and Repressors

In some embodiments, the expression of the Recombinase, Reverse Transcriptase and Homing Endonuclease in the recombinant cell is under the control of inducible promoters selected from, but not limited to, the group consisting of *Escherichia coli* σ70 promoters such as: L-Arabinose inducible promoter, IPTG-inducible promoter, Lactose-inducible promoter, Glucose-inducible promoter, Tetracycline-inducible promoter, Temperature-inducible promoter, pH-inducible promoter, HSL-inducible promoter, Maltose-inducible promoter, Xylose-inducible promoter, Phosphate-inducible promoter, or where the inducible promoter comprises *E. coli* σ32 promoters such as: Cold-Shock-inducible promoter, or where the inducible promoter comprises *E. coli* σ54 promoters such as glnG transcription enhancer-inducible promoter, and combinations thereof.

In a preferred embodiment, the First Bacterial Inducible Promoter is the Lac operon inducible promoter, and the Second Helper Bacterial Inducible Promoter is the pBAD inducible promoter. Even more preferably, the sequence of the pBAD inducer promoter is SEQ ID NO 26.

In some embodiments, the Bacterial Constitutive Promoter is selected from the group consisting of *E. coli* σ70 promoters such as—but not limited to P(Bla) constitutive promoter, P(Cat) constitutive promoter, P(Kat) constitutive promoter, reverse lambda cI-regulated promoter, pBAD reverse constitutive promoter, lacQ constitutive promoter, GlnRS constitutive promoter, Trp operon constitutive promoter, tac constitutive promoter, PRNA1 promoter, Lambda Phage constitutive promoter, rrnB P1 constitutive promoter, Pspc constitutive promoter, J23119 constitutive promoter, LacIq constitutive promoter, and combinations thereof.

In a preferred embodiment, the Bacterial Constitutive Promoter is the LacIq constitutive promoter. Preferably the sequence of the LacIq constitutive promoter is SEQ ID NO 18.

In some embodiments, Repression Proteins are used to control the expression of other genes. The coding sequences can be selected from the group consisting of, but not limited to, LacI Repressor, AraC Repressor, Trp repressor, LexA Repressor, Mar repressor, RsaL Repressor, Tet repressor, PhoP Repressor, and Omp Repressor.

In other embodiments of this invention, the first repressor protein controlling the expression of the BP recombinase and the Ec86 reverse transcriptase is LacI (SEQ ID NO 19).

In further embodiments, the second repressor protein controlling the expression of I-SceI Endonuclease is AraC (SEQ ID NO 20).

b. Homing Endonuclease Module

The Homing Endonuclease Module comprises the following genetic elements operably linked in the following order:
- a Second Bacterial Inducible Promoter,
- a Fifth Ribosome Binding Site,
- a Homing Endonuclease Coding Sequence, and
- a Third Bacterial Terminator.

Homing Endonuclease Coding Sequence

In some embodiments, the Homing Endonuclease coding sequence encoded in the recombinant cell comprises at least one of the "LAGLIDADG" homing endonuclease family such as I-SceI endonuclease, for example, having a sequence SEQ ID NO 27, F-SceI endonuclease, F-SceII endonuclease, I-AniI endonuclease, I-CeuI endonuclease, I-ChuI endonuclease, I-CpaI endonuclease, I-CpaII endonuclease, I-CreI endonuclease, I-CsmI endonuclease, I-DmoI endonuclease, I-PorI endonuclease, I-ScaI endonuclease, I-SceII endonuclease, I-SceIII endonuclease, I-SceIV endonuclease, PI-SceI endonuclease, PI-PspI endonuclease, PI-TliI endonuclease, F-SuvI, or the endonuclease comprises at least one the GIY-YIG endonuclease family such as F-TevI endonuclease, F-TevII endonuclease, or the endonuclease comprises at least one of the His Cys-His Box endonuclease family such as I-DirI, I-HmuI endonuclease, I-HmuII endonuclease, I-poI endonuclease, I-TevIII, or combinations thereof.

In one specific embodiment of the present invention, the system comprises a Helper Plasmid, within the recombinant cell, having a sequence SEQ ID NO 17.

The nanostructure-ended double-stranded covalently-closed linear DNA molecule in vivo manufacturing system of the present invention thus comprises:
- a recombinant cell comprising:
  - a Repression Protein Module comprising:
    - a First Helper Bacterial Constitutive Promoter,
    - a First Helper Ribosome Binding Site,
    - a First Repressor Protein Coding sequence,
    - a Second Helper Ribosome Binding Site,
    - a Second Repressor Protein Coding sequence, and
    - a First Helper Bacterial Terminator;
  - a Recombinase-Reverse Transcriptase Module comprising:
    - a First Helper Bacterial Inducible Promoter,
    - a Third Helper Ribosome Binding Site,
    - a Recombinase Coding Sequence,
    - a Fourth Helper Ribosome Binding Site,
    - a Reverse Transcriptase Coding Sequence, and
    - a Second Helper Bacterial Terminator; and
  - a Homing Endonuclease Module comprising:
    - a Second Helper Bacterial Inducible Promoter,
    - a Fifth Helper Ribosome Binding Site,
    - a Homing Endonuclease Coding Sequence, and
    - a Third Helper Bacterial Terminator;
- a Parental Plasmid DNA Platform, housed in the same recombinant cell, comprising:
  - a Retron Module comprising:
    - a Left Retron Unit comprising:
      - a First Parental Bacterial Constitutive Promoter,
      - a msr sequence,
      - a 5'-msd sequence,
      - a Left Sense Stem Recombination Sequence (L-SSR),
      - a Left DNA Nanostructure Sequence (L-DNS) inserted in a First
      - Multiple Cloning Site (MCS 1),
      - a Left Antisense Stem Recombination Sequence (L-ASR),
      - complementary to the L-SSR sequence,
      - a 3'-msd sequence, and
      - a First Parental Bacterial Terminator;
    - a Right Retron Unit comprising:
      - a Second Parental Bacterial Constitutive Promoter,
      - a msr sequence,
      - a 5'-msd sequence,
      - a Right Sense Stem Recombination Sequence (R-SSR), a Right DNA Nanostructure Sequence (R-DNS) inserted in a Second
Multiple Cloning Site (MCS 2),
a Right Antisense Stem Recombination Sequence (R-ASR),
complementary to the R-SSR sequence,
a 3'-msd sequence, and
a Second Parental Bacterial Terminator;
a Linear Module comprising:
a First Acceptor Recombinase Recognition Sequence (A1),
a sequence selected from a DNA Spacer and an Expression Cassette inserted in a Third Multiple Cloning Site (MCS 3), and
a Second Acceptor Recombinase Recognition Sequence (A2); and
a Bacterial Backbone comprising:
a Parental Bacterial Origin of Replication,
a Parental Selection Marker, and
a Parental Homing Endonuclease Recognition Sequence (HRE),
wherein the retron units, linear module, and bacterial backbone are contained in at least one Cloned Parental Plasmid DNA.

According to some embodiments, the Repressor Protein Module, Recombinase-Reverse Transcriptase Module, and Homing Endonuclease Module are contained in a Helper Plasmid DNA along with a Bacterial Backbone comprising:
a Helper Bacterial Origin of Replication,
a Helper Selection Marker, and
a Helper Homing Endonuclease Recognition Sequence (HRE).

The genetic elements of the Parental and Helper Plasmids and the recombinant cell are operably linked preferably in the aforementioned order. However, It is contemplated within the scope of the invention that the modules and genetic elements can be arranged in a different order as long as the integral functionality of the system is not affected.

Bacterial Terminators

In some embodiments, the Bacterial Transcriptional Terminator sequences are selected from the group consisting of, but not limited to, bacterial terminators such as Rho-dependent terminators like Tryptophan operon terminator, rRNA operon terminators, NhaA gene terminator and Cold shock (cspA) gene terminator, and/or Rho-independent terminators such as (but not limited to) Phage T7 terminators, such as a T7 terminator with a sequence SEQ ID NO 3 or SEQ ID NO 28, Lambda phage terminator, Riboflavin (rib) operon terminator, Glutamine (gln) operon terminator, rnB T1 terminator, for example, having a sequence SEQ ID NO 25, and Sulfate (suc) operon terminator.

In preferred embodiments, the terminators are the rnB T1 Rho-independent terminator sequence, and the T7Te Rho-independent terminator sequence in the Parental plasmid, and rnB T1 Rho-independent terminator sequence, the T7 Rho-independent terminator sequence, and the Lacq Rho-independent terminator sequence in the Helper plasmid. Even more preferably, the LacIq Rho-independent terminator sequence is the SEQ ID NO 21.

Plasmid Backbone

In some embodiments, the Plasmid Backbone comprises an Origin of Replication, a Selection Marker Cassette and a Homing Endonuclease Recognition Sequence.

In some embodiments, the Origin of Replication can be selected from the group consisting of, but not limited to, pUC19-derived Origin of Replication, pBR322-derived Origin of Replication (having a sequence such as SEQ ID NO 9), p15A-derived Origin of Replication, pSC101-derived Origin of Replication, Pir-R6K Origin of Replication, trfA-oriV Origin of Replication, M13 Phage Origin of Replication, fl Phage Origin of Replication, PhiX174/ProteinA Ori Origin of Replication, and pT181 (RepC) Origin of Replication.

In preferred embodiments, the Parental Bacterial Origin of Replication is pUC19-derived Origin of Replication.

In preferred embodiments, the Helper Bacterial Origin of Replication is pBR322-derived Origin of Replication.

In some embodiments, the Selection Marker can be a Selection Marker Cassette composed of a Bacterial Promoter, an RBS Sequence, an antibiotic resistance coding sequence (or—alternatively—a non-antibiotic resistance coding sequence, and a Bacterial Terminator. The antibiotic resistance coding sequence can be selected from the group consisting of, but not limited to, ampicillin resistance gene, kanamycin resistance gene, gentamicin resistance gene and chloramphenicol resistance gene, while coding sequences for non-antibiotic selection systems are selected from, but not limited to, the group consisting of the following selection systems: dapD complementation, infA complementation, Amino Acid auxotrophy complementation, RNA-OUT or combinations thereof.

In preferred embodiments, the Parental Selection Marker is the Kanamycin Resistance Cassette. Preferably, the sequence of the Kanamycin Resistance Cassette is SEQ ID NO 8.

In preferred embodiments, the Helper Selection Marker is the Chloramphenicol Resistance Cassette.

In a preferred embodiment, the Parental and Helper Homing Endonuclease Recognition Sequence is the I-SceI endonuclease recognition sequence. (SEQ ID NO 10).

Ribosome Binding Sites

In some embodiments, The Ribosome Binding Site can be selected from the group consisting of, but not limited to, Eshcerichia *coli* Shine-Dalgarno DNA Sequences. In preferred embodiments, the RBS sequence is AGGAGGU, located between the −14 and −8 position of the translation start site.

II. Manufacturing Process

In another aspect of this invention, a nanostructure-ended double-stranded linear covalently closed DNA molecule in vivo manufacturing process is provided. This process allows the combination of several possible different right and left DNA nanostructures with a central double-stranded linear DNA linker (which can further function as a gene expression cassette). Said manufacturing process is based on the aforementioned manufacturing system, comprised by the recombinant cell and parental plasmid platform, where the parental plasmid platform is engineered according to the intended application.

In particular, the nanostructure-ended double-stranded linear covalently closed DNA manufacturing process comprises the steps of:

1. cloning DNA Nanostructured Sequences (DNS) in multiple cloning sites MCS1 and MCS2 and a sequence selected from a DNA spacer and an expression cassette in multiple cloning site MCS3 of the Parental Plasmid Platform of the present invention,
2. transforming the recombinant cell with the cloned parental plasmid platform, forming the system of the present invention, in order to allow the constitutive promoters to transcribe Retron RNA Molecules from the retron units,
3. promoting the expression of the Reverse Transcriptase encoded in the recombinant cell by the addition of a suitable inducer, in order for the Reverse Transcriptase to recognize the Retron RNA Molecule templates and generate Left and Right Retron Donor DNA Molecules, comprising a Nanostructured DNA End and a Donor Sequence (D), wherein the Nanostructured DNA is formed by the DNS sequence and the Donor Sequence is formed by the annealing of ASR and SSR, 4. promoting the expression of the Recombinase protein encoded in the recombinant cell by the addition of a suitable inducer, in order for the Recombinase to produce recombination of the Left and Right Retron Donor DNA Molecules with the First and Second Acceptor Recombination Sequences contained in the Linear Module of the engineered parental plasmid platform so as to generate Nanostructure-Ended Double-Stranded Covalently-Closed Linear DNA molecules, 5. promoting the expression of the Homing Endonuclease encoded in the recombinant cell by addition of a suitable inducer in order to produce double-strand cuts in the Homing Endonuclease Recognition Sequences on all extragenomic DNA molecules that carry the Homing Endonuclease Recognition Sequences; and 6. isolating the resulting nanostructure-ended double-stranded linear covalently closed DNA molecules from the recombinant cell.

FIGS. 3 to 8 represent a possible embodiment of said process. The specific sequences illustrated for D1, A1, D2 and A2 are provided by way of example.

As can be appreciated from FIG. 3, briefly, after forming the system of the present invention with the desired sequences cloned in the Parental Plasmid, the Left and Right Retron Donor DNA Molecules are generated in the Third Step, and subsequently recombined with the linear double-stranded DNA Module during the Fourth Step. The Fifth Step involves the nuclease-directed digestion of the residual DNA molecules of the process, leaving the nanostructure-ended double-stranded covalently-closed linear DNA molecules ready to be isolated and purified by processes well-known in the art.

FIGS. 4 to 8 show first to fifth steps of this manufacturing process in detail.

FIG. 4 illustrates the cloning that is carried out on multiple cloning sites of the Parental Plasmid of the present invention prior to forming the manufacturing system.

FIG. 5 shows the generation of the recombinant cell of the present invention, according to some embodiments, by co-transformation with the helper and engineered parental plasmids, forming the manufacturing system.

As depicted in FIG. 6, expression of the retrotranscriptase from the Helper Plasmid by proper induction with, for example, IPTG, allows the Retron Module of the Parental plasmid to produce Left and Right single-stranded nano-structure-DNA Ends which fold independently to form cohesive double-stranded termini compatible with the recombination reaction of Step 4.

Specifically, after incorporating a parental plasmid into a recombinant cell in accordance with the manufacturing system of the present invention, its parental bacterial constitutive promoters transform the retron units producing Retron RNA molecules (Right and Left). When these Retron RNA molecules are subjected to the activity of the retrotranscriptase enzyme, single stranded DNA molecules comprising a Retron Donor DNA Molecule are generated. Each Retron Donor DNA Molecule (Right and Left) in turn comprises a Nanostructured DNA End and a Donor Sequence, these being a consequence of the structural rearrangement of the sequences DNS, and ASR and SSR, respectively.

In some embodiments, the Donor Sequences (D1 and D2) are selected from the group consisting of, but not limited to, PhiC31 attP recombinase recognition sequence such as but not limited to AttP1 and attP2, phiC31 attB recombinase recognition sequence such as but not limited to attB1 and attB2, CRE recombinase recognition sequence (LoxP), Flp recombinase recognition sequence, Lambda recombinase recognition sequence, ResT recombinase recognition sequence, φpK02 telRL sequence, the FRT sequence, TelN recombinase recognition sequence, PY54 Tel recombinase recognition sequence, VP882 TelK recombinase recognition sequence, ΦHAP-1 Tel recombinase recognition sequence, *B. burgdorferi* Tel recombinase recognition sequence, *B. hermsii* Tel recombinase recognition sequence, *B. parkeri* Tel recombinase recognition sequence, *B. recurrentis* Tel recombinase recognition sequence, *B. turicatae* Tel recombinase recognition sequence, B. anserine Tel recombinase recognition sequence, *A. tumefaciens* C58 ResT recombinase recognition sequence, and combinations thereof.

In preferred embodiments, the Donor Sequence D1 is the attB2 Recombinase Recognition Sequence. In even more preferred embodiments, the Recombinase Recognition Sequence is SEQ ID NO. 5.

In preferred embodiments, the Donor Sequence D2 is the attB1 Recombinase Recognition Sequence. In even more preferred embodiments, the Recombinase Recognition Sequence is SEQ ID NO. 4.

FIG. 7 shows the co-expression of the recombinase, for example, PhiC31 recombinase having a sequence such as SEQ ID NO 23, along with retrotranscriptase from the Third Step, which allows the recombination of Left and Right single-stranded DNA molecules produced during the Third Step with the First and Second Acceptor Recombination Sequences of the Linear Module of the Parental Plasmid, rendering nanostructure-ended double-stranded covalently-closed linear DNA molecules.

The Donor Sequences are recognized by the Hepler Plasmid expressed Recombinase in order to recombine each Retron Donor DNA Molecule to the Acceptor Recombination Sequences present in the Linear Module of the Parental Plasmid.

Other Suitable inducers can be selected from, but not limited to, Isopropyl β-D-1-thiogalactopyranoside (IPTG) for the induction of Lac Promoter (pLac) having a sequence such as SEQ ID NO 22, L-Arabinose for the induction of AraBAD promoter (pBAD), Tetracycline for the induction of Tetracycline promoter (pTet), Tryptophan for the induction of Trp promoter (pTrp), L-Rhamnose for the induction of Rhamnose promoter (pRha), D-Xylose for the induction of Xylose promoter (pXyl, Temperature Shift (heat induction) for the induction of Page λ promoter (pλ), Nitric Oxide for the induction of Nitric oxide (NO) promoter (pNOrV), Cold shock for the induction of CspA promoter (pCspA), Maltose for the induction of MalT-dependent malP promoter (pMalP).

FIG. 8 represents the induction of the expression of homing endonuclease, for example I-SceI, from the Helper Plasmid by addition of an inducer, such as an arabinose inducer, which catalyzes the digestion of residual Helper and Parental Plasmid sequences, allowing direct purification of the manufacturing process of the Nanostructure-Ended Double-Stranded Covalently-Closed Linear DNA molecules, for example, by standard low molecular weight DNA isolation protocols from bacteria. This promotes the degradation of the residual DNA molecules by exonucleases present in the host cell.

The isolation of the resulting nanostructure-ended double-stranded linear covalently closed DNA molecules from the recombinant cell can be performed by isolation procedures well known in the art, such as by low-molecular weight DNA isolation procedures.

III. Nanostructure-Ended Double-Stranded Covalently-Closed Linear DNA Molecules

In yet another aspect of this invention, a Nanostructure-Ended Double-Stranded Covalently-Closed Linear DNA molecule is provided, wherein such DNA molecule is produced by the aforementioned process and system.

In general, several different nanostructure-ended double-stranded covalently-closed linear DNA molecules can be produced by the manufacturing process and system formerly described. A list of possible configurations and combinations of double-stranded linear DNA linkers (linear modules) and ends (nanostructures), comprising the nanostructure-ended double-stranded covalently-closed linear DNA "family" of functionalized molecules is incorporated below (some of them being schematically illustrated in FIG. 9). This list by no means pretends to be exhaustive.

1. TrEx Nanostructure-Ended Double-Stranded Covalently-Closed Linear DNA Molecules Gene therapy is becoming a promising therapeutic modality for the treatment of genetic and acquired disorders. Gene therapy is defined as the introduction of a foreign genetic material into a host cell (in-vivo or ex-vivo) to prevent, treat and, ultimately, cure diseases by changing the expression of a gene. It provides a unique approach to treat both inherited and acquired genetic and non-genetic disorders by delivering a therapeutic gene and its associated regulatory elements into the nucleus. Also, other pathological conditions, such as cancer or heart disease, among others, can be treated by supplying genetic sequences that can express a protein or even non translatable RNA to correct the disease.

Other medical uses for the introduction of foreign DNA into a patient's cells is to achieve the expression of antigens which could confer immunological advantages for the treatment of cancer, autoimmune diseases, or for the prevention or elimination of infections.

Clinical trials implementing these DNA vaccines are steadily growing, especially after the world has witnessed the safety and effectiveness of nucleic acid-based vaccines against SARS-CoV-2 during the COVID-19 pandemics.

The utility of any gene therapy strategy is defined by its balance between safety and effectiveness. While virus-derived vectors offer the exceptional potential to target and deliver DNA cargo with high efficiency into the target cell, viral strategies often have several safety concerns, and recent viral gene therapy-related patient mortalities in clinical trials highlight some of the safety issues attributed to the use of viral gene transfer systems that include, but are not limited to unwanted immune responses to viral capsid proteins, regeneration of virulent particles, insertional mutagenesis, difficulty in manufacturing and limited opportunity for repeated administrations due to acute inflammatory response. In contrast, non-viral strategies based on naked DNA vectors, generally offer safer approaches. DNA vectors are relatively easy to manufacture and store and offer tremendous design capacity, cell or tissue specificity can be achieved by harnessing cell-specific functionality in the design of chemical or biological vectors, while physical procedures can provide spatial precision. Other practical advantages of nonviral approaches include the potential for repeated administration, lack of immunogenicity, low toxicity, and potential for tissue specificity. Several major barriers need to be considered in order to develop non-viral gene delivery systems as a therapeutic product to be safely administered in vivo.

For the gene therapy to be successful the transgene delivery system has to be effective in inserting DNA molecules into the mammalian cell cytoplasm and, ultimately, into the nucleus for achieving proper expression of the encoded transgene(s). Naked natural DNA molecules do not enter cells efficiently because of their large size and hydrophilic nature due to their negatively charged phosphate groups. Therefore, the primary challenge for gene therapy is to develop biological or chemical vectors or physical methods that facilitate gene transfer to targeted cells without degradation of the delivered gene. Current FDA approved nucleic acid based gene therapies using chemically modified oligonucleotide based gene therapies include: Spinraza, Exondys 51 and Vyondys 53.

Although several cell transfection methods have been developed for oligonucleotide delivery to patients' cells, virtually all of them present one or more drawbacks such as unwanted immune responses, cytotoxicity, or low transfection efficiencies.

Thus, in a preferred embodiment of the present invention, the nanostructure-ended double-stranded covalently-closed linear DNA molecules produced by the manufacturing system and process bears a central double-stranded linear expression unit flanked by two nanostructured aptameric ends. Said resulting DNA molecule is denoted hereinafter as TrEx (transfection & Expression unit) nanostructure-ended double-stranded covalently-closed linear DNA molecule. The aptamers at the ends of the molecule serve for recognition of a target cell's receptor, triggering endocytosis, followed by endosomal escape.

In order for the transforming DNA molecules to gain access to the cytoplasm to start expressing their information cargo, endosomal escape must be guaranteed after the endocytic process takes place, before lysosome-derived hydrolases completely degrade the endolysosomal vesicle's content. Right after lysosomal fusion to the endosome, ATP-driven proton pumps rapidly acidify the luminal compartment of the endolysosome, paving the way for acid hydrolases to activate their catalytic properties. In nature, the selective pressure exerted by this process onto enveloped and non-enveloped viruses lead to the development of different adaptations aimed at achieving a timely endosomal escape of the virions before hydrolytic degradation ensues. For enveloped viruses, these strategies are based on the action of fusogenic proteins which orchestrate an efficient fusion process of the viral envelope and the endosomal membrane, allowing the capsids containing the viral genome to rapidly exit the vesicle and access the cytoplasm, where it starts its replication process.

Non-enveloped viruses on the other hand, make use of direct protein disruptors of the endosomal membrane structural integrity, leading to the lysis of the vesicle, ensuing viral escape.

But apart from these natural mechanisms, engineered molecules have also been demonstrated to be able to escape the endosomal compartment. Although the details are still a matter of debate, the most widely accepted explanation for these observations is known as the "proton sponge" model. In this mechanistic view, the process is supposed to start with the endosomal compartment acidification triggered by lysosomal fusion. Provided that any of the luminal components has the capacity to bind to and retain some of the incoming protons, the necessity of extra protons to achieve the optimal pH for hydrolytic degradation will drive an excessive accumulation of net charge in the lumen. This in turn leads to chloride ions to passively permeate the endosomal membrane from cytoplasm to lumen. The progressive buildup of HCl in the luminal space triggers an osmotic imbalance between the endosome and the cytosol, which will cause the rapid lytic rupture of the endosomal membrane, freeing its contents to the cytoplasmic compartment. Some of the most frequently used agents for achieving the delivery of DNA into cells and successful gene expression are hypothesized to show some proton sponging capacity. This is mostly due to the presence of amino groups which should be able to titrate protons entering the endosomal lumen. Thus amino groups in delivery molecules would serve two different purposes: on one hand, they promote nucleic acid binding, due to the electric complementarity with negatively charged phosphate groups on the backbone and, secondly, facilitating endosomal escape by proton sponging. This is thought to be the case for bupivacaine, and polyamines such as poly-L-lysine, chitosan or polyethylenimine (PEI).

The transfection strategy implemented by the TrEx nanostructure-ended double-stranded covalently-closed linear DNA molecules of the present invention could exploit the specific binding capacity of one of its two aptamers to capture an abundant protein naturally present in serum (human serum albumin) whose constituent basic amino acids may act as proton sponges, contributing to the process of endosomal escape of the TrEx nanostructure-ended double-stranded covalently-closed linear DNA molecule to the cytoplasm. Alternatively, DNA aptamers can be designed to mimic virus-derived membrane destabilizing proteins which may contribute to the enhancement of the endosomal escape of the therapeutic DNA molecules. Finally, the whole TrEx nanostructure-ended double-stranded covalently-closed linear DNA molecule can be complexed with accessory agents and molecules (like lipids such as DOPE, DOTAP, etc.; or polycationic compounds such as chitosan, polyamines, etc.) which might enhance cell entry and/or endosomal escape.

Besides strategies aimed at achieving entry of the DNA molecules into the cell cytoplasm, several nuclear import techniques are currently being developed. Although the nuclear import of DNA molecules from the cytoplasmic compartment is not a normal event in the cell, several mechanisms exist for their transportation. These nuclear translocation mechanisms have evolved over billions of years, as viruses and other pathogens have perfected their way to invade the host. In one example, the SV40 virus genome ensues a "molecular hijacking" process where binding to host proteins while they are in their regular transit to the nucleus occurs.

Some of the strategies aimed to achieve proper nuclear localization of nucleic acids artificially delivered to the cell include the modification of DNA molecules with a covalent linkage to a protein bearing a Nuclear Localization Signal (NLS), and/or attachment to nuclear import receptors such as Karyopherins. On the other hand, the direct engineering of DNA by the incorporation of Nuclear Targeting Sequences (NTS) also results in highly efficient translocation of linear DNA molecules without the need of further modification of the molecule. The mechanism consists in conferring a DNA molecule with one or more NTS, which are short consensus motifs recognized and bound by specific transcription factors (TFs) which in turn can carry the DNA molecule to the nucleus by interacting with the nuclear pore complex.

Some of the current approaches to gene therapy involve some form of recombination of foreign genetic elements into the host's genome. However, the integration of foreign DNA sequences into the genome of in vitro cultured cells or even live organisms may have detrimental consequences, especially when used for gene therapy. DNA insertions into the genome may have far-reaching effects such as insertional mutagenesis, activation of proto-oncogenic zones or silencing by de novo methylation of the introduced gene or the nearby cellular DNA. To circumvent problems inherent to genomic integration, the development of episomal or extrachromosomal eukaryotic DNA platforms or vectors offers an attractive and safe alternative. Episomal platforms harboring one or more transcriptional units are DNA sequences capable of being maintained in a non-integrated way in the host nucleus, while providing sustained or regulated gene expression in order to correct genetic defects or even prevent, treat or cure a disease.

In order to obtain a long-term expression of a protein of interest, DNA molecules can also be engineered to maintain a certain stability in the cell nucleus. For that purpose, several virus-derived and self-derived DNA sequences can be added to the linear DNA molecules. Natural chromosomes of eukaryotic cells have Matrix Attachment Regions (MARs) that are operationally defined as A/T-rich DNA elements that bind specifically to the protein nuclear matrix. These elements are frequently located in gene-rich areas associated with actively transcribed units and there is evidence that they can reduce or totally abrogate some forms of gene silencing. Genes flanked by MAR sequences have been shown to exhibit less variation in expression among independent transgenic plants or cell culture lines. In particular, MARs appear to prevent silencing caused by multiple transgene copies in cis. There is some conjecture as to the precise role of MAR sequences in transgene cassettes, but current hypotheses suggest that they may act as boundary elements facilitating the formation of decondensed chromatin loops that in turn enhance transgene transcription and reduce some forms of gene silencing.

Another virus-derived element used for introducing extra chromosomal material into cells is based on genetic elements of the polyomavirus, Simian virus 40 (SV40). This virus exhibits a replication pattern that is uncoupled from the regulatory mechanisms of the host cells so that each viral genome replicates many times with each cell cycle. As a consequence transfection of cells with recombinant SV40 vectors ultimately results in cell death, limiting this vector to transient expression set-ups. For stable long term expression, several episomal vectors based on viral sequences have been designed and each of these vectors contains an SV40 origin of replication and one or more viral early genes, activating the viral origin and thus allowing the episome to reside in the cell in a stable and replicative manner. According to the state of the art, the placement of an SV40 origin of replication in the vicinity of an S/MAR sequence in a genetic construct has the capability of driving replication of said genetic construct at very low copy numbers, in a cell cycle-synchronized fashion, and is stably maintained without selection for more than 100 generations. This becomes especially relevant when considering a therapeutic approach that requires transfection of replicative cells with the TrEx nanostructure-ended double-stranded covalently-closed linear DNA molecule of this invention.

Episomal vectors present several advantages such as the non-disruption of the gene of interest which often occurs from integration into genomic DNA. Also, the presence of the transgene does not lead to the rearrangement or disruption of important transcriptionally active regions. Besides, episomal vectors can be designed to persist in multiple copies in the nucleus, resulting in greater transcriptional activity of the gene of interest, as long as the necessary virus-derived trans-acting factors are supplied.

The linear DNA module of TrEx nanostructure-ended double-stranded covalently-closed linear DNA molecules thus comprises at least one DNA Nuclear Targeting Sequence (DNTS), at least one Scaffold Matrix Attachment Region (S/MAR) and at least one expression cassette, and—optionally—one origin of replication.

In summary, this molecule allows cell-specific transformation and selective episomal expression of a gene of interest in the target cell. These functions make TrEx nanostructure-ended double-stranded covalently-closed linear DNA molecules an ideal tool for gene therapy and DNA-based vaccination approaches.

2. Bi-Specific Nanostructure-Ended Double-Stranded Covalently-Closed Linear DNA Molecules Antibodies, also known as immunoglobulins, are proteins produced by the immune system to combat various diseases and infections. Their unique structural and functional attributes make them indispensable components of the body's immune response. In recent years, antibodies have garnered significant attention in fields such as disease diagnostics, vaccine development, and targeted therapy.

Antibodies are typically Y-shaped molecules composed of two heavy and two light chains linked via disulfide bonds. Each antibody has two regions: the constant or "Fc" region, which defines the class of the antibody, and the variable region, which determines the antigen specificity. Antibodies exhibit high specificity towards the antigens that stimulated their production. They recognize and bind to specific epitopes on antigens, forming an antigen-antibody complex. This binding leads to a series of events that facilitate the neutralization, opsonization, or lysis of the pathogen, ultimately aiding in the clearance of the infectious agent from the body.

Antibody production is a sophisticated process involving several steps, including B-cell maturation, activation, differentiation, and proliferation. During a primary immune response, naive B-cells that recognize the invading pathogen through their B-cell receptors (BCRs) undergo activation. They differentiate into plasma cells, which produce and secrete large amounts of antibodies specific to the recognized antigen. Memory B-cells are also generated during this process, providing quicker and more potent responses during subsequent exposures to the same antigen.

Over the years, antibodies have found broad applications in the field of medical diagnostics. Techniques like ELISA (Enzyme-Linked Immunosorbent Assay), immunofluorescence or immunohistochemistry rely on the antigen-antibody interaction to detect the presence of specific pathogens or analytes in patient samples, tissues, cells or fluids. In recent years, the potential of antibodies as therapeutic agents has also been explored. Monoclonal antibodies—antibodies produced by a single clone of B cells, all identical and specific to the same epitope—have become crucial in treating several diseases, including cancers, autoimmune disorders, and infectious diseases. The COVID-19 pandemic further highlighted the role of monoclonal antibodies and convalescent plasma (rich in antiviral polyclonal antibodies taken from patients) in therapeutic interventions.

In Vitro Antibody Uses

The uses of antibodies extend far beyond the confines of the human immune system. Today, in vitro applications of antibodies have become a cornerstone in scientific research, clinical diagnostics, and therapeutics. This essay will delve into the versatile uses of antibodies in in vitro settings, spotlighting their roles in immunological assays, therapeutic drug monitoring, and research involving protein identification and characterization.

Enzyme-Linked Immunosorbent Assay (ELISA) is one of the most commonly used immunological assays that capitalizes on the antigen-antibody interactions. Through direct, indirect, sandwich, or competitive ELISA, scientists can detect the presence and quantify the concentration of an antigen or antibody in a sample. This technique is invaluable for diagnosing infections, measuring protein concentration, and determining the immune response to a particular antigen.

In a similar vein, western blotting employs antibodies to detect specific proteins in a sample. After separating proteins by electrophoresis and transferring them onto a membrane, the desired protein can be identified and quantified using specific primary antibodies, then visualized by means of secondary antibodies coupled to chromogenic or fluorogenic enzymatic activities. Western blotting is widely used in research for protein identification and understanding post-translational modifications.

Flow cytometry is another application where antibodies are used to analyze cell populations. Fluorescently-labeled antibodies bind to specific antigens on the cells' surface, enabling their detection and sorting based on emitted fluorescence. This technique is particularly beneficial in assessing immune cell populations, analyzing cell surface markers, and in cancer diagnostics.

Therapeutic drug monitoring (TDM) is a clinical practice that measures specific drug levels at designated intervals to maintain a constant concentration in a patient's bloodstream. Antibodies play an integral role in TDM, as they are used in immunoassays designed to quantify drug concentrations. For example, digoxin, an important drug used to treat heart failure, can be measured using a radioimmunoassay. The principle is based on competition between radiolabeled digoxin and the patient's serum digoxin for a limited amount of digoxin-specific antibody.

Monoclonal antibodies, due to their specificity towards a single epitope, are utilized in protein characterization studies. They help in understanding protein expression patterns, post-translational modifications, and the investigation of protein-protein interactions.

Immunoprecipitation and co-immunoprecipitation assays use antibodies to precipitate proteins and protein complexes from cell lysates. The—at least—dual antigen-binding domains of antibodies enable simultaneous binding of two antigenic molecules, allowing molecular bridging among several antigenic molecules at the same time, thus increasing the effective molecular weight of the immune complex, promoting its desolvation and precipitation out of solution. These techniques provide insights into protein-protein interactions and the dynamics of protein complexes.

In a similar approach, antibodies are used in chromatin immunoprecipitation (ChIP) assays, which study protein-DNA interactions in vivo. In these assays, DNA-binding proteins (such as transcription factors or modified histones) are cross-linked to DNA. Antibodies specific to these proteins are used to pull-down the protein-DNA complexes, followed by sequencing or PCR to identify the DNA sequences of interest.

Antibodies also play a significant role in the visualization of specific molecules in imaging studies on tissues or cells. Immunohistochemistry (IHC) and immunofluorescence (IF) are two such techniques. IHC uses antibodies to visualize the distribution and localization of specific antigens in cells or tissue sections, with a chromogenic substrate providing the visual signal. On the other hand, IF employs fluorescence-tagged antibodies, which, under appropriate excitation light, enable the visualization of the target antigen.

Solid-phase agarose beads can be chemically linked to antibodies, to manufacture affinity chromatographic columns, where a mixture or whole protein extract is applied to the column, and only the analyte of interest is retained in the column's matrix due to specific binding to the antibodies in the column.

In Vivo Antibody Uses

Monoclonal and polyclonal antibodies are powerful tools in the field of immunotherapy, offering new and effective treatment options for a wide range of diseases. These antibodies are produced by the immune system or through laboratory techniques and can be harnessed for a wide range of therapeutic applications. Monoclonal antibodies provide precise targeting and tailored therapy, while polyclonal antibodies offer broad-spectrum coverage and immunomodulatory effects.

Monoclonal antibodies are engineered to be highly specific to a single target antigen. This uniformity allows for precise targeting of disease-related molecules or cells.

Cancer Therapy: Monoclonal antibodies have revolutionized cancer treatment. They can be designed to target cancer-specific antigens, such as overexpressed cell surface receptors. Examples include trastuzumab, which targets HER2/neu in breast cancer, and rituximab, which targets CD20 in B-cell lymphomas. Monoclonal antibodies can induce cell death, inhibit growth signaling pathways, or recruit immune cells to attack cancer cells.

Autoimmune Disorders: Monoclonal antibodies are used to modulate the immune system in autoimmune diseases. For example, infliximab and adalimumab target tumor necrosis factor-alpha (TNF-$\alpha$) in rheumatoid arthritis and inflammatory bowel disease, reducing inflammation and improving symptoms.

Infectious Diseases: Monoclonal antibodies can be developed to neutralize pathogens or their toxins. They have been successful in the treatment of viral infections like HIV and hepatitis C, where they can bind to viral envelope proteins and prevent viral entry into host cells. Monoclonal antibodies also hold promise in the fight against emerging infectious diseases, such as COVID-19, with the development of antibodies targeting the SARS-CoV-2 spike protein.

Polyclonal antibodies, on the other hand, are derived from a diverse population of B cells, resulting in a mixture of antibodies targeting multiple epitopes on an antigen. They are produced by immunizing an animal with an antigen and harvesting the antibodies from its serum. Polyclonal antibodies offer several advantages in therapeutic applications.

Infectious Diseases: Polyclonal antibodies can provide immediate immune protection against pathogens. They are commonly used for post-exposure prophylaxis in conditions like rabies or botulism. Polyclonal antibodies contain a variety of antibodies, each with unique specificities, allowing for broad-spectrum neutralization of different strains or variants of a pathogen. For example, antibodies can bind to specific protein molecules on the surface of a virus, hampering its capacity to bind its natural targets, such as cell receptors that mediate pathogen entry to host cells. Other approaches exploit the opsonizing activity of antibodies, by enhancing pathogen clearance by the process of phagocytosis.

Antibodies as antitoxins: polyclonal and monoclonal antibodies can be administered to patients to neutralize certain toxins such as diphtheria toxin, tetanus toxin, snake or scorpion venoms, for example. These antibodies are a form of passive immunity, where a patient that has recovered from infections or intoxications, naturally develops specific anti-toxin antibodies that can be harnessed to confer protection to the same toxins in other patients.

Immunomodulation: Polyclonal antibodies can modulate the immune system by affecting multiple targets. For instance, intravenous immunoglobulins (IVIG) derived from pooled human plasma are used to treat immune deficiencies or autoimmune disorders. IVIG contains a mixture of antibodies that can regulate immune responses, suppress autoantibody production, and modulate inflammatory processes.

Transplantation: Polyclonal antibodies are utilized in transplant medicine to prevent organ rejection. Antibodies such as antithymocyte globulin (ATG) or antilymphocyte globulin (ALG) are administered to deplete T cells and suppress the immune response against the transplanted organ.

As research continues, the therapeutic potential of these antibodies will likely expand, providing hope for improved patient outcomes and novel treatment approaches.

Immunotherapy

Unlike traditional therapeutic approaches such as drug-based therapy, surgery or lifestyle prescriptions, immunotherapy harnesses the power of the body's own immune system to cope with disease. By leveraging the body's immune system, immunotherapy holds promise in combating infectious diseases or autoimmune disorders, enabling the regeneration of damaged tissues, or even treating cancer. This expansion of immunotherapy's scope exemplifies its profound potential to reshape the landscape of medical treatment and improve patient outcomes.

Infectious Disease Treatment: As mentioned above, monoclonal and polyclonal antibodies can be engineered to specifically target and neutralize pathogens. In the case of viral infections such as COVID-19, monoclonal antibody therapies like bamlanivimab and casirivimab/imdevimab have been authorized for emergency use, helping to reduce disease severity and hospitalizations.

Vaccines: Vaccines are a form of immunotherapy that primes the immune system to recognize and mount a robust response against specific pathogens. Vaccines have played a crucial role in eradicating or significantly reducing the impact of diseases like polio, measles, and hepatitis. Recent advancements in mRNA vaccine technology, as demonstrated by the COVID-19 mRNA vaccines from Pfizer-BioNTech and Moderna, have further highlighted the potential of immunotherapy in rapidly developing effective vaccines.

Autoimmune Disease Management: Immunotherapy has shown promise in managing autoimmune diseases, where the immune system mistakenly attacks healthy tissues. Examples include i) Immune Modulators: Biologic drugs, such as TNF inhibitors and interleukin inhibitors, modulate the immune system's activity to reduce inflammation and suppress autoimmune responses. These therapies have revolutionized the management of conditions like rheumatoid arthritis, psoriasis, and inflammatory bowel disease, providing relief and improving quality of life for many patients; ii) Tolerance-Inducing Therapies: Research is actively assaying tolerance-inducing therapies that retrain the immune system to tolerate self-antigens. This approach holds promise for conditions like multiple sclerosis and type 1 diabetes, where the immune system mistakenly targets specific cells or tissues.

Tissue Regeneration and Transplantation: Immunotherapy has also shown potential in tissue regeneration and transplantation, aiming to overcome rejection and promote healing. Examples include: i) Stem Cell Therapies: Stem cells possess unique regenerative properties and can differentiate into various cell types. Immunotherapy approaches, such as the use of immune-modulating drugs or engineering cells to evade immune recognition, can enhance the success of stem cell therapies in conditions like spinal cord injuries, heart disease, and degenerative disorders; ii) Organ Transplantation: Transplant rejection occurs when the immune system recognizes the transplanted organ as foreign. Immunotherapy drugs, such as calcineurin inhibitors and immune checkpoint inhibitors, are used to suppress the immune response and improve the success of organ transplantation.

Cancer: The immune system comprises various cells, including T-cells and natural killer (NK) cells, which possess the ability to detect and eliminate abnormal cells. However, cancer cells often develop mechanisms to evade immune surveillance. Thus Immunotherapy seeks to overcome these mechanisms and bolster the immune response against cancer.

Examples of successfully applied immunotherapy approaches to the treatment of cancer include: i) Checkpoint Inhibitors: a class of immunotherapy drugs that target proteins on immune cells or cancer cells, such as PD-1 and CTLA-4. By blocking these proteins, checkpoint inhibitors unleash the immune system to attack cancer cells. Pembrolizumab (Keytruda) and nivolumab (Opdivo) are examples of checkpoint inhibitors that have demonstrated remarkable efficacy in treating various cancers, including melanoma, lung cancer, and bladder cancer, ii) CAR-T Cell Therapy: Chimeric Antigen Receptor (CAR) T-cell therapy involves modifying a patient's own immune cells to recognize and attack cancer cells. The patient's T-cells are extracted, genetically engineered to express specific receptors targeting cancer cells, and then reintroduced into the patient's body. CAR-T cell therapy has shown remarkable success in treating certain blood cancers, such as acute lymphoblastic leukemia and diffuse large B-cell lymphoma.

Novel approaches and ongoing clinical trials based on immunotherapy approaches to the treatment of cancer include: i) Personalized Cancer Vaccines: Several clinical trials are investigating the potential of personalized cancer vaccines. These vaccines are tailored to each patient's unique tumor characteristics, stimulating the immune system to specifically recognize and attack cancer cells. Such approaches hold promise in improving treatment outcomes and reducing the risk of cancer recurrence; ii) Tumor-Infiltrating Lymphocytes (TILs) Therapy: this involves isolating immune cells present within a patient's tumor, expanding them in the laboratory, and then reinfusing them back into the patient. These activated TILs can target and destroy cancer cells. Ongoing trials are exploring the effectiveness of TILs therapy in various cancer types, including melanoma and cervical cancer; iii) Combination Therapies: Combining different immunotherapy approaches or combining immunotherapy with other treatment modalities, such as chemotherapy or targeted therapy, is an active area of research. For instance, combining a checkpoint inhibitor with a targeted therapy has shown improved outcomes in certain cancers, including melanoma and lung cancer.

Bi-Specific Antibodies:

Bi-specific antibodies are designed to recognize and bind to two different antigens simultaneously. This unique feature enables them to bridge different cellular components, directing immune cells to specific targets or enhancing the binding between targets. The applications of bi-specific antibodies include:

a) Cancer Therapy: Bi-specific antibodies can engage immune cells, such as T-cells or natural killer (NK) cells, and redirect them to recognize and eliminate cancer cells. By binding to cancer cells and immune cells, bi-specific antibodies enhance immune cell-mediated cytotoxicity, facilitating tumor eradication. For instance, blinatumomab (Blincyto) is a bi-specific antibody approved for the treatment of acute lymphoblastic leukemia, bringing T-cells in proximity to cancer cells and stimulating immune responses against the cancer.

b) Autoimmune Diseases: Bi-specific antibodies can be engineered to simultaneously bind to disease-causing antibodies and target cells involved in autoimmune disorders. By linking the disease-causing antibodies to immune cells, these bi-specific antibodies facilitate their elimination, reducing inflammation and suppressing the autoimmune response. Such approaches offer potential treatment options for conditions like rheumatoid arthritis and lupus.

Tri-Specific Antibodies:

Tri-specific antibodies take the concept of bi-specific antibodies a step further by incorporating three different binding specificities. This added complexity allows for even greater precision and versatility in targeting diseases. The applications of tri-specific antibodies include:

a) Cancer Immunotherapy: Tri-specific antibodies can engage multiple immune cell populations, such as T-cells, NK cells, and macrophages, simultaneously targeting different molecules on cancer cells. By coordinating the immune response and optimizing the interaction between immune cells and cancer cells, tri-specific antibodies have the potential to enhance tumor cell killing and overcome immune evasion mechanisms. Ongoing research is investigating the therapeutic potential of tri-specific antibodies in various cancers, including solid tumors.

b) Infectious Diseases: Tri-specific antibodies can be engineered to simultaneously bind to different epitopes of a pathogen, enhancing neutralization and preventing escape mutations. By combining multiple mechanisms of action, such as blocking viral entry and enhancing antibody-dependent cellular cytotoxicity, tri-specific antibodies hold promise in the treatment of infectious diseases like HIV, influenza, and COVID-19.

Thus, in another embodiment of the present invention, the nanostructure-ended double-stranded covalently-closed linear DNA molecule is a bi-specific molecular entity, having a central double-stranded linear DNA linker, comprising a Spacer Sequence (non expressing DNA sequence) inserted in the multiple cloning site, flanked by two aptamers. The aptamers at the ends of the molecule are capable of specific recognition and binding to a molecular/cellular target like proteins, carbohydrates, lipids, etc., wherein both molecular/cellular targets are different. The resulting construct would be useful for direct physical linking of two specific molecules (or cells bearing them), like what is achieved using bi-specific antibodies, without the drawbacks associated with proteins (folding issues, thermal instability, proteolytic degradation, etc.).

3. Fluorophore- and Gold-Binding Nanostructure-Ended Double-Stranded Covalently-Closed Linear DNA Molecules As mentioned above, antibodies are essential for diagnostic and detection assays such as immunofluorescence, immunohistochemistry, ELISA, western blotting, lateral flow dipsticks, etc. In many of these applications, antibodies require to be conjugated to fluorescent molecules to allow detection in readout steps of the assays.

DNA aptamers can emulate antibodies in these kinds of assays, allowing the user to specifically recognize certain molecular targets, while also emitting fluorescence in order for quantitative detection to take place.

In another embodiment of the present invention, the nanostructure-ended double-stranded covalently-closed linear DNA molecule is a fluorophore-binding nanostructure-ended double-stranded covalently-closed linear DNA molecule, having a central double-stranded linear DNA linker, comprising a Spacer Sequence (non expressing DNA sequence) inserted in the multiple cloning site, flanked by two aptamers. One of the aptamers being capable of specific recognition and binding to a fluorophore (like for example 3,5-difluoro-4-hydroxybenzylidene imidazolinone, HBI, or hydroxyethyl methyl-amino benzylidene-cyanophenyl acetonitrile, HBC), which—when bound—is strongly fluorescent. The other aptamer being capable of specific recognition and binding to a molecular target, like a protein, carbohydrate, lipid, or any other molecule of interest. Fluorophore-binding nanostructure-ended double-stranded covalently-closed linear DNA molecules avoid the need of adding a step of organic synthesis crosslinking the construct to a fluorophore (such as fluorescein or rhodamine): the sole addition of the fluorophore is sufficient for strong association of both reactants. The resulting construct would be useful for direct fluorescent staining of specific molecules, like what is achieved during direct immunofluorescence protocols.

In yet another embodiment of the present invention, the nanostructure-ended double-stranded covalently-closed linear DNA molecule is a gold-binding nanostructure-ended double-stranded covalently-closed linear DNA molecule, having a central double-stranded linear DNA linker, comprising a Spacer Sequence (non expressing DNA sequence) inserted in the multiple cloning site, flanked by two nanostructured ends. One of the ends folds into a molecular array capable of specifically binding and trapping a gold atom or gold-compound. The other end is an aptamer capable of specific recognition and binding to a molecular target, like a protein, carbohydrate, lipid, or any other molecule of interest. The resulting nanostructure-ended double-stranded covalently-closed linear DNA molecules would be useful for generating electron-dense staining of specific molecules in electron microscopy imaging protocols.

4. Molecular Cages and Molecular Traps Using Nanostructure-Ended Double-Stranded Covalently-Closed Linear DNA Molecules Molecular cages are submicroscopic devices that can encapsulate and release drugs, toxins, or other compounds in a controlled manner at specific locations. They are made up of a variety of materials, including polymers, metals, and nucleic acids. Molecular cages can be designed to target specific cells or tissues, which makes them ideal for drug delivery applications.

One of the main advantages of molecular cages is that they can protect the encapsulated drug from degradation in the body. This is important because many drugs are unstable and can break down before they reach their target. Molecular cages can also help to avoid nonspecific toxicity by means of selective delivery of toxins to their intended targets, sparing normal or non-target cells.

Drug release by molecular cages can be achieved by using triggers that can be activated by changes in pH, temperature, or the presence of specific additional molecules.

Overall, molecular cages can help to reduce the side effects of drugs and improve their efficacy. Molecular cages can be made up of polymers, metal-organic frameworks, dendrimers, and nucleic acids. Applications for molecular cages include cancer therapy, gene therapy, and pain management.

Thus, in yet another embodiment of the present invention, the nanostructure-ended double-stranded covalently-closed linear DNA molecule is a molecular cage, having a central double-stranded linear DNA linker, comprising a Spacer Sequence (non expressing DNA sequence) inserted in the multiple cloning site, flanked by two nanostructured ends. One of the ends folds into a sort of molecular cage capable of specific recognition and trapping a specific small molecule or drug. The other end is an aptamer capable of specific recognition and binding to a molecular target, like a protein, carbohydrate, lipid, or any other molecule of interest. This nanostructure-ended double-stranded covalently-closed linear DNA molecule is pre-loaded with the drug molecule before its administration to a patient/system. When the recognition aptamer binds its target, a conformational change is induced on the cage aptamer, resulting in timely-and/or location-dependent release of the drug. This function could be applied to the directed treatment of tumors, where a toxic molecule could be delivered specifically to tumor cells upon binding of tumor-associated antigens, thus sparing normal cells.

In another embodiment of the present invention, the nanostructure-ended double-stranded covalently-closed linear DNA molecule is a molecular cage, having a central double-stranded linear DNA linker, comprising a Spacer Sequence (non expressing sequence) inserted in the multiple cloning site, flanked by two nanostructured ends. One of the ends folds into a sort of molecular cage capable of specific recognition and trapping a specific small molecule or drug. The other end is an aptamer capable of specific recognition and binding to a molecular target, like a protein, carbohydrate, lipid, or any other molecule of interest. In this case (as opposed to molecular cage molecules), the nanostructure-ended double-stranded covalently-closed linear DNA molecule is administered as unbound to the target molecule.

When the molecule is administered to a patient/system, if the trapping aptamer recognizes its target a conformational change is induced, resulting in the entrapment of the target molecule. Then, the other recognition aptamer eventually binds to its target in another location (secretory pathway in the patient, or outside the system into consideration) resulting in the clearance of the small target molecule off the system. This function could be applied to the selective detoxification of a patient or system under the effects of a toxic molecule.

5. Nanostructure-Ended Double-Stranded Covalently-Closed Linear DNA Molecules for Lateral Flow Dipstick Assays In another embodiment of the present invention, the nanostructure-ended double-stranded covalently-closed linear DNA molecule is adapted for lateral flow dipstick assays, having a central double-stranded linear DNA linker, comprising a Spacer Sequence (non expressing DNA sequence) inserted in the multiple cloning site, flanked by two nanostructured aptameric ends. One of these aptamers is capable of specifically binding to streptavidin, while the other aptamer is designed to bind a specific immunoglobulin from a certain species. Thus, this molecule is the ideal linker in lateral flow dipstick assays, where the reactive bands are coated with streptavidin. This setup allows for the detection of specific antibodies present in a serum sample against a desired target, working in a similar manner as a "sandwich" ELISA works. For example, if one wants to detect immunoreactivity against SARS-CoV2 to prove viral exposure in a patient, one could use a lateral flow dipstick pre-treated with nanostructure-ended double-stranded covalently-closed linear DNA molecules for lateral flow dipstick assays (equipped with a streptavidin-binding aptamer and a human IgG-binding aptamer), to enrich for general human IgG antibodies into the reactive bands. Then the dipsticks are dipped in a solution comprising a mixture of purified spike protein and specific FITC-conjugated mouse antibodies against the spike protein. While the liquid migrates onto the reactive bands, should the patient's serum contain specific antibodies against the spike protein, they will be bound by the mixture of spike protein-FITC-mouse Ig. Subsequent detection of FITC by colloidal gold-conjugated anti FITC antibodies present in the reactive bands, will stain the reactive band, indicating a positive result for presence of reactive anti-spike antibodies in the patient's serum.

6. Catalytically Active Nanostructure-Ended Double-Stranded Covalently-Closed Linear DNA Molecules The spontaneous capacity of single-stranded nucleic acids of folding three-dimensionally into complex architectures can cause these molecules to gain specific binding, or even catalytic properties. Many so-called ribozymes or DNAzymes, have been studied and characterized to date. Among some examples of their catalytic functions are RNA/DNA cleavage, ligation, polymerization, RNA splicing, peptide bond formation and hydrolysis, small molecule cleavage, co-factor modification, oxidation, reduction, and rearrangement reactions.

Thus, the DNA nanostructured ends of the nanostructure-ended double-stranded covalently-closed linear DNA molecules can host DNAzymes, which can provide additional complementary functions to either gene therapy strategies or to binding platforms. For example, while one of the DNA ends is an aptamer providing specific recognition and transfection to a particular cell type, the other end could be an RNA-cleaving DNAzyme, programmed to degrade a specific pathogenic mRNA in the cell's cytoplasm.

Thus, in a further embodiment of the present invention, the nanostructure-ended double-stranded covalently-closed linear DNA molecule is catalytically active, having a central double-stranded linear DNA linker, comprising a Spacer Sequence (non expressing DNA sequence) inserted in the multiple cloning site, flanked by two nanostructured ends. One of the ends is composed of an aptamer capable of specific recognition of a molecular target. like a protein, carbohydrate, lipid, or any other molecule of interest. The other end carries a DNAzyme capable of catalyzing a specific chemical reaction while binding a specific ligand by means of the other aptamer. This could be used, for example as a diagnostic device, which gives off a color upon a reaction on a specific soluble chromophore, while the whole catalytically active nanostructure-ended double-stranded covalently-closed linear DNA molecule is fixed to a solid substrate coated with a specific ligand, or a process similar to an immunohistochemistry, where the colorimetric reaction catalyzed by the DNAzyme end is physically restricted to a location where a specific ligand is present, bound by the opposite nanostructured end.

IV. Assays and Experiments

1. Analysis of the Parental Plasmid, Helper Plasmid and DNA Derivatives by Agarose Gel Electrophoresis.

The molecular weight of the DNA molecules described in this invention were subjected to analysis by electrophoresis in 1% agarose gel. The results shown in FIG. 10 confirm the production of the expected nanostructure-ended double-stranded covalently-closed linear DNA molecules upon induction. Lane 1 shows the Molecular Weight Ladder, Lane 2 shows the bands corresponding to supercoiled and relaxed Parental Plasmid forms. Lane 3 shows supercoiled and relaxed forms of the Helper Plasmid. Lane 4 shows the coexistence of both previously shown plasmid molecules in a single bacterial recipient strain, after transformation with both plasmids, followed by miniprep plasmid purification, without induction. ISceI Endonuclease-mediated degradation of Parental Plasmid and Helper Plasmid ensures that the only DNA purified products are nanostructure-ended double-stranded covalently-closed linear DNA molecules, which are shown as a single band in lane 5. These nanostructure-ended double-stranded covalently-closed linear DNA molecules are demonstrated to be made exclusively of DNA, since DNAse-I treatment degrades the band completely (Lane 6). Exonuclease V is not able to degrade nanostructure-ended double-stranded covalently-closed linear DNA molecules, due to the closed nature of the molecules ends (Lane 7). Lane 8 shows that nanostructure-ended double-stranded covalently-closed linear DNA molecules are indeed made of dsDNA, since Type-2 restriction endonuclease-mediated digestion of the band produces the expected digestion products. Finally, lane 9 shows restriction endonuclease digestion exposes free DNA ends onto which exonuclease V can act, promoting complete degradation of the previously cut nanostructure-ended double-stranded covalently-closed linear DNA molecules.

2. Topology Analysis of Nanostructure-Ended Double-Stranded Covalently-Closed Linear DNA Molecules by Polymerase Chain Reaction (PCR)

With the aim of demonstrating that the topological structure of nanostructure-ended double-stranded covalently-closed linear DNA molecules is as expected, three pairs of specific PCR primers were designed, which hybridize at the positions shown in FIG. 11 (lower panel). Briefly, "Black" primers: FW (SEQ ID NO: 38): 5'-TTTCCACAC-CAACCGGTAGGC-3' REV (SEQ ID NO: 39): 5'-GCCGGCGTACAGGTCACTAAT-3', "White" primers: FW (SEQ ID NO: 40): 5'-AAAGGTGTGGTTGGC-CATCCG-3'; REV (SEQ ID NO: 41): 5'-GTCAGCAAC-CAACCGGT-3', and "Grey" primers: FW (SEQ ID NO: 42): 5'-TGGAGTTCCGCGTTACATAACTT-3'; REV (SEQ ID NO: 43): 5'-AGACTGCAGGCTCTAGATTCG-3'.

These primer sequences are provided solely for use in experimental validation of the claimed nanostructure-ended linear DNA molecules and are not themselves claimed or considered part of the invention.

Below is a description of what each lane shows.

Lane 1: Molecular Weight Ladder; Lane 2: amplification product using "black" PCR primers on nanostructure-ended double-stranded covalently-closed linear DNA molecules DNA A template (300 bp product); Lane 3: results obtained by a PCR amplification attempt using "black" primers on DNA B template; Lane 4: "white" PCR primers on DNA A template (248 bp product); Lane 5: amplification product using the "white" PCR primers on DNA B template; Lane 6: amplification product using "gray" PCR primers on DNA A template (1327 bp product); Lane 7: amplification product using "gray" PCR primers on DNA B template (1327 bp product); Lane 8: negative controls with water instead of template.

The results effectively demonstrate the covalently closed nature of the ends of the nanostructure-ended double-stranded covalently-closed linear DNA molecules.

3. Fluorophore-Binding Nanostructure-Ended Double-Stranded Covalently-Closed Linear DNA Molecule-Mediated Aptafluorescence Proof-of-Concept Assay As it was described as a possible embodiment of the present inventions, fluorophore-binding nanostructure-ended double-stranded covalently-closed linear DNA molecules bear a central double-stranded linear DNA linker, comprising a Spacer Sequence (non expressing DNA sequence) inserted in the multiple cloning site flanked by two nanostructured ends. One of the ends is a fluorescent aptamer thanks to its capability of specifically binding a bright fluorophore. The other end is an aptamer capable of specific recognition and binding to a molecular target, like a protein, carbohydrate, lipid, or any other molecule of interest. The resulting nanostructure-ended double-stranded covalently-closed linear DNA molecules would be useful for fluorescent staining of specific molecules, like what is achieved during direct immunofluorescence protocols.

As a proof-of-concept of the hereinafter called single-step aptafluorescence method and of the fluorophore-binding nanostructure-ended double-stranded covalently-closed linear DNA molecular tool itself, a nanostructure-ended double-stranded covalently-closed linear DNA molecule was generated, where one of the aptameric ends is a DNA aptamer well known in the art which spontaneously binds to auramine O (AO; a diarylmethane dye), enhancing its fluorescence by 100 fold. The other end was engineered to be an aptamer showing rabies virus glycoprotein (RVGP) specific recognition and binding. A schematic representation of three different nanostructure-ended double-stranded covalently-closed linear DNA molecules assayed for the fluorescent staining of cells expressing a specific protein on their surface are shown in FIG. 12.

After transfection of cultured BHK-21 cells with an expression plasmid encoding RVGP, cells were stained with the anti-RVGP, AO-binding, nanostructure-ended double-stranded covalently-closed linear DNA molecule (molecule A, on FIG. 12), a control nanostructure-ended double-stranded covalently-closed linear DNA molecule bearing only the RVGP aptamer on one of its ends and a closed loop on the other end (molecule B on FIG. 12), or a nanostructure-ended double-stranded covalently-closed linear DNA molecule bearing a fluorescent aptamer on one of its ends and a closed loop on the other end (molecule C on FIG. 12).

FIG. 13 shows the aptafluorescence results on RVGP-transfected HEK-293 cells, demonstrating that binding and fluorescence is specific and that it is due to the described features of the corresponding nanostructure-ended double-stranded covalently-closed linear DNA molecules.

The images show that only Type A fluorophore-binding nanostructure-ended double-stranded covalently-closed linear DNA molecules are capable of rendering RVGP-expressing BHK-21 cells fluorescent.

4. Bi-Specific Nanostructure-Ended Double-Stranded Covalently-Closed Linear DNA Molecule-Mediated Cell-Cell Binding Proof-of-Concept Assay Bi-specific nanostructure-ended double-stranded covalently-closed linear DNA molecules can be designed to provide bi-functional specific recognition and binding between two molecular or cellular targets. As a proof-of-concept of this functionality of the nanostructure-ended double-stranded covalently-closed linear DNA molecules of the present invention, a Bi-specific nanostructure-ended double-stranded covalently-closed linear DNA molecule bearing an anti-CD3 specific aptamer on one end and an anti-fibronectin receptor specific aptamer on the other end (FIG. 14) is provided, to bring together T-Cell lymphocytes and NIH3T3 fibroblasts. FIG. 15 shows the cell-to-cell linkage results using the bi-specific nanostructure-ended double-stranded covalently-closed linear DNA molecule of FIG. 14, demonstrating that the bi-specific nanostructure-ended double-stranded covalently-closed linear DNA molecule is capable of bringing CTLs and Fibroblasts together, emulating the capabilities of bi-specific antibodies. T-cell lymphocytes were transfected with a construct expressing RFP and NIH3T3 fibroblasts were transfected with a plasmid expressing GFP. Cells were detached from their respective plates, and subsequently resuspended together. The bi-specific nanostructure-ended double-stranded covalently-closed linear DNA molecule was added immediately to provoke association of the two cell types, which can be visualized in the colocalization events.

5. Transfection and Gene Expression Assay by Using TrEx Nanostructure-Ended Double-Stranded Covalently-Closed Linear DNA Molecules The TrEx nanostructure-ended double-stranded covalently-closed linear DNA molecule has a central double-stranded linear DNA linker, comprising an expression cassette inserted in the multiple cloning site flanked by functional aptamers which confer cell-specific transfection capabilities and endosomal escape activities. Thus TrEx nanostructure-ended double-stranded covalently-closed linear DNA molecules do not require extra delivery agents for achieving cell transformation and efficient expression of an encoded transgene.

However, according to some embodiments, the DNA construct of the present invention may be combined with substances that can facilitate the uptake of exogenous nucleic acids by cells, such as—but not limited to—polyethylenimine, bupivacaine, chitosan or poly-L-lysine, e.g. by inducing endocytosis and/or any other plasma membrane-borne mechanism involving structural rearrangements of the lipid bilayer which allow external molecules to gain access to the cell's interior.

In further embodiments, formulations of the present invention can also include substances that promote endosomal structural instability allowing for the nucleic acid construct to escape this compartment towards the cytosol.

Additionally, the expression cassette bears sequences that maximize nuclear localization and stable episomal maintenance of the DNA for long periods of time. This makes TrEx molecules ideal for gene therapy approaches that require sustainable and efficient expression of a therapeutic gene.

In this experiment, the four TrEx nanostructure-ended double-stranded covalently-closed linear DNA molecules shown in FIG. 16 were assayed. Briefly, Jurkat cells (T-cell lymphocytes or TCLs) were treated with a full TrEx molecule (Molecule A), bearing an anti-CD3 aptamer for specific transfection of TCLs on one end, and an anti-HSA aptamer for association to this abundant serum protein on the other end, which serves later as a proton sponge for endosomal escape once the complex is taken up by cells after endocytosis ensued. Molecule B represents a control molecule only displaying CD3-specific binding but no binding to HSA. Molecule C is a control molecule only having HSA-specific binding but no CD3-specific binding, and molecule D is a control molecule having no specific binding neither to CD3 nor to HSA. All molecules bear a green fluorescent protein expression cassette inserted into their linear DNA module. Preferably, the sequence of the green fluorescent protein expression cassette is SEQ ID NO 13.

When cells are exposed to the full TrEx nanostructure-ended double-stranded covalently-closed linear DNA molecules, the target cell type (TCL) is transfected, demonstrating the functionality of the delivery system produced by the present invention (FIG. 17). Jurkat cells were treated with the molecules described in FIG. 14. GFP expression is observed only in molecule A treated cells, demonstrating the transfection and expression capabilities of the TrEx nanostructure-ended double-stranded covalently-closed linear DNA molecules. TrEx nanostructure-ended double-stranded covalently-closed linear DNA molecules, lacking an endosomal escape-enhancing HSA-binding aptamer, are only able to reach a minimum expression efficiency compared to full TrEx molecules. TrEx nanostructure-ended double-stranded covalently-closed linear DNA C molecules, bearing only an endosomal escape-enhancing aptamer, but lacking a specific cell binding aptamer, or even TrEx nanostructure-ended double-stranded covalently-closed linear DNA D molecules, devoid of both aptamers, fail to transform the cells.

Statement of No New Matter

Applicant hereby states that the Substitute Specification, including all the amendments shown in the marked-up and clean versions, contains no new matter under 35 U.S.C. § 132 and 37 C.F.R. §§ 1.121 and 1.125.

```
SEQUENCES
SEQ ID NO 1
LENGTH: 6866
TYPE: DNA
ORGANISM: Artificial
FEATURE: Parental Plasmid
OTHER INFORMATION: Parental Plasmid - Main embodiment
SEQUENCE:
ACGCGATCGCTGTTAAAAGGACAATTACAAACAGGAATCGAATGCAACCGGCGC

AGGAACACTGCCAGCGCATCAACAATATTTTCACCTGAATCAGGATATTCTTCTA

ATACCTGGAATGCTGTTTTCCCAGGGATCGCAGTGGTGAGTAACCATGCATCATC

AGGAGTACGGATAAAATGCTTGATGGTCGGAAGAGGCATAAATTCCGTCAGCCA

GTTTAGTCTGACCATCTCATCTGTAACATCATTGGCAACGCTACCTTTGCCATGTT

TCAGAAACAACTCTGGCGCATCGGGCTTCCCATACAATCGATAGATTGTCGCACC

TGATTGCCCGACATTATCGCGAGCCCATTTATACCCATATAAATCAGCATCCATG

TTGGAATTTAATCGCGGCCTAGAGCAAGACGTTTCCCGTTGAATATGGCTCATAC

TCTTCCTTTTTCAATATTATTGAAGCATTTATCAGGGTTATTGTCTCATGAGCGGA

TACATATTTGAATGTATTTAGAAAAATAAACAAATAGGGGTTCCGCGCACATTTC

CCCGAAAAGTGCCACCTGACGTCGATGAGCTCTTGACAGCTAGCTCAGTCCTAGG

TATAATGCTAGCTACTAGATGCGCACCCTTAGCGAGAGGTTTATCATTAAGGTCA

ACCTCTGGATGTTGTTTCGGCATCCTGCATTGAATCTGAGTTACTGTCTGTTTTCC

TACCACTTTGTACAAGAAAGCTGGGTGATATCACCCAGCTTTCTTGTACAAAGTG

GTCAGGAAACCCGTTTTTTCTGTCTACTAGAGCCAGGCATCAAATAAAACGAAAG

GCTCAGTCGAAAGACTGGGCCTTTCGTTTTATCTGTTGTTTGTCGGTGAACGCTCT

CTACTAGAGTCACACTGGCTCACCTTCGGGTGGGCCTTTCTGCGTTTGGTACCAT

ATTGACAGCTAGCTCAGTCCTAGGTATAATGCTAGCATGCGCACCCTTAGCGAGA

GGTTTATCATTAAGGTCAACCTCTGGATGTTGTTTCGGCATCCTGCATTGAATCTG

AGTTACTGTCTGTTTTCCTACAAGTTTGTACAAAAAAGCAGGCTCAGCTGAGCCT

GCTTTTTTGTACAAACTTGTCAGGAAACCCGTTTTTTCTGTCTACTAGAGCCAGGC

ATCAAATAAAACGAAAGGCTCAGTCGAAAGACTGGGCCTTTCGTTTTATCTGTTG

TTTGTCGGTGAACGCTCTCTACTAGAGTCACACTGGCTCACCTTCGGGTGGGCCT

TTCTGCGCTGTTATCCCAGATAAACTCAATGATGATGATGATGGTCGAGACT

CACCCGGGGCGGCCGCTATCAGCACACAATAGTCCATTATACGCGCGTATAATG

GCAATTGTGTGCTGAAAATAATGATTTTATTTTGACTGATAGTGACCTGTTCGTTG

CAACAAATTGATAAGCAATGCTTTCTTATAATGCCAACTTTGTACAAGAAAGCTG

AACGAGAAACGTAAAATGATATAAATATCAATATATTAAATTAGATTTTGCATAA
```

-continued

```
AAAACAGACTACATAATACTGTAAAACACAACATATCCAGTCACTATGAATCAA
CTACTTAGATGGTATTAGTGACCTGTACGCCGGCGAGGCCTACCGGTTGGTGTGG
AAAGTCCCCAGGCTCCCCAGCAGGCAGAAGTATGCAAAGCATGCATCTCAATTA
GTCAGCAACCAGCATGCATGCATTGGTGTGGAAAGTCCCCAGGCTCCCCAGCAG
GCAGAAGTATGCAAAGCATGCATCTCAATTAGTCAGCAACCAGCATGCATGCAT
CTATCCATAGCTGATTGGTCTAAAATGAGATACATCAACGCTCCTCCATGTTTTT
GTTTTCTTTTTAAATGAAAAACTTTATTTTTTAAGAGGAGTTTCAGGTTCATAGCA
AAATTGAGAGGAAGGTACATTCAAGCTGAGGAAGTTTTCCTCTATTCCTAGTTTA
CTGAGAGATTGCATCATGAATGGGTGTTAAATTTTGTCAAATGCTTTTTCTGTGTC
TATCAATATGACCATGTGATTTTCTTCTTTAACCTGTTGATGGGACAAATTACGTT
AATTGATTTTCAAACGTTGAACCACCCTTACATATCTGGAATAAATTCTACTTGGT
TGTGGTGTATATTTTTTGATACATTCTTGGATTCTTTTTGCTAATATTTTGTTGAAA
ATGTTTGTATCTTTGTTCATGAGAGATATTGGTCTGTTGTTTTCTTTTCTTGTAATG
TCATTTTCTAGTTCCGGTATTAAGGTAATGCTGGCCTAGTTGAATGATTTAGGAA
GTATTCCCTCTGCTTCTGTCTTCTGAAAGAGATTGTAGAAAGTTGATACAATTTTT
TTTTCTTTAAATATCTTGATAGGTGGCTATGGCAGGGCTTGCCGCCCCGACGTTG
GCTGCGAGCCCTGGGCCTTCACCCGAACTTGGGGGTTGGGGTGGGAAAAGGAA
GAAACGCGGGCGTATTGGTCCCAATGGGGTCTCGGTGGGGTATCGACAGAGTGC
CAGCCCTGGGACCGAACCCCGCGTTTATGAACAAACGACCCAACACCCGTGCGT
TTTATTCTGTCTTTTTATTGCCGTCATAGCGCGGGTTCCTTCCGGTATTGTCTCCTT
CCGTGTTTCAGTTAGCCTCCCCCATCTCCCGCTCGAGCTGCAGGAATTCCTAGTTA
TTAATAGTAATCAATTACGGGGTCATTAGTTCATAGCCCATATATGGAGTTCCGC
GTTACATAACTTACGGTAAATGGCCCGCCTGGCTGACCGCCCAACGACCCCCGCC
CATTGACGTCAATAATGACGTATGTTCCCATAGTAACGCCAATAGGGACTTTCCA
TTGACGTCAATGGGTGGAGTATTTACGGTAAACTGCCCACTTGGCAGTACATCAA
GTGTATCATATGCCAAGTACGCCCCCTATTGACGTCAATGACGGTAAATGGCCCG
CCTGGCATTATGCCCAGTACATGACCTTATGGGACTTTCCTACTTGGCAGTACAT
CTACGTATTAGTCATCGCTATTACCATGGTGATGCGGTTTTGGCAGTACATCAAT
GGGCGTGGATAGCGGTTTGACTCACGGGGATTTCCAAGTCTCCACCCCATTGACG
TCAATGGGAGTTTGTTTTGGCACCAAAATCAACGGGACTTTCCAAAATGTCGTAA
CAACTCCGCCCCATTGACGCAAATGGGCGGTAGGCGTGTACGGTGGGAGGTCTA
TATAAGCAGAGCTGGTTTAGTGAACCGTCAGATCAGATCTACCATGGTGAGCAA
GGGCGAGGAGCTGTTCACCGGGGTGGTGCCCATCCTGGTCGAGCTGGACGGCGA
CGTAAACGGCCACAAGTTCAGCGTGTCCGGCGAGGGCGAGGGCGATGCCACCTA
CGGCAAGCTGACCCTGAAGTTCATCTGCACCACCGGCAAGCTGCCCGTGCCCTGG
CCCACCCTCGTGACCACCCTGACCTACGGCGTGCAGTGCTTCAGCCGCTACCCCG
ACCACATGAAGCAGCACGACTTCTTCAAGTCCGCCATGCCCGAAGGCTACGTCCA
GGAGCGCACCATCTTCTTCAAGGACGACGGCAACTACAAGACCCGCGCCGAGGT
GAAGTTCGAGGGCGACACCCTGGTGAACCGCATCGAGCTGAAGGGCATCGACTT
CAAGGAGGACGGCAACATCCTGGGGCACAAGCTGGAGTACAACTACAACAGCCA
```

-continued

```
CAACGTCTATATCATGGCCGACAAGCAGAAGAACGGCATCAAGGTGAACTTCAA

GATCCGCCACAACATCGAGGACGGCAGCGTGCAGCTCGCCGACCACTACCAGCA

GAACACCCCCATCGGCGACGGCCCCGTGCTGCTGCCCGACAACCACTACCTGAG

CACCCAGTCCGCCCTGAGCAAAGACCCCAACGAGAAGCGCGATCACATGGTCCT

GCTGGAGTTCGTGACCGCCGCCGGGATCACTCTCGGCATGGACGAGCTGTACAA

GTAAGCGGCCGCTTTCGAATCTAGAGCCTGCAGTCTCGACAAGCTTGTCGAGAAG

TACTAGAGGATCATAATCAGCCATACCACATTTGTAGAGGTTTTACTTGCTTTAA

AAAACCTCCCACACCTCCCCCTGAACCTGAAACATAAAATGAATGCAATTGTTGT

TGTTAACTTGTTTATTGCAGCTTATAATGGTTACAAATAAAGCAATAGCATCACA

AATTTCACAAATAAAGCATTTTTTTCACTGCATTCTAGTTGTGGTTTGTCCAAACT

CATCAATGTATCTTATCATGTCTGGATCGCTAGCTCTAGAGTCGACGATCATAAT

CAGCCATACCACATTTGTAGAGGTTTTACTTGCTTTAAAAAACCTCCCACACCTC

CCCCTGAACCTGAAACATAAAATGAATGCAATTGTTGTTGTTAACTTGTTTATTG

CAGCTTATAATGGTTACAAATAAAGCAATAGCATCACAAATTTCACAAATAAAG

CATTTTTTTCACTGCATTCTAGTTGTGGTTTGTCCAAACTCATCAATGTATCTTATC

ATGTCTGGATCCTATCCATAGCTGATTGGTCTAAAATGAGATACATCAACGCTCC

TCCATGTTTTTGTTTCTTTTTAAATGAAAAACTTTATTTTTTAAGAGGAGTTTCA

GGTTCATAGCAAAATTGAGAGGAAGGTACATTCAAGCTGAGGAAGTTTTCCTCTA

TTCCTAGTTTACTGAGAGATTGCATCATGAATGGGTGTTAAATTTTGTCAAATGCT

TTTTCTGTGTCTATCAATATGACCATGTGATTTTCTTCTTTAACCTGTTGATGGGA

CAAATTACGTTAATTGATTTTCAAACGTTGAACCACCCTTACATATCTGGAATAA

ATTCTACTTGGTTGTGGTGTATATTTTTTGATACATTCTTGGATTCTTTTTGCTAAT

ATTTTGTTGAAAATGTTTGTATCTTTGTTCATGAGAGATATTGGTCTGTTGTTTTCT

TTTCTTGTAATGTCATTTTCTAGTTCCGGTATTAAGGTAATGCTGGCCTAGTTGAA

TGATTTAGGAAGTATTCCCTCTGCTTCTGTCTTCTGAAAGAGATTGTAGAAAGTT

GATACAATTTTTTTTCTTTAAATATCTTGATAGGCACGCATGCATTGGTGTGGAA

AGTCCCCAGGCTCCCCAGCAGGCAGAAGTATGCAAAGCATGCATCTCAATTAGT

CAGCAACCAGCATGCATGCATTGGTGTGGAAAGTCCCCAGGCTCCCCAGCAGGC

AGAAGTATGCAAAGCATGCATCTCAATTAGTCAGCAACCAACCGGTAGGCCTCG

CCGGCGAATAATGATTTTATTTTGACTGATAGTGACCTGTTCGTTGCAACAAAT

TGATGAGCAATGCTTTTTTATAATGCCAACTTTGTACAAAAAAGCTGAACGAGAA

ACGTAAAATGATATAAATATCAATATATTAAATTAGATTTTGCATAAAAAACAGA

CTACATAATACTGTAAAACACAACATATCCAGTCACTATGAATCAACTACTTAGA

TGGTATTAGTGACCTGTATATCAGCACACAATAGTCCATTATACGCGCGTATAAT

GGCAATTGTGTGCTGAGGGGATAACGCAGGAAAGAACATGTACTAGTATCACAT

GTGAGCAAAAGGCCAGCAAAAGGCCAGGAACCGTAAAAAGGCCGCGTTGCTGG

CGTTTTTCCATAGGCTCCGCCCCCCTGACGAGCATCACAAAAATCGACGCTCAAG

TCAGAGGTGGCGAAACCCGACAGGACTATAAAGATACCAGGCGTTTCCCCCTGG

AAGCTCCCTCGTGCGCTCTCCTGTTCCGACCCTGCCGCTTACCGGATACCTGTCCG

CCTTTCTCCCTTCGGGAAGCGTGGCGCTTTCTCATAGCTCACGCTGTAGGTATCTC

AGTTCGGTGTAGGTCGTTCGCTCCAAGCTGGGCTGTGTGCACGAACCCCCCGTTC
```

```
AGCCCGACCGCTGCGCCTTATCCGGTAACTATCGTCTTGAGTCCAACCCGGTAAG
ACACGACTTATCGCCACTGGCAGCAGCCACTGGTAACAGGATTAGCAGAGCGAG
GTATGTAGGCGGTGCTACAGAGTTCTTGAAGTGGTGGCCTAACTACGGCTACACT
AGAAGAACAGTATTTGGTATCTGCGCTCTGCTGAAGCCAGTTACCTTCGGAAAAA
GAGTTGGTAGCTCTTGATCCGGCAAACAAACCACCGCTGGTAGCGGTGGTTTTTT
TGTTTGCAAGCAGCAGATTACGCGCAGAAAAAAAGGATCTCAAGAAGATCCTTT
GATCTTTTCTACGGGGTCTGACGCTCAGTGGAACGAAAACTCACGTTAAGGGATT
TTGGTCATGAGATTATCAAAAAGGATCTTCACCTAGATCCTTTTAAATTAAAAAT
GAAGTTTTAAATCAATCTAAAGTATATATGAGTAAACTTGGTCTGACAGTTAGAA
AAACTCATCGAGCATCAAATGAAACTGCAATTTATTCATATCAGGATTATCAATA
CCATATTTTTGAAAAAGCCGTTTCTGTAATGAAGGAGAAAACTCACCGAGGCAGT
TCCATAGGATGGCAAGATCCTGGTATCGGTCTGCGATTCCGACTCGTCCAACATC
AATACAACCTATTAATTTCCCCTCGTCAAAAATAAGGTTATCAAGTGAGAAATCA
CCATGAGTGACGACTGAATCCGGTGAGAATGGCAAAAGTTTATGCATTTCTTTCC
AGACTTGTTCAACAGGCCAGCCATTACGCTCGTCATCAAAATCACTCGCATCAAC
CAAACCGTTATTCATTCGTGATTGCGCCTGAGCGAAACGAAAT

SEQ ID NO 2
LENGTH: 35
TYPE: DNA
ORGANISM: Artificial
FEATURE: Strong Constitutive Bacterial Promoter
OTHER INFORMATION: J23119 Promoter
SEQUENCE:
TTGACAGCTAGCTCAGTCCTAGGTATAATGCTAGC SEQ ID NO 3
LENGTH: 28
TYPE: DNA
ORGANISM: Artificial
FEATURE: Rho Independent Bacterial Terminator Sequence from
Phage T7
OTHER INFORMATION: Terminator
SEQUENCE:
GGCTCACCTTCGGGTGGGCCTTTCTGCG SEQ ID NO 4
LENGTH: 25
TYPE: DNA
ORGANISM: Artificial
FEATURE: Recombinase Recognition Sequence
OTHER INFORMATION: AttB1 Recombination Sequence
SEQUENCE:
ACAAGTTTGTACAAAAAAGCAGGCT SEQ ID NO 5
LENGTH: 25
TYPE: DNA
ORGANISM: Artificial
FEATURE: Recombinase Recognition Sequence
OTHER INFORMATION: AttB2 Recombination Sequence
SEQUENCE:
ACCCAGCTTTCTTGTACAAAGTGGT SEQ ID NO 6
LENGTH: 232
TYPE: DNA
ORGANISM: Artificial
FEATURE: Recombinase Recognition Sequence
OTHER INFORMATION: AttP1 Recombination Sequence
SEQUENCE:
AAATAATGATTTTATTTTGACTGATAGTGACCTGTTCGTTGCAACAAATTGATGA
GCAATGCTTTTTTATAATGCCAACTTTGTACAAAAAAGCTGAACGAGAAACGTAA
```

-continued

AATGATATAAATATCAATATATTAAATTAGATTTTGCATAAAAAACAGACTACAT

AATACTGTAAAACACAACATATCCAGTCACTATGAATCAACTACTTAGATGGTAT

TAGTGACCTGTA

SEQ ID NO 7
LENGTH: 232
TYPE: DNA
ORGANISM: Artificial
FEATURE: Recombinase Recognition Sequence
OTHER INFORMATION: AttP2 Recombination Sequence
SEQUENCE:
AAATAATGATTTTATTTTGACTGATAGTGACCTGTTCGTTGCAACAAATTGATAA

GCAATGCTTTCTTATAATGCCAACTTTGTACAAGAAAGCTGAACGAGAAACGTAA

AATGATATAAATATCAATATATTAAATTAGATTTTGCATAAAAAACAGACTACAT

AATACTGTAAAACACAACATATCCAGTCACTATGAATCAACTACTTAGATGGTAT

TAGTGACCTGTA

SEQ ID NO 8
LENGTH: 816
TYPE: DNA
ORGANISM: Artificial
FEATURE: Bacterial Selection Marker Gene
OTHER INFORMATION: Kanamycin Resistance gene
SEQUENCE:
TTAGAAAAACTCATCGAGCATCAAATGAAACTGCAATTTATTCATATCAGGATTA

TCAATACCATATTTTTGAAAAAGCCGTTTCTGTAATGAAGGAGAAAACTCACCGA

GGCAGTTCCATAGGATGGCAAGATCCTGGTATCGGTCTGCGATTCCGACTCGTCC

AACATCAATACAACCTATTAATTTCCCCTCGTCAAAAATAAGGTTATCAAGTGAG

AAATCACCATGAGTGACGACTGAATCCGGTGAGAATGGCAAAAGTTTATGCATT

TCTTTCCAGACTTGTTCAACAGGCCAGCCATTACGCTCGTCATCAAAATCACTCG

CATCAACCAAACCGTTATTCATTCGTGATTGCGCCTGAGCGAAACGAAATACGCG

ATCGCTGTTAAAAGGACAATTACAAACAGGAATCGAATGCAACCGGCGCAGGAA

CACTGCCAGCGCATCAACAATATTTTCACCTGAATCAGGATATTCTTCTAATACC

TGGAATGCTGTTTTCCCAGGGATCGCAGTGGTGAGTAACCATGCATCATCAGGAG

TACGGATAAAATGCTTGATGGTCGGAAGAGGCATAAATTCCGTCAGCCAGTTTA

GTCTGACCATCTCATCTGTAACATCATTGGCAACGCTACCTTTGCCATGTTTCAGA

AACAACTCTGGCGCATCGGGCTTCCCATACAATCGATAGATTGTCGCACCTGATT

GCCCGACATTATCGCGAGCCCATTTATACCCATATAAATCAGCATCCATGTTGGA

ATTTAATCGCGGCCTAGAGCAAGACGTTTCCCGTTGAATATGGCTCAT

SEQ ID NO 9
LENGTH: 589
TYPE: DNA
ORGANISM: Artificial
FEATURE: Bacterial Origin of Replication
OTHER INFORMATION: pMB1 Origin of Replication
SEQUENCE:
TTTCCATAGGCTCCGCCCCCCTGACGAGCATCACAAAAATCGACGCTCAAGTCAG

AGGTGGCGAAACCCGACAGGACTATAAAGATACCAGGCGTTTCCCCCTGGAAGC

TCCCTCGTGCGCTCTCCTGTTCCGACCCTGCCGCTTACCGGATACCTGTCCGCCTT

TCTCCCTTCGGGAAGCGTGGCGCTTTCTCATAGCTCACGCTGTAGGTATCTCAGTT

CGGTGTAGGTCGTTCGCTCCAAGCTGGGCTGTGTGCACGAACCCCCCGTTCAGCC

CGACCGCTGCGCCTTATCCGGTAACTATCGTCTTGAGTCCAACCCGGTAAGACAC

GACTTATCGCCACTGGCAGCAGCCACTGGTAACAGGATTAGCAGAGCGAGGTAT

-continued
```
GTAGGCGGTGCTACAGAGTTCTTGAAGTGGTGGCCTAACTACGGCTACACTAGA

AGAACAGTATTTGGTATCTGCGCTCTGCTGAAGCCAGTTACCTTCGGAAAAAGAG

TTGGTAGCTCTTGATCCGGCAAACAAACCACCGCTGGTAGCGGTGGTTTTTTTGT

TTGCAAGCAGCAGATTACGCGCAGAAAAAAAGGATCTCAA

SEQ ID NO 10
LENGTH: 18
TYPE: DNA
ORGANISM: Artificial
FEATURE: Endonuclease Recognition Sequence
OTHER INFORMATION: I-SceI Recognition Sequence
SEQUENCE:
TAGGGATAACAGGGTAAT SEQ ID NO 11
LENGTH: 3683
TYPE: DNA
ORGANISM: Artificial
FEATURE: Expression cassette
OTHER INFORMATION: Possible expression cassette in Parental
Plasmid
SEQUENCE:
TGGTGTGGAAAGTCCCCAGGCTCCCCAGCAGGCAGAAGTATGCAAAGCATGCAT

CTCAATTAGTCAGCAACCAGCATGCATGCATTGGTGTGGAAAGTCCCCAGGCTCC

CCAGCAGGCAGAAGTATGCAAAGCATGCATCTCAATTAGTCAGCAACCAGCATG

CATGCATCTATCCATAGCTGATTGGTCTAAAATGAGATACATCAACGCTCCTCCA

TGTTTTTTGTTTTCTTTTTAAATGAAAAACTTTATTTTTTAAGAGGAGTTTCAGGTT

CATAGCAAAATTGAGAGGAAGGTACATTCAAGCTGAGGAAGTTTTCCTCTATTCC

TAGTTTACTGAGAGATTGCATCATGAATGGGTGTTAAATTTTGTCAAATGCTTTTT

CTGTGTCTATCAATATGACCATGTGATTTTCTTCTTTAACCTGTTGATGGGACAAA

TTACGTTAATTGATTTTCAAACGTTGAACCACCCTTACATATCTGGAATAAATTCT

ACTTGGTTGTGGTGTATATTTTTTGATACATTCTTGGATTCTTTTTGCTAATATTTT

GTTGAAAATGTTTGTATCTTTGTTCATGAGAGATATTGGTCTGTTGTTTTCTTTTCT

TGTAATGTCATTTTCTAGTTCCGGTATTAAGGTAATGCTGGCCTAGTTGAATGATT

TAGGAAGTATTCCCTCTGCTTCTGTCTTCTGAAAGAGATTGTAGAAAGTTGATAC

AATTTTTTTTTCTTTAAATATCTTGATAGGTGGCTATGGCAGGGCTTGCCGCCCCG

ACGTTGGCTGCGAGCCCTGGGCCTTCACCCGAACTTGGGGGTTGGGGTGGGGAA

AAGGAAGAAACGCGGGCGTATTGGTCCCAATGGGGTCTCGGTGGGGTATCGACA

GAGTGCCAGCCCTGGGACCGAACCCCGCGTTTATGAACAAACGACCCAACACCC

GTGCGTTTTATTCTGTCTTTTTATTGCCGTCATAGCGCGGGTTCCTTCCGGTATTGT

CTCCTTCCGTGTTTCAGTTAGCCTCCCCCATCTCCCGCTCGAGCTGCAGGAATTCC

TAGTTATTAATAGTAATCAATTACGGGGTCATTAGTTCATAGCCCATATATGGAG

TTCCGCGTTACATAACTTACGGTAAATGGCCCGCCTGGCTGACCGCCCAACGACC

CCCGCCCATTGACGTCAATAATGACGTATGTTCCCATAGTAACGCCAATAGGGAC

TTTCCATTGACGTCAATGGGTGGAGTATTTACGGTAAACTGCCCACTTGGCAGTA

CATCAAGTGTATCATATGCCAAGTACGCCCCCTATTGACGTCAATGACGGTAAAT

GGCCCGCCTGGCATTATGCCCAGTACATGACCTTATGGGACTTTCCTACTTGGCA

GTACATCTACGTATTAGTCATCGCTATTACCATGGTGATGCGGTTTTGGCAGTAC

ATCAATGGGCGTGGATAGCGGTTTGACTCACGGGGATTTCCAAGTCTCCACCCCA

TTGACGTCAATGGGAGTTTGTTTTGGCACCAAAATCAACGGGACTTTCCAAAATG
```

```
TCGTAACAACTCCGCCCCATTGACGCAAATGGGCGGTAGGCGTGTACGGTGGGA

GGTCTATATAAGCAGAGCTGGTTTAGTGAACCGTCAGATCAGATCTACCATGGTG

AGCAAGGGCGAGGAGCTGTTCACCGGGGTGGTGCCCATCCTGGTCGAGCTGGAC

GGCGACGTAAACGGCCACAAGTTCAGCGTGTCCGGCGAGGGCGAGGGCGATGCC

ACCTACGGCAAGCTGACCCTGAAGTTCATCTGCACCACCGGCAAGCTGCCCGTGC

CCTGGCCCACCCTCGTGACCACCCTGACCTACGGCGTGCAGTGCTTCAGCCGCTA

CCCCGACCACATGAAGCAGCACGACTTCTTCAAGTCCGCCATGCCCGAAGGCTAC

GTCCAGGAGCGCACCATCTTCTTCAAGGACGACGGCAACTACAAGACCCGCGCC

GAGGTGAAGTTCGAGGGCGACACCCTGGTGAACCGCATCGAGCTGAAGGGCATC

GACTTCAAGGAGGACGGCAACATCCTGGGGCACAAGCTGGAGTACAACTACAAC

AGCCACAACGTCTATATCATGGCCGACAAGCAGAAGAACGGCATCAAGGTGAAC

TTCAAGATCCGCCACAACATCGAGGACGGCAGCGTGCAGCTCGCCGACCACTAC

CAGCAGAACACCCCCATCGGCGACGGCCCCGTGCTGCTGCCCGACAACCACTAC

CTGAGCACCCAGTCCGCCCTGAGCAAAGACCCCAACGAGAAGCGCGATCACATG

GTCCTGCTGGAGTTCGTGACCGCCGCCGGGATCACTCTCGGCATGGACGAGCTGT

ACAAGTAAGCGGCCGCTTTCGAATCTAGAGCCTGCAGTCTCGACAAGCTTGTCGA

GAAGTACTAGAGGATCATAATCAGCCATACCACATTTGTAGAGGTTTTACTTGCT

TTAAAAAACCTCCCACACCTCCCCCTGAACCTGAAACATAAAATGAATGCAATTG

TTGTTGTTAACTTGTTTATTGCAGCTTATAATGGTTACAAATAAAGCAATAGCATC

ACAAATTTCACAAATAAAGCATTTTTTTCACTGCATTCTAGTTGTGGTTTGTCCAA

ACTCATCAATGTATCTTATCATGTCTGGATCGCTAGCTCTAGAGTCGACGATCAT

AATCAGCCATACCACATTTGTAGAGGTTTTACTTGCTTTAAAAAACCTCCCACAC

CTCCCCCTGAACCTGAAACATAAAATGAATGCAATTGTTGTTGTTAACTTGTTTAT

TGCAGCTTATAATGGTTACAAATAAAGCAATAGCATCACAAATTTCACAAATAA

AGCATTTTTTTCACTGCATTCTAGTTGTGGTTTGTCCAAACTCATCAATGTATCTT

ATCATGTCTGGATCCTATCCATAGCTGATTGGTCTAAAATGAGATACATCAACGC

TCCTCCATGTTTTTGTTTTCTTTTTAAATGAAAAACTTTATTTTTTAAGAGGAGTT

TCAGGTTCATAGCAAAATTGAGAGGAAGGTACATTCAAGCTGAGGAAGTTTTCCT

CTATTCCTAGTTTACTGAGAGATTGCATCATGAATGGGTGTTAAATTTTGTCAAAT

GCTTTTTCTGTGTCTATCAATATGACCATGTGATTTTCTTCTTTAACCTGTTGATGG

GACAAATTACGTTAATTGATTTTCAAACGTTGAACCACCCTTACATATCTGGAAT

AAATTCTACTTGGTTGTGGTGTATATTTTTTGATACATTCTTGGATTCTTTTTGCTA

ATATTTTGTTGAAAATGTTTGTATCTTTGTTCATGAGAGATATTGGTCTGTTGTTT

TCTTTTCTTGTAATGTCATTTTCTAGTTCCGGTATTAAGGTAATGCTGGCCTAGTT

GAATGATTTAGGAAGTATTCCCTCTGCTTCTGTCTTCTGAAAGAGATTGTAGAAA

GTTGATACAATTTTTTTTCTTTAAATATCTTGATAGGCACGCATGCATTGGTGTG

GAAAGTCCCCAGGCTCCCCAGCAGGCAGAAGTATGCAAAGCATGCATCTCAATT
```

-continued
AGTCAGCAACCAGCATGCATGCATTGGTGTGGAAAGTCCCCAGGCTCCCCAGCA

GGCAGAAGTATGCAAAGCATGCATCTCAATTAGTCAGCAACCA

SEQ ID NO 12
LENGTH: 589
TYPE: DNA
ORGANISM: Artificial
FEATURE: Eukaryotic Promoter/enhancer
OTHER INFORMATION: human cytomegalovirus (CMV) immediate-
early enhancer and promoter (pCMV)
SEQUENCE:
CTAGTTATTAATAGTAATCAATTACGGGGTCATTAGTTCATAGCCCATATATGGA

GTTCCGCGTTACATAACTTACGGTAAATGGCCCGCCTGGCTGACCGCCCAACGAC

CCCCGCCCATTGACGTCAATAATGACGTATGTTCCCATAGTAACGCCAATAGGGA

CTTTCCATTGACGTCAATGGGTGGAGTATTTACGGTAAACTGCCCACTTGGCAGT

ACATCAAGTGTATCATATGCCAAGTACGCCCCCTATTGACGTCAATGACGGTAAA

TGGCCCGCCTGGCATTATGCCCAGTACATGACCTTATGGGACTTTCCTACTTGGC

AGTACATCTACGTATTAGTCATCGCTATTACCATGGTGATGCGGTTTTGGCAGTA

CATCAATGGGCGTGGATAGCGGTTTGACTCACGGGGATTTCCAAGTCTCCACCCC

ATTGACGTCAATGGGAGTTTGTTTTGGCACCAAAATCAACGGGACTTTCCAAAAT

GTCGTAACAACTCCGCCCCATTGACGCAAATGGGCGGTAGGCGTGTACGGTGGG

AGGTCTATATAAGCAGAGCTGGTTTAGTGAACCGTCAGAT

SEQ ID NO 13
LENGTH: 720
TYPE: DNA
ORGANISM: Artificial
FEATURE: Fluorescent Reporter Sequence
OTHER INFORMATION: Enhanced Green Fluorescence Protein (EGFP)
SEQUENCE:
ATGGTGAGCAAGGGCGAGGAGCTGTTCACCGGGGTGGTGCCCATCCTGGTCGAG

CTGGACGGCGACGTAAACGGCCACAAGTTCAGCGTGTCCGGCGAGGGCGAGGGC

GATGCCACCTACGGCAAGCTGACCCTGAAGTTCATCTGCACCACCGGCAAGCTGC

CCGTGCCCTGGCCCACCCTCGTGACCACCCTGACCTACGGCGTGCAGTGCTTCAG

CCGCTACCCCGACCACATGAAGCAGCACGACTTCTTCAAGTCCGCCATGCCCGAA

GGCTACGTCCAGGAGCGCACCATCTTCTTCAAGGACGACGGCAACTACAAGACC

CGCGCCGAGGTGAAGTTCGAGGGCGACACCCTGGTGAACCGCATCGAGCTGAAG

GGCATCGACTTCAAGGAGGACGGCAACATCCTGGGGCACAAGCTGGAGTACAAC

TACAACAGCCACAACGTCTATATCATGGCCGACAAGCAGAAGAACGGCATCAAG

GTGAACTTCAAGATCCGCCACAACATCGAGGACGGCAGCGTGCAGCTCGCCGAC

CACTACCAGCAGAACACCCCCATCGGCGACGGCCCCGTGCTGCTGCCCGACAAC

CACTACCTGAGCACCCAGTCCGCCCTGAGCAAAGACCCCAACGAGAAGCGCGAT

CACATGGTCCTGCTGGAGTTCGTGACCGCCGCCGGGATCACTCTCGGCATGGACG

AGCTGTACAAGTAA

SEQ ID NO 14
LENGTH: 241
TYPE: DNA
ORGANISM: Artificial
FEATURE: Polyadenylation signal
OTHER INFORMATION: SV40 Polyadenylation signal
SEQUENCE:
GATCATAATCAGCCATACCACATTTGTAGAGGTTTTACTTGCTTTAAAAAACCTC

CCACACCTCCCCCTGAACCTGAAACATAAAATGAATGCAATTGTTGTTGTTAACT

TGTTTATTGCAGCTTATAATGGTTACAAATAAAGCAATAGCATCACAAATTTCAC

-continued

AAATAAAGCATTTTTTTCACTGCATTCTAGTTGTGGTTTGTCCAAACTCATCAATG

TATCTTATCATGTCTGGATC

SEQ ID NO 15
LENGTH: 582
TYPE: DNA
ORGANISM: Artificial
FEATURE: S/MAR Sequence
OTHER INFORMATION: Scaffold Nuclear Matrix Attachment Region
SEQUENCE:
CTATCCATAGCTGATTGGTCTAAAATGAGATACATCAACGCTCCTCCATGTTTTT

GTTTTCTTTTTAAATGAAAAACTTTATTTTTTAAGAGGAGTTTCAGGTTCATAGCA

AAATTGAGAGGAAGGTACATTCAAGCTGAGGAAGTTTTCCTCTATTCCTAGTTTA

CTGAGAGATTGCATCATGAATGGGTGTTAAATTTTGTCAAATGCTTTTTCTGTGTC

TATCAATATGACCATGTGATTTTCTTCTTTAACCTGTTGATGGGACAAATTACGTT

AATTGATTTTCAAACGTTGAACCACCCTTACATATCTGGAATAAATTCTACTTGGT

TGTGGTGTATATTTTTTGATACATTCTTGGATTCTTTTTGCTAATATTTTGTTGAAA

ATGTTTGTATCTTTGTTCATGAGAGATATTGGTCTGTTGTTTTCTTTTCTTGTAATG

TCATTTTCTAGTTCCGGTATTAAGGTAATGCTGGCCTAGTTGAATGATTTAGGAA

GTATTCCCTCTGCTTCTGTCTTCTGAAAGAGATTGTAGAAAGTTGATACAATTTTT

TTTTCTTTAAATATCTTGATAG

SEQ ID NO 16
LENGTH: 73
TYPE: DNA
ORGANISM: Artificial
FEATURE: DNA Nuclear Localization Sequence
OTHER INFORMATION: SV40 Enhancer
SEQUENCE:
TGGTGTGGAAAGTCCCCAGGCTCCCCAGCAGGCAGAAGTATGCAAAGCATGCAT

CTCAATTAGTCAGCAACCA

SEQ ID NO 17
LENGTH: 10836
TYPE: DNA
ORGANISM: Artificial
FEATURE: Helper Plasmid
OTHER INFORMATION: Helper Plasmid
SEQUENCE:
TCGCGCGTTTCGGTGATGACGGTGAAAACCTCTGACACATGCAGCTCCCGGAGAC

GGTCACAGCTTGTCTGTAAGCGGATGCCGGGAGCAGACAAGCCCGTCAGGGCGC

GTCAGCGGGTGTTGGCGGGTGTCGGGGCTGGCTTAACTATGCGGCATCAGAGCA

GATTGTACTGAGAGTGCACCATATGCGGTGTGAAATACCGCACAGATGCGTAAG

GAGAAAATACCGCATCAGGCGCCATTCGCCATTCAGGCTGCGCAACTGTTGGGA

AGGGCGATCGGTGCGGGCCTCTTCGCTATTACGCCAGCTGGCGAAAGGGGGATG

TGCTGCAAGGCGATTAAGTTGGGTAACGCCAGGGTTTTCCCAGTCACGACGTTGT

AAAACGACGGCCAGTGAATTGGAGATCGGTACTTCGCGAATGCGTCGAGATGTA

GTGGCCAGGACCCAACGCTGCCCGAAATTGGCCAGGACCCAACGACTAGTCTGC

CCGAAATTCCGACACCATCGAATGGTGCAAAACCTTTCGCGGTATGGCATGATAG

CGCCCGGAAGAGAGTCAATTCAGGGTGGTGAATGTGAAACCAGTAACGTTATAC

GATGTCGCAGAGTATGCCGGTGTCTCTTATCAGACCGTTTCCCGCGTGGTGAACC

AGGCCAGCCACGTTTCTGCGAAAACGCGGGAAAAAGTGGAAGCGGCGATGGCG

GAGCTGAATTACATTCCCAACCGCGTGGCACAACAACTGGCGGGCAAACAGTCG

TTGCTGATTGGCGTTGCCACCTCCAGTCTGGCCCTGCACGCGCCGTCGCAAATTG

-continued

```
TCGCGGCGATTAAATCTCGCGCCGATCAACTGGGTGCCAGCGTGGTGGTGTCGAT
GGTAGAACGAAGCGGCGTCGAAGCCTGTAAAGCGGCGGTGCACAATCTTCTCGC
GCAACGCGTCAGTGGGCTGATCATTAACTATCCGCTGGATGACCAGGATGCCATT
GCTGTGGAAGCTGCCTGCACTAATGTTCCGGCGTTATTTCTTGATGTCTCTGACCA
GACACCCATCAACAGTATTATTTTCTCCCATGAAGACGGTACGCGACTGGGCGTG
GAGCATCTGGTCGCATTGGGTCACCAGCAAATCGCGCTGTTAGCGGGCCCATTAA
GTTCTGTCTCGGCGCGTCTGCGTCTGGCTGGCTGGCATAAATATCTCACTCGCAA
TCAAATTCAGCCGATAGCGGAACGGGAAGGCGACTGGAGTGCCATGTCCGGTTT
TCAACAAACCATGCAAATGCTGAATGAGGGCATCGTTCCCACTGCGATGCTGGTT
GCCAACGATCAGATGGCGCTGGGCGCAATGCGCGCCATTACCGAGTCCGGGCTG
CGCGTTGGTGCGGATATTTCGGTAGTGGGATACGACGATACCGAAGACAGCTCA
TGTTATATCCCGCCGTTAACCACCATCAAACAGGATTTTCGCCTGCTGGGGCAAA
CCAGCGTGGACCGCTTGCTGCAACTCTCTCAGGGCCAGGCGGTGAAGGGCAATC
AGCTGTTGCCCGTCTCACTGGTGAAAAGAAAAACCACCCTGGCGCCCAATACGC
AAACCGCCTCTCCCCGCGCGTTGGCCGATTCATTAATGCAGCTGGCACGACAGGT
TTCCCGACTGGAAAGCGGGCAGTGAGAATTCAATAATTTTGTTTAACTTTAAGAA
GGAGATATACATATGGCTGAAGCGCAAAATGATCCCCTGCTGCCGGGATACTCG
TTTAATGCCCATCTGGTGGCGGGTTTAACGCCGATTGAGGCCAACGGTTATCTCG
ATTTTTTTATCGACCGACCGCTGGGAATGAAAGGTTATATTCTCAATCTCACCATT
CGCGGTCAGGGGGTGGTGAAAAATCAGGGACGAGAATTTGTTTGCCGACCGGGT
GATATTTTGCTGTTCCCGCCAGGAGAGATTCATCACTACGGTCGTCATCCGGAGG
CTCGCGAATGGTATCACCAGTGGGTTTACTTTCGTCCGCGCGCCTACTGGCATGA
ATGGCTTAACTGGCCGTCAATATTTGCCAATACGGGGTTCTTTCGCCCGGATGAA
GCGCACCAGCCGCATTTCAGCGACCTGTTTGGGCAAATCATTAACGCCGGGCAA
GGGGAAGGGCGCTATTCGGAGCTGCTGGCGATAAATCTGCTTGAGCAATTGTTAC
TGCGGCGCATGGAAGCGATTAACGAGTCGCTCCATCCACCGATGGATAATCGGG
TACGCGAGGCTTGTCAGTACATCAGCGATCACCTGGCAGACAGCAATTTTGATAT
CGCCAGCGTCGCACAGCATGTTTGCTTGTCGCCGTCGCGTCTGTCACATCTTTTCC
GCCAGCAGTTAGGGATTAGCGTCTTAAGCTGGCGCGAGGACCAACGTATCAGCC
AGGCGAAGCTGCTTTTGAGCACCACCCGGATGCCTATCGCCACCGTCGGTCGCAA
TGTTGGTTTTGACGATCAACTCTATTTCTCGCGGGTATTTAAAAAATGCACCGGG
GCCAGCCCGAGCGAGTTCCGTGCCGGTTGTGAAGAAAAGTGAATGATGTAGCC
GTCAAGTTGTCATAAGCGCAACGCAATTAATGTAAGTTAGCTCACTCATTAGGCA
CAATTCTCATGTTTGACAGCTTATCATCGACTGCACGGTGCACCAATGCTTCTGG
CGTCAGGCAGCCATCGGAAGCTGTGGTATGGCTGTGCAGGTCGTAAATCACTGC
ATAATTCGTGTCGCTCAAGGCGCACTCCCGTTCTGGATAATGTTTTTTGCGCCGAC
ATCATAACGGTTCTGGCAAATATTCTGAAATGAGCTACGGCCTCAACCTACTACT
TCTAGAGGGCTGCTTCCTAATGCAGGATTTACACTTTATGCTTCCGGCTCGTATGT
TGTGTGGAATTGTGAGCGGATAACAATTTCACACATACTAGAGTCACACAGGAA
AGTACTAGGTGGACACGTACGCGGGTGCTTACGACCGTCAGTCGCGCGAGCGCG
```

-continued

```
AGAATTCGAGCGCAGCAAGCCCAGCGACACAGCGTAGCGCCAACGAAGACAAG
GCGGCCGACCTTCAGCGCGAAGTCGAGCGCGACGGGGCCGGTTCAGGTTCGTC
GGGCATTTCAGCGAAGCGCCGGGCACGTCGGCGTTCGGGACGGCGGAGCGCCCG
GAGTTCGAACGCATCCTGAACGAATGCCGCGCCGGGCGGCTCAACATGATCATT
GTCTATGACGTGTCGCGCTTCTCGCGCCTGAAGGTCATGGACGCGATTCCGATTG
TCTCGGAATTGCTCGCCCTGGGCGTGACGATTGTTTCCACTCAGGAAGGCGTCTT
CCGGCAGGGAAACGTCATGGACCTGATTCACCTGATTATGCGGCTCGACGCGTCG
CACAAAGAATCTTCGCTGAAGTCGGCGAAGATTCTCGACACGAAGAACCTTCAG
CGCGAATTGGGCGGGTACGTCGGCGGGAAGGCGCCTTACGGCTTCGAGCTTGTTT
CGGAGACGAAGGAGATCACGCGCAACGGCCGAATGGTCAATGTCGTCATCAACA
AGCTTGCGCACTCGACCACTCCCCTTACCGGACCCTTCGAGTTCGAGCCCGACGT
AATCCGGTGGTGGTGGCGTGAGATCAAGACGCACAAACACCTTCCCTTCAAGCC
GGGCAGTCAAGCCGCCATTCACCCGGGCAGCATCACGGGGCTTTGTAAGCGCAT
GGACGCTGACGCCGTGCCGACCCGGGGCGAGACGATTGGGAAGAAGACCGCTTC
AAGCGCCTGGGACCCGGCAACCGTTATGCGAATCCTTCGGGACCCGCGTATTGCG
GGCTTCGCCGCTGAGGTGATCTACAAGAAGAAGCCGGACGGCACGCCGACCACG
AAGATTGAGGGTTACCGCATTCAGCGCGACCCGATCACGCTCCGGCCGGTCGAG
CTTGATTGCGGACCGATCATCGAGCCCGCTGAGTGGTATGAGCTTCAGGCGTGGT
TGGACGGCAGGGGGCGCGGCAAGGGGCTTTCCCGGGGGCAAGCCATTCTGTCCG
CCATGGACAAGCTGTACTGCGAGTGTGGCGCCGTCATGACTTCGAAGCGCGGGG
AAGAATCGATCAAGGACTCTTACCGCTGCCGTCGCCGGAAGGTGGTCGACCCGT
CCGCACCTGGGCAGCACGAAGGCACGTGCAACGTCAGCATGGCGGCACTCGACA
AGTTCGTTGCGGAACGCATCTTCAACAAGATCAGGCACGCCGAAGGCGACGAAG
AGACGTTGGCGCTTCTGTGGGAAGCCGCCCGACGCTTCGGCAAGCTCACTGAGG
CGCCTGAGAAGAGCGGCGAACGGGCGAACCTTGTTGCGGAGCGCGCCGACGCCC
TGAACGCCCTTGAAGAGCTGTACGAAGACCGCGCGGCAGGCGCGTACGACGGAC
CCGTTGGCAGGAAGCACTTCCGGAAGCAACAGGCAGCGCTGACGCTCCGGCAGC
AAGGGGCGGAAGAGCGGCTTGCCGAACTTGAAGCCGCCGAAGCCCCGAAGCTTC
CCCTTGACCAATGGTTCCCCGAAGACGCCGACGCTGACCCGACCGGCCCTAAGTC
GTGGTGGGGCGCGCGTCAGTAGACGACAAGCGCGTGTTCGTCGGGCTCTTCGT
AGACAAGATCGTTGTCACGAAGTCGACTACGGGCAGGGGCAGGGAACGCCCAT
CGAGAAGCGCGCTTCGATCACGTGGGCGAAGCCGCCGACCGACGACGACGAAGA
CGACGCCCAGGACGGCACGGAAGACGTAGCGGCGTAGGAATTCAATAATTTTGT
TTAACTTTAAGAAGGAGATATACATATGAACAATTTGCATGACATGTCTAAGGCG
ACTCGCATATCTGTTGAAACACTTCGGTTGTTAATCTATACAGCTGATTTTCGCTA
TAGGATCTACACTGTAGAAAAGAAAGGCCCAGAGAAGAGAATGAGAACCATTTA
CCAACCTTCTCGAGAACTTAAAGCCTTACAAGGATGGGTTCTACGTAACATTTTA
GATAAACTGTCGTCATCTCCTTTTTCTATTGGATTTGAAAAGCACCAATCTATTTT
GAATAATGCTACCCCGCATATTGGGGCAAACTTTATACTGAATATTGATTTGGAG
GATTTTTTCCCAAGTTTAACTGCTAACAAAGTTTTTGGAGTGTTCCATTCTCTTGG
TTATAATCGACTAATATCTTCAGTTTTGACAAAAATATGTTGTTATAAAAATCTGC
```

```
TACCACAAGGTGCTCCATCATCACCTAAATTAGCTAATCTAATATGTTCTAAACT

TGATTATCGTATTCAGGGTTATGCAGGTAGTCGGGGCTTGATATATACGAGATAT

GCCGATGATCTCACCTTATCTGCACAGTCTATGAAAAAGGTTGTTAAAGCACGTG

ATTTTTTATTTTCTATAATCCCAAGTGAAGGATTGGTTATTAACTCAAAAAAACT

TGTATTAGTGGGCCTCGTAGTCAGAGGAAAGTTACAGGTTTAGTTATTTCACAAG

AGAAAGTTGGGATAGGTAGAGAAAAATATAAAGAAATTAGAGCAAAGATACAT

CATATATTTTGCGGTAAGTCTTCTGAGATAGAACACGTTAGGGGATGGTTGTCAT

TTATTTTAAGTGTGGATTCAAAAAGCCATAGGAGATTAATAACTTATATTAGCAA

ATTAGAAAAAAATATGGAAAGAACCCTTTAAATAAAGCGAAGACCTAATGGTC

TTCGTTTTAAAACTAAAGCTCATAGGTTGAAAAATTGAGCACTTCTTCGTCCAAC

TGATACTAGAGCCAGGCATCAAATAAAACGAAAGGCTCAGTCGAAAGACTGGGC

CTTTCGTTTTATCTGTTGTTTGTCGGTGAACGCTCTCATTGTGCTAGCATGCATAA

GAAACCAATTGTCCATATTGCATCAGACATTGCCGTCACTGCGTCTTTTACTGGCT

CTTCTCGCTAACCAAACCGGTAACCCCGCTTATTAAAAGCATTCTGTAACAAAGC

GGGACCAAAGCCATGACAAAAACGCGTAACAAAAGTGTCTATAATCACGGCAGA

AAAGTCCACATTGATTATTTGCACGGCGTCACACTTTGCTATGCCATAGCATTTTT

ATCCATAAGATTAGCGGATCCTACCTGACGCTTTTTATCGCAACTCTCTACTGTTT

CTCCATACCCGTTTTTTTGGGCTAGCGAATTCGAGCTCAAGAGGATACCATATGA

AAAACATTAAAAAAAACCAGGTGATGAACCTGGGCCCGAACAGCAAACTGCTGA

AAGAATATAAAAGCCAGCTGATTGAACTGAACATTGAACAGTTTGAAGCGGGCA

TTGGCCTGATTCTGGGCGATGCGTATATTCGCAGCCGCGATGAAGGCAAAACCTA

TTGCATGCAGTTTGAATGGAAAAACAAAGCGTATATGGATCATGTGTGCCTGCTG

TATGATCAGTGGGTGCTGAGCCCGCCGCATAAAAAAGAACGCGTGAACCATCTG

GGCAACCTGGTGATTACCTGGGGCGCGCAGACCTTTAAACATCAGGCGTTTAACA

AACTGGCGAACCTGTTTATTGTGAACAACAAAAAAACCATTCCGAACAACCTGG

TGGAAAACTATCTGACCCCGATGAGCCTGGCGTATTGGTTTATGGATGATGGCGG

CAAATGGGATTATAACAAAAACAGCACCAACAAAAGCATTGTGCTGAACACCCA

GAGCTTTACCTTTGAAGAAGTGGAATATCTGGTGAAAGGCCTGCGCAACAAATTT

CAGCTGAACTGCTATGTGAAAATTAACAAAAACAAACCGATTATTTATATTGATA

GCATGAGCTATCTGATTTTTTATAACCTGATTAAACCGTATCTGATTCCGCAGATG

ATGTATAAACTGCCGAACACCATTAGCAGCGAAACCTTTCTGAAATGATTAACCT

AGGCTGCTGCCACCGCTGAGCAATAACTAGCATAACCCCTTGGGGCCTCTAAACG

GGTCTTGAGGGGTTTTTTGATGGTGGCAGGCCCCGTGGCCGGGGACTGTTCTGC

AGGGGCGCCATCTCCTCACTCAAAGGCGGTAATACGGTTATTACATCGGATGCCG

GGACCGACGAGTGCAGAGGCGTGCAAGCGAGCTTGGCGTAATCATGGTCATAGC

TGTTTCCTGTGTGAAATTGTTATCCGCTCACAATTCCACACAACATACGAGCCGG

AAGCATAAAGTGTAAAGCCTGGGGTGCCTAATGAGTGAGCTAACTCACATTAAT

TGCGTTGCGCTCACTGCCCGCTTTCCAGTCGGGAAACCTGTCGTGCCAGCTGCAT

TAATGAATCGGCCAACGCGCGGGGAGAGGCGGTTTGCGTATTGGGCGCTCTTCC

GCTTCCTCGCTCACTGACTCGCGGCCGCGCTGCGCTCGGTCGTTCGGCTGCGGCG
```

-continued

```
AGCGGTAGGGATAACAGGGTAATGTCATCTGGGATAACAGGGTAATGTCATCTA
GGGATAACAGGGTATGTCATCTGGGATAACAGGGTAATGTATCTAGGGATAACA
GGGTAATGTCATCTGGGATAACAGGGTAATGTCATCTAGGGATAACAGGGTATG
TCATCTGGGATAACAGGGTAATGTATCTAGGGATAACAGGGTAATGTCATCTGG
GATAACAGGGTAATGTCATCTAGGGATAACAGGGTATGTCATCTGGGATAACAG
GGTAATGTATCTAGGGATAACAGGGTAATGTCATCTGGGATAACAGGGTAATGT
CATCTAGGGATAACAGGGTATGTCATCTGGGATAACAGGGTAATGTATCTAGGG
ATAACAGGGTAATGTCATCTGGGATAACAGGGTAATGTCATCTAGGGATAACAG
GGTATGTCATCTGGGATAACAGGGTAATGTATCTTGTATCTAGGGATAACAGGGT
AATTATCAGCTCACTCAAAGGCGGTAATACGGTTATCCACAGAATCAGGGGATA
ACGCAGGAAAGAACATGTGAGCAAAAGGCCAGCAAAAGGCCAGGAACCGTAAA
AAGGCCGCGTTGCTGGCGTTATGGAATAGACTGGATGGAGGCGGATAAAGTTGC
AGGACCACTTCTGCGCTCGGCCCTTCCGGCTGGCTGGTTTATTGCTGATAAATCT
GGAGCCGGTGAGCGTGGGTCTCGCGGTATCATTGCAGCACTGGGGCCAGATGGT
AAGCCCTCCCGTATCGTAGTTATCTACACGACGGGGAGTCAGGCAACTATGGATG
AACGAAATAGACAGATCGCTGAGATAGGTGCCTCACTGATTAAGCATTGGTAAC
TGTCAGACCAAGTTTACTCATATATACTTTAGATTGATTTAAAACTTCATTTTTAA
TTTAAAAGGATCTAGGTGAAGATCCTTTTTGATAATCTCATGACCAAAATCCCTT
AACGTGAGTTTTCGTTCCACTGAGCGTCAGACCCCTTAATAAGATGATCTTCTTG
AGATCGTTTTGGTCTGCGCGTAATCTCTTGCTCTGAAAACGAAAAAACCGCCTTG
CAGGGCGGTTTTTCGAAGGTTCTCTGAGCTACCAACTCTTTGAACCGAGGTAACT
GGCTTGGAGGAGCGCAGTCACCAAAACTTGTCCTTTCAGTTTAGCCTTAACCGGC
GCATGACTTCAAGACTAACTCCTCTAAATCAATTACCAGTGGCTGCTGCCAGTGG
TGCTTTTGCATGTCTTTCCGGGTTGGACTCAAGACGATAGTTACCGGATAAGGCG
CAGCGGTCGGACTGAACGGGGGGTTCGTGCATACAGTCCAGCTTGGAGCGAACT
GCCTACCCGGAACTGAGTGTCAGGCGTGGAATGAGACAAACGCGGCCATAACAG
CGGAATGACACCGGTAAACCGAAAGGCAGGAACAGGAGAGCGCACGAGGGAGC
CGCCAGGGGAAACGCCTGGTATCTTTATAGTCCTGTCGGGTTTCGCCACCACTGA
TTTGAGCGTCAGATTTCGTGATGCTTGTCAGGGGGGCGGAGCCTATGGAAAAAC
GGCTTTGCCGCGGCCCTCTCACTTCCCTGTTAAGTATCTTCCTGGCATCTTCCAGG
AAATCTCCGCCCCGTTCGTAAGCCATTTCCGCTCGCCGCAGTCGAACGACCGAGC
GTAGCGAGTCAGTGAGCGAGGAAGCGGAATATATCCTGTATCACATATTCTGCTG
ACGCACCGGTGCAGCCTTTTTTCTCCTGCCACATGAAGCACTTCACTGACACCCT
CATCAGTGCCAACATAGTAAGCCAGTATACACTCCGCTAGCGCTGAGGTCTGCCT
CGTGAAGAAGGTGTTGCTGACTCATACCAGGCCTGAATCGCCCCATCATCCAGCC
AGAAAGTGAGGGAGCCACGGTTGATGAGAGCTTTGTTGTAGGTGGACCAGTTGG
TGATTTTGAACTTTTGCTTTGCCACGGAACGGTCTGCGTTGTCGGGAAGATGCGT
GATCTGATCCTTCAACTCAGCAAAAGTTCGATTTATTCAACAAAGCCACGTTGTG
TCTCAAAATCTCTGATGTTACATTGCACAAGATAAAAATATATCATCATGAACAA
TAAAACTGTCTGCTTACATAAACAGTAATACAAGGGGTGTTAAGATCCTTTGAG
CGGCCGCTCTTTTTCTACGGGGTCTGACGCTCAGTGGAACGAAAACTCACGTTAAG
```

-continued

GGATTTTGGTCATGAGATTATCAAAAAGGATCTTCACCTAGATCCTTTTAAATTA

AAAATGAAGTTTTAAATCAATCTAAAGTATATATGAGTAAACTTGGTCTGACAGT

TACCAATGCTTAATCAGTGAGGCACCTATCTCAGCGATCTGTCTATTTCGTTCATC

CATAGTTGCCTGACTCCCCGTCGTGTAGATAACTACGATACGGGAGGGCTTACCA

TCTGGCCCCAGTGCTGCAATGATACCGCGAGACCCACGCTCACCGGCTCCAGATT

TATCAGCAATAAACCAGCCAGCCGGAAGGGCCGAGCGCAGAAGTGGTCCTGCAA

CTTTATCCGCCTCCATCCAGTCTATTAATTGTTGCCGGGAAGCTAGAGTAAGTAG

TTCGCCAGTTAATAGTTTGCGCAACGTTGTTGCCATTGCTACAGGCATCGTGGTG

TCACGCTCGTCGTTTGGTATGGCTTCATTCAGCTCCGGTTCCCAACGATCAAGGC

GAGTTACATGATCCCCCATGTTGTGCAAAAAAGCGGTTAGCTCCTTCGGTCCTCC

GATCGTTGTCAGAAGTAAGTTGGCCGCAGTGTTATCACTCATGGTTATGGCAGCA

CTGCATAATTCTCTTACTGTCATGCCATCCGTAAGATGCTTTTCTGTGACTGGTGA

GTACTCAACCAAGTCATTCTGAGAATAGTGTATGCGGCGACCGAGTTGCTCTTGC

CCGGCGTCAATACGGGATAATACCGCGCCACATAGCAGAACTTTAAAAGTGCTC

ATCATTGGAAAACGTTCTTCGGGGCGAAAACTCTCAAGGATCTTACCGCTGTTGA

GATCCAGTTCGATGTAACCCACTCGTGCACCCAACTGATCTTCAGCATCTTTTACT

TTCACCAGCGTTTCTGGGTGAGCAAAAACAGGAAGGCAAAATGCCGCAAAAAAG

GGAATAAGGGCGACACGGAAATGTTGAATACTCATACTCTTCCTTTTTCAATATT

ATTGAAGCATTTATCAGGGTTATTGTCTCATGAGCGGATACATATTTGAATGTAT

TTAGAAAAATAAACAAATAGGGGTTCCGCGCACATTTCCCCGAAAAGTGCCACC

TGACGTCTAAGAAACCATTATTATCATGACATTAACCTATAAAAATAGGCGTATC

ACGAGGCCCTTTCGTC

SEQ ID NO 18
LENGTH: 78
TYPE: DNA
ORGANISM: Artificial
FEATURE: Prokaryotic Promoter
OTHER INFORMATION: LacIq Promoter
SEQUENCE:
GACACCATCGAATGGTGCAAAACCTTTCGCGGTATGGCATGATAGCGCCCGGAA

GAGAGTCAATTCAGGGTGGTGAAT

SEQ ID NO 19
LENGTH: 960
TYPE: DNA
ORGANISM: Artificial
FEATURE: Repressor Protein
OTHER INFORMATION: Lac I Repressor Protein coding sequence
SEQUENCE:
ATGGCGGAGCTGAATTACATTCCCAACCGCGTGGCACAACAACTGGCGGGCAAA

CAGTCGTTGCTGATTGGCGTTGCCACCTCCAGTCTGGCCCTGCACGCGCCGTCGC

AAATTGTCGCGGCGATTAAATCTCGCGCCGATCAACTGGGTGCCAGCGTGGTGGT

GTCGATGGTAGAACGAAGCGGCGTCGAAGCCTGTAAAGCGGCGGTGCACAATCT

TCTCGCGCAACGCGTCAGTGGGCTGATCATTAACTATCCGCTGGATGACCAGGAT

GCCATTGCTGTGGAAGCTGCCTGCACTAATGTTCCGGCGTTATTTCTTGATGTCTC

TGACCAGACACCCATCAACAGTATTATTTTCTCCCATGAAGACGGTACGCGACTG

GGCGTGGAGCATCTGGTCGCATTGGGTCACCAGCAAATCGCGCTGTTAGCGGGC

CCATTAAGTTCTGTCTCGGCGCGTCTGCGTCTGGCTGGCTGGCATAAATATCTCA

-continued

CTCGCAATCAAATTCAGCCGATAGCGGAACGGGAAGGCGACTGGAGTGCCATGT

CCGGTTTTCAACAAACCATGCAAATGCTGAATGAGGGCATCGTTCCCACTGCGAT

GCTGGTTGCCAACGATCAGATGGCGCTGGGCGCAATGCGCGCCATTACCGAGTC

CGGGCTGCGCGTTGGTGCGGATATTTCGGTAGTGGGATACGACGATACCGAAGA

CAGCTCATGTTATATCCCGCCGTTAACCACCATCAAACAGGATTTTCGCCTGCTG

GGGCAAACCAGCGTGGACCGCTTGCTGCAACTCTCTCAGGGCCAGGCGGTGAAG

GGCAATCAGCTGTTGCCCGTCTCACTGGTGAAAAGAAAAACCACCCTGGCGCCC

AATACGCAAACCGCCTCTCCCCGCGCGTTGGCCGATTCATTAATGCAGCTGGCAC

GACAGGTTTCCCGACTGGAAAGCGGGCAGTGA

SEQ ID NO 20
LENGTH: 879
TYPE: DNA
ORGANISM: Artificial
FEATURE: Repressor Protein
OTHER INFORMATION: AraC Repressor Protein coding sequence
SEQUENCE:
ATGGCTGAAGCGCAAAATGATCCCCTGCTGCCGGGATACTCGTTTAATGCCCATC

TGGTGGCGGGTTTAACGCCGATTGAGGCCAACGGTTATCTCGATTTTTTTATCGA

CCGACCGCTGGGAATGAAAGGTTATATTCTCAATCTCACCATTCGCGGTCAGGGG

GTGGTGAAAAATCAGGGACGAGAATTTGTTTGCCGACCGGGTGATATTTTGCTGT

TCCCGCCAGGAGAGATTCATCACTACGGTCGTCATCCGGAGGCTCGCGAATGGTA

TCACCAGTGGGTTTACTTTCGTCCGCGCGCCTACTGGCATGAATGGCTTAACTGG

CCGTCAATATTTGCCAATACGGGGTTCTTTCGCCCGGATGAAGCGCACCAGCCGC

ATTTCAGCGACCTGTTTGGGCAAATCATTAACGCCGGGCAAGGGGAAGGGCGCT

ATTCGGAGCTGCTGGCGATAAATCTGCTTGAGCAATTGTTACTGCGGCGCATGGA

AGCGATTAACGAGTCGCTCCATCCACCGATGGATAATCGGGTACGCGAGGCTTGT

CAGTACATCAGCGATCACCTGGCAGACAGCAATTTTGATATCGCCAGCGTCGCAC

AGCATGTTTGCTTGTCGCCGTCGCGTCTGTCACATCTTTTCCGCCAGCAGTTAGGG

ATTAGCGTCTTAAGCTGGCGCGAGGACCAACGTATCAGCCAGGCGAAGCTGCTTT

TGAGCACCACCCGGATGCCTATCGCCACCGTCGGTCGCAATGTTGGTTTTGACGA

TCAACTCTATTTCTCGCGGGTATTTAAAAAATGCACCGGGGCCAGCCCGAGCGAG

TTCCGTGCCGGTTGTGAAGAAAAAGTGAATGATGTAGCCGTCAAGTIGTCATAA

SEQ ID NO 21
LENGTH: 241
TYPE: DNA
ORGANISM: Artificial
FEATURE: Prokaryotic Transcription Terminator
OTHER INFORMATION: LacIq Terminator
SEQUENCE:
GCGCAACGCAATTAATGTAAGTTAGCTCACTCATTAGGCACAATTCTCATGTTTG

ACAGCTTATCATCGACTGCACGGTGCACCAATGCTTCTGGCGTCAGGCAGCCATC

GGAAGCTGTGGTATGGCTGTGCAGGTCGTAAATCACTGCATAATTCGTGTCGCTC

AAGGCGCACTCCCGTTCTGGATAATGTTTTTTGCGCCGACATCATAACGGTTCTG

GCAAATATTCTGAAATGAGCT

-continued

SEQ ID NO 22
LENGTH: 31
TYPE: DNA
ORGANISM: Artificial
FEATURE: Prokaryotic Inducible Promoter
OTHER INFORMATION: Lac Promoter
SEQUENCE:
TTTACACTTTATGCTTCCGGCTCGTATGTTG SEQ ID NO 23
LENGTH: 1818
TYPE: DNA
ORGANISM: Artificial
FEATURE: Recombinase
OTHER INFORMATION: Phi C31 recombinase Protein Coding Sequence
SEQUENCE:
GTGGACACGTACGCGGGTGCTTACGACCGTCAGTCGCGCGAGCGCGAGAATTCG

AGCGCAGCAAGCCCAGCGACACAGCGTAGCGCCAACGAAGACAAGGCGGCCGA

CCTTCAGCGCGAAGTCGAGCGCGACGGGGGCCGGTTCAGGTTCGTCGGGCATTTC

AGCGAAGCGCCGGGCACGTCGGCGTTCGGGACGGCGGAGCGCCCGGAGTTCGAA

CGCATCCTGAACGAATGCCGCGCCGGGCGGCTCAACATGATCATTGTCTATGACG

TGTCGCGCTTCTCGCGCCTGAAGGTCATGGACGCGATTCCGATTGTCTCGGAATT

GCTCGCCCTGGGCGTGACGATTGTTTCCACTCAGGAAGGCGTCTTCCGGCAGGGA

AACGTCATGGACCTGATTCACCTGATTATGCGGCTCGACGCGTCGCACAAAGAAT

CTTCGCTGAAGTCGGCGAAGATTCTCGACACGAAGAACCTTCAGCGCGAATTGG

GCGGGTACGTCGGCGGGAAGGCGCCTTACGGCTTCGAGCTTGTTTCGGAGACGA

AGGAGATCACGCGCAACGGCCGAATGGTCAATGTCGTCATCAACAAGCTTGCGC

ACTCGACCACTCCCCTTACCGGACCCTTCGAGTTCGAGCCCGACGTAATCCGGTG

GTGGTGGCGTGAGATCAAGACGCACAAACACCTTCCCTTCAAGCCGGGCAGTCA

AGCCGCCATTCACCCGGGCAGCATCACGGGGCTTTGTAAGCGCATGGACGCTGA

CGCCGTGCCGACCCGGGGCGAGACGATTGGGAAGAAGACCGCTTCAAGCGCCTG

GGACCCGGCAACCGTTATGCGAATCCTTCGGGACCCGCGTATTGCGGGCTTCGCC

GCTGAGGTGATCTACAAGAAGAAGCCGGACGGCACGCCGACCACGAAGATTGAG

GGTTACCGCATTCAGCGCGACCCGATCACGCTCCGGCCGGTCGAGCTTGATTGCG

GACCGATCATCGAGCCCGCTGAGTGGTATGAGCTTCAGGCGTGGTTGGACGGCA

GGGGGCGCGGCAAGGGGCTTTCCCGGGGGCAAGCCATTCTGTCCGCCATGGACA

AGCTGTACTGCGAGTGTGGCGCCGTCATGACTTCGAAGCGCGGGGAAGAATCGA

TCAAGGACTCTTACCGCTGCCGTCGCCGGAAGGTGGTCGACCCGTCCGCACCTGG

GCAGCACGAAGGCACGTGCAACGTCAGCATGGCGGCACTCGACAAGTTCGTTGC

GGAACGCATCTTCAACAAGATCAGGCACGCCGAAGGCGACGAAGAGACGTTGGC

GCTTCTGTGGGAAGCCGCCCGACGCTTCGGCAAGCTCACTGAGGCGCCTGAGAA

GAGCGGCGAACGGGCGAACCTTGTTGCGGAGCGCGCCGACGCCCTGAACGCCCT

TGAAGAGCTGTACGAAGACCGCGCGGCAGGCGCGTACGACGGACCCGTTGGCAG

GAAGCACTTCCGGAAGCAACAGGCAGCGCTGACGCTCCGGCAGCAAGGGGCGG

AAGAGCGGCTTGCCGAACTTGAAGCCGCCGAAGCCCCGAAGCTTCCCCTTGACC

AATGGTTCCCCGAAGACGCCGACGCTGACCCGACCGGCCCTAAGTCGTGGTGGG

-continued

GGCGCGCGTCAGTAGACGACAAGCGCGTGTTCGTCGGGCTCTTCGTAGACAAGA

TCGTTGTCACGAAGTCGACTACGGGCAGGGGGCAGGGAACGCCCATCGAGAAGC

GCGCTTCGATCACGTGGGCGAAGCCGCCGACCGACGACGACGAAGACGACGCCC

AGGACGGCACGGAAGACGTAGCGGCGTAG

SEQ ID NO 24
LENGTH: 966
TYPE: DNA
ORGANISM: Artificial
FEATURE: Reverse Transcriptase
OTHER INFORMATION: Ec86 Reverse Transcriptase Coding Sequence
SEQUENCE:
ATGAACAATTTGCATGACATGTCTAAGGCGACTCGCATATCTGTTGAAACACTTC

GGTTGTTAATCTATACAGCTGATTTTCGCTATAGGATCTACACTGTAGAAAAGAA

AGGCCCAGAGAAGAGAATGAGAACCATTTACCAACCTTCTCGAGAACTTAAAGC

CTTACAAGGATGGGTTCTACGTAACATTTTAGATAAACTGTCGTCATCTCCTTTTT

CTATTGGATTTGAAAAGCACCAATCTATTTTGAATAATGCTACCCCGCATATTGG

GGCAAACTTTATACTGAATATTGATTTGGAGGATTTTTTCCCAAGTTTAACTGCTA

ACAAAGTTTTTGGAGTGTTCCATTCTCTTGGTTATAATCGACTAATATCTTCAGTT

TTGACAAAAATATGTTGTTATAAAAATCTGCTACCACAAGGTGCTCCATCATCAC

CTAAATTAGCTAATCTAATATGTTCTAAACTTGATTATCGTATTCAGGGTTATGCA

GGTAGTCGGGGCTTGATATATACGAGATATGCCGATGATCTCACCTTATCTGCAC

AGTCTATGAAAAAGGTTGTTAAAGCACGTGATTTTTTATTTTCTATAATCCCAAGT

GAAGGATTGGTTATTAACTCAAAAAAAACTTGTATTAGTGGGCCTCGTAGTCAGA

GGAAAGTTACAGGTTTAGTTATTTCACAAGAGAAAGTTGGGATAGGTAGAGAAA

AATATAAAGAAATTAGAGCAAAGATACATCATATATTTTGCGGTAAGTCTTCTGA

GATAGAACACGTTAGGGGATGGTTGTCATTTATTTTAAGTGTGGATTCAAAAAGC

CATAGGAGATTAATAACTTATATTAGCAAATTAGAAAAAAAATATGGAAAGAAC

CCTTTAAATAAAGCGAAGACCTAATGGTCTTCGTTTTAAAACTAAAGCTCATAGG

TTGAAAAATTGAGCACTTCTTCGTCCAACTGA

SEQ ID NO 25
LENGTH: 72
TYPE: DNA
ORGANISM: Artificial
FEATURE: Prokaryotic Transcription Terminator
OTHER INFORMATION: rrnB T1 terminator
SEQUENCE:
CAAATAAAACGAAAGGCTCAGTCGAAAGACTGGGCCTTTCGTTTTATCTGTTGTT

TGTCGGTGAACGCTCTC

SEQ ID NO 26
LENGTH: 285
TYPE: DNA
ORGANISM: Artificial
FEATURE: Prokaryotic inducible promoter
OTHER INFORMATION: pBAD Inducible Promoter
SEQUENCE:
AAGAAACCAATTGTCCATATTGCATCAGACATTGCCGTCACTGCGTCTTTTACTG

GCTCTTCTCGCTAACCAAACCGGTAACCCCGCTTATTAAAAGCATTCTGTAACAA

AGCGGGACCAAAGCCATGACAAAAACGCGTAACAAAAGTGTCTATAATCACGGC

AGAAAAGTCCACATTGATTATTTGCACGGCGTCACACTTTGCTATGCCATAGCAT

TTTTATCCATAAGATTAGCGGATCCTACCTGACGCTTTTTATCGCAACTCTCTACT

GTTTCTCCAT

SEQ ID NO 27
LENGTH: 708
TYPE: DNA
ORGANISM: Artificial
FEATURE: Homing Endonuclease protein
OTHER INFORMATION: I-SceI endonuclease protein coding sequence
(codon optimized)
SEQUENCE:
ATGAAAAACATTAAAAAAAACCAGGTGATGAACCTGGGCCCGAACAGCAAACTG

CTGAAAGAATATAAAAGCCAGCTGATTGAACTGAACATTGAACAGTTTGAAGCG

GGCATTGGCCTGATTCTGGGCGATGCGTATATTCGCAGCCGCGATGAAGGCAAA

ACCTATTGCATGCAGTTTGAATGGAAAAACAAAGCGTATATGGATCATGTGTGCC

TGCTGTATGATCAGTGGGTGCTGAGCCCGCCGCATAAAAAAGAACGCGTGAACC

ATCTGGGCAACCTGGTGATTACCTGGGGCGCGCAGACCTTTAAACATCAGGCGTT

TAACAAACTGGCGAACCTGTTTATTGTGAACAACAAAAAAACCATTCCGAACAA

CCTGGTGGAAAACTATCTGACCCCGATGAGCCTGGCGTATTGGTTTATGGATGAT

GGCGGCAAATGGGATTATAACAAAAACAGCACCAACAAAAGCATTGTGCTGAAC

ACCCAGAGCTTTACCTTTGAAGAAGTGGAATATCTGGTGAAAGGCCTGCGCAAC

AAATTTCAGCTGAACTGCTATGTGAAAATTAACAAAAACAAACCGATTATTTATA

TTGATAGCATGAGCTATCTGATTTTTTATAACCTGATTAAACCGTATCTGATTCCG

CAGATGATGTATAAACTGCCGAACACCATTAGCAGCGAAACCTTTCTGAAATGA

SEQ ID NO 28
LENGTH: 48
TYPE: DNA
ORGANISM: Artificial
FEATURE: Prokaryotic Transcription Terminator
OTHER INFORMATION: T7 Terminator
SEQUENCE:
CTAGCATAACCCCTTGGGGCCTCTAAACGGGTCTTGAGGGGTTTTTG SEQ ID NO 29
LENGTH: 94
TYPE: DNA
ORGANISM: Artificial
FEATURE: GR-SYTE Aptamer
OTHER INFORMATION: DNA aptamer. Binds to Glucagon Receptor on the
surface of a number of cell types.
SEQUENCE:
TGATTCGGTGGCAATCCTGAGTGACGCAGCAGATAAGTAGGTATCCGTTTGAAA

AACTTTTCTGACCGTCCGACTATAGACACGGTGGCTTAGT

SEQ ID NO 30
LENGTH: 25
TYPE: DNA
ORGANISM: Artificial
FEATURE: Region of parental plasmid
OTHER INFORMATION: Site of recombination
SEQUENCE:
GTTCAGCTTTCTTGTACAAAGTTGG SEQ ID NO 31
LENGTH: 25
TYPE: DNA
ORGANISM: Artificial
FEATURE: Region of parental plasmid
OTHER INFORMATION: Site of recombination
SEQUENCE:
GGTTGAAACATGTTTTTCGACTTG -continued SEQ ID NO 32
LENGTH: 25
TYPE: DNA
ORGANISM: Artificial
FEATURE: Recombination between D1 (SEQ ID NO 5) and A1 (SEQ ID NO 30)
OTHER INFORMATION: Product of recombination.
SEQUENCE:
ACCCAGCTTTCTTGTACAAAGTTGG SEQ ID NO 33
LENGTH: 25
TYPE: DNA
ORGANISM: Artificial
FEATURE: Recombination between D2 (SEQ ID NO 4) and A2 (SEQ ID NO 31)
OTHER INFORMATION: Product of recombination.
SEQUENCE:
GGTTGAAAGTACAAAAAAGCAGGCT SEQ ID NO 34
LENGTH: 25
TYPE: DNA
ORGANISM: Artificial
FEATURE: Recombination between A1 (SEQ ID NO 1) and D1 (SEQ ID NO 5), left end.
OTHER INFORMATION: Product of recombination.
SEQUENCE:
GTTCAGCTTTCTTGTACAAAGTGGT SEQ ID NO 35
LENGTH: 16
TYPE: DNA
ORGANISM: Artificial
FEATURE: Loop as ssDNA by recombination between A1 (SEQ ID NO 30) and D1 (SEQ ID NO 5), left end.
OTHER INFORMATION: ssDNA loop-end of a dsDNA fragment, product of recombination.
SEQUENCE:
TAATCGTATTTATAAT SEQ ID NO 36
LENGTH: 25
TYPE: DNA
ORGANISM: Artificial
FEATURE: Recombination between A2 (SEQ ID NO 31) and D2 (SEQ ID NO 4), right end.
OTHER INFORMATION: Product of recombination.
SEQUENCE:
CAAGTCGAAAAAACATGAAACTTGT SEQ ID NO 37
LENGTH: 16
TYPE: DNA
ORGANISM: Artificial
FEATURE: Loop as ssDNA by recombination between A2 (SEQ ID NO 31) and D2 (SEQ ID NO 5), right end.
OTHER INFORMATION: ssDNA loop-end of a dsDNA fragment, product of recombination.
SEQUENCE:
TAATATTTATGCTAAT SEQ ID NO 38
LENGTH: 21
TYPE: DNA
ORGANISM: Artificial
FEATURE: PCR primer.
OTHER INFORMATION: Primer Forward.
SEQUENCE:
TTTCCACACCAACCGGTAGGC -continued SEQ ID NO 39
LENGTH: 21
TYPE: DNA
ORGANISM: Artificial
FEATURE: PCR primer.
OTHER INFORMATION: Primer Reverse.
SEQUENCE:
GCCGGCGTACAGGTCACTAAT SEQ ID NO 40
LENGTH: 21
TYPE: DNA
ORGANISM: Artificial
FEATURE: PCR primer.
OTHER INFORMATION: Primer Forward.
SEQUENCE:
AAAGGTGTGGTTGGCCATCCG SEQ ID NO 41
LENGTH: 17
TYPE: DNA
ORGANISM: Artificial
FEATURE: PCR primer.
OTHER INFORMATION: Primer Reverse.
SEQUENCE:
GTCAGCAACCAACCGGT SEQ ID NO 42
LENGTH: 23
TYPE: DNA
ORGANISM: Artificial
FEATURE: PCR primer.
OTHER INFORMATION: Primer Forward.
SEQUENCE:
TGGAGTTCCGCGTTACATAACTT SEQ ID NO 43
LENGTH: 21
TYPE: DNA
ORGANISM: Artificial
FEATURE: PCR primer.
OTHER INFORMATION: Primer Reverse.
SEQUENCE:
AGACTGCAGGCTCTAGATTCG

---

What is claimed is:

1. A nanostructure-ended double-stranded covalently-closed linear DNA molecule in vivo manufacturing system comprising:
   a recombinant cell comprising:
      a repressor protein module comprising: a first bacterial constitutive promoter, a first ribosome binding site, a first repressor protein coding sequence, a second ribosome binding site, a second repressor protein coding sequence, and a first bacterial terminator;
      a recombinase-reverse transcriptase module comprising: a first bacterial inducible promoter, a third ribosome binding site, a recombinase coding sequence, a fourth ribosome binding site, a reverse transcriptase coding sequence, and a second bacterial terminator; and
      a homing endonuclease module comprising: a second bacterial inducible promoter, a fifth ribosome binding site, a homing endonuclease coding sequence, and a third bacterial terminator; and
   a parental plasmid DNA platform, housed in the recombinant cell, comprising:
      a retron module comprising:
         a left retron unit comprising: a first parental bacterial constitutive promoter, a multi-copy single-stranded RNA (msr) sequence, a 5'-multi-copy single-stranded DNA (msd) sequence, a left sense stem recombination sequence (L-SSR), a left DNA nanostructure sequence (L-DNS) inserted in a first multiple cloning site (MCS 1), a left antisense stem recombination sequence (L-ASR), complementary to the L-SSR sequence, a 3'-msd sequence, and a first parental bacterial terminator; and
         a right retron unit comprising: a second parental bacterial €constitutive promoter, a msr sequence, a 5'-msd sequence, a right sense stem recombination sequence (R-SSR), a right DNA nanostructure sequence (R-DNS) inserted in a second multiple cloning site (MCS 2), a right antisense stem recombination sequence (R-ASR), complementary to the R-SSR sequence, a 3'-msd sequence, and a second parental bacterial terminator;
      a linear module comprising: a first acceptor recombinase recognition sequence (A1), a sequence selected from a DNA spacer and an expression cassette inserted in a third multiple cloning site (MCS 3), and a second acceptor recombinase recognition sequence (A2); and
      a bacterial backbone comprising: a parental bacterial origin of replication, a parental selection marker, and a parental homing endonuclease recognition sequence (HRE),
      wherein the retron units, linear module, and bacterial backbone are contained in at least one cloned parental plasmid DNA.

2. The manufacturing system of claim 1, wherein the repressor protein module, recombinase-reverse transcriptase module, and homing endonuclease module are contained in a helper plasmid along with a bacterial backbone comprising: a helper bacterial origin of replication, a helper selection marker, and a helper homing endonuclease recognition sequence (HRE).

3. The manufacturing system of claim 1, wherein the linear module has an expression cassette inserted in the multiple cloning site MCS 3 comprising:
- an eukaryotic enhancer;
- an eukaryotic promoter;
- an eukaryotic coding sequence (CDS); and
- an eukaryotic terminator/polyadenylation signal.

4. The manufacturing system of claim 3, wherein the expression cassette further comprises at least one of:
- a 5' untranslated region;
- a 3' untranslated region;
- an internal ribosome entry site (IRES); and
- an m6A induced ribosome engagement site (MIRES).

5. The manufacturing system of claim 1, wherein the linear module further comprises at least one of:
- a scaffold matrix attachment region (S/MAR); and
- a DNA nuclear targeting sequence (DNTS).

6. The manufacturing system of claim 1, wherein the linear module comprises a DNA spacer sequence with at least one base pair inserted in the multiple cloning site MCS 3.

7. The manufacturing system of claim 1, wherein the linear module may further comprise one or more eukaryotic origins of replication (ORIs).

* * * * *

SEQUENCE LISTING

```
Sequence total quantity: 43
SEQ ID NO: 1           moltype = DNA   length = 6866
FEATURE                Location/Qualifiers
source                 1..6866
                       mol_type = other DNA
                       organism = synthetic construct
SEQUENCE: 1
acgcgatcgc tgttaaaagg acaattacaa acaggaatcg aatgcaaccg gcgcaggaac   60
actgccagcg catcaacaat attttcacct gaatcaggat attcttctaa tacctggaat  120
gctgttttcc cagggatcgc agtggtgagt aaccatgcat catcaggagt acggataaaa  180
tgcttgatgg tcgaagagg cataaattcc gtcagccagt ttagtctgac catctcatct   240
gtaacatcat tggcaacgct acctttgcca tgtttcagaa acaactctgg cgcatcgggc  300
ttcccataca atcgatagat tgtcgcacct gattgcccga cattatcgcg agcccattta  360
tacccatata aatcagcatc catgttgaa tttaatcgcg gcctagagca agacgtttcc   420
cgttgaatat ggctcatact cttccttttt caatattatt gaagcattta tcagggttat  480
tgtctcatga gcggatacat atttgaatgt atttagaaaa ataaacaaat aggggttccg  540
cgcacatttc cccgaaaagt gccacctgac gtcgatgagc tcttgacagt tagctcagtc  600
ctaggtataa tgctagctac tagatgcgca cccttagcga gaggtttatc attaaggtca  660
acctctggat gttgtttcgg catcctgcat tgaatctgag ttactgtctg ttttcctacc  720
actttgtaca agaaagctgg gtgatatcac ccagctttct tgtacaaagt ggtcaggaaa  780
cccgtttttt ctgtctacta gagccaggca tcaaataaaa cgaaggctc agtcgaaaga   840
ctgggccttt cgttttatct gttgtttgtc ggtgaacgct ctcactaga gtcacactgg   900
ctcaccttcg ggtgggcctt tctgcgtttg taccatatt gacagctagc tcagtcctag   960
gtataatgct agcatgcgca cccttagcga gaggtttatc attaaggtca acctctggat 1020
gttgtttcgg catcctgcat tgaatctgag ttactgtctg ttttcctaca agtttgtaca 1080
aaaaagcagg ctcagctgag cctgcttttt tgtacaaact tgtcacgaaa cccgtttttt 1140
ctgtctacta gagccaggca tcaaataaaa cgaaggctc agtcgaaaga ctgggccttt  1200
cgttttatct gttgtttgtc ggtgaacgct ctcactaga gtcacactgg ctcaccttcg  1260
ggtgggcctt tctgcgctgt tatcccagat aaactcaatg atgatgatga tgatggtcga 1320
gactcacccg gggcggccgc tatcagcaca caatagtcca ttatacgcgc gtataatggc 1380
```

```
aattgtgtgc tgaaaataat gattttattt tgactgatag tgacctgttc gttgcaacaa    1440
attgataagc aatgcttct tataatgcca actttgtaca agaaagctga acgagaaacg    1500
taaaatgata taaatatcaa tatattaaat tagattttgc ataaaaaaca gactacataa    1560
tactgtaaaa cacaacatat ccagtcacta tgaatcaact acttagatgg tattagtgac    1620
ctgtacgccg gcgaggccta ccggttggtg tggaaagtcc ccaggctccc cagcaggcag    1680
aagtatgcaa agcatgcatc tcaattagtc agcaaccagc atgcatgcat tggtgtggaa    1740
agtccccagg ctccccagca ggcagaagta tgcaaagcat gcatctcaat tagtcagcaa    1800
ccagcatgca tgcatctatc catagctgat tggtctaaaa tgagatacat caacgctcct    1860
ccatgttttt tgttttcttt ttaaatgaaa aactttattt tttaagagga gtttcaggtt    1920
catagcaaaa ttgagaggaa ggtacattca agctgaggaa gttttcctct attcctagtt    1980
tactgagaga ttgcatcatg aatgggtgtt aaattttgtc aaatgctttt tctgtgtcta    2040
tcaatatgac catgtgattt tcttctttaa cctgttgatg ggacaaatta cgttaattga    2100
ttttcaaacg ttgaaccacc cttacatatc tggaataaat tctacttggt tgtggtgtat    2160
attttttgat acattcttgg attcttttg ctaatatttt gttgaaaatg tttgtatctt    2220
tgttcatgag agatattggt ctgttgtttt cttttcttgt aatgtcattt tctagttccg    2280
gtattaaggt aatgctggcc tagttgaatg atttaggaag tattccctct gcttctgtct    2340
tctgaaagag attgtagaaa gttgatacaa ttttttttc tttaaatatc ttgataggta    2400
gctatggcag ggcttgccgc cccgacgttg gctgcgagcc ctgggccttc acccgaactt    2460
ggggggttggg gtgggggaaaa ggaagaaacg cgggcgtatt ggtcccaatg gggtctcggt    2520
ggggtatcga cagagtgcca gccctgggac cgaaccccgc gtttatgaac aaacgaccca    2580
acacccgtgc gttttattct gtcttttttat tgccgtcata gcgcgggttc cttccggtat    2640
tgtctccttc cgtgtttcag ttagcctccc ccatctcccg ctcgagctga aggaattcct    2700
agttattaat agtaatcaat tacggggtca ttagttcata gcccatatat ggagttccgc    2760
gttacataac ttacggtaaa tggcccgcct ggctgaccgc ccaacgaccc ccgcccattg    2820
acgtcaataa tgacgtatgt tcccatagta acgccaatag ggactttcca ttgacgtcaa    2880
tgggtggagt atttacggta aactgcccac ttggcagtac atcaagtgta tcatatgcca    2940
agtacgcccc ctattgacgt caatgacggt aaatggcccg cctggcatta tgcccagtac    3000
atgaccttat gggactttcc tacttggcag tacatctacg tattagtcat cgctattacc    3060
atggtgatgc ggttttggca gtacatcaat gggcgtggat agcggtttga ctcacgggga    3120
tttccaagtc tccaccccat tgacgtcaat gggagtttgt tttggcacca aaatcaacgg    3180
gactttccaa aatgtcgtaa caactccgcc ccattgacgc aaatgggcgg taggcgtgta    3240
cggtgggagg tctatataag cagagctggt ttagtgaacc gtcagatcag atctaccatg    3300
gtgagcaagg gcgaggagct gttcaccggg gtggtgccca tcctggtcga gctggacggc    3360
gacgtaaacg gccacaagtt cagcgtgtcc ggcgagggcg agggcgatgc cacctacggc    3420
aagctgaccc tgaagttcat ctgcaccacc ggcaagctgc ccgtgccctg gcccaccctc    3480
gtgaccaccc tgacctacgg cgtgcagtgc ttcagccgct accccgacca catgaagcag    3540
cacgacttct tcaagtccgc catgcccgaa ggctacgtcc aggagcgcac catcttcttc    3600
aaggacgacg gcaactacaa gacccgcgcc gaggtgaagt tcgagggcga caccctggtg    3660
aaccgcatcg agctgaaggg catcgacttc aaggaggacg gcaacatcct ggggcacaag    3720
ctggagtaca actacaacag ccacaacgtc tatatcatgg ccgacaagca gaagaacggc    3780
atcaaggtga acttcaagat ccgccacaac atcgaggacg gcagcgtgca gctcgccgac    3840
cactaccagc agaacacccc catcggcgac ggccccgtgc tgctgcccga caaccactac    3900
ctgagcaccc agtccgccct gagcaaagac cccaacgaga agcgcgatca catggtcctg    3960
ctggagttcg tgaccgccgc cgggatcact ctcggcatgg acgagctgta caagtaagcg    4020
gccgctttcg aatctagagc ctgcagtctc gacaagcttg tcgagaagta ctagaggatc    4080
ataatcagcc ataccacatt tgtagaggtt ttacttgctt taaaaaacct cccacacctc    4140
cccctgaacc tgaaacataa aatgaatgca attgttgttg ttaactttgtt tattgcagct    4200
tataatggtt acaaataaag caatagcatc acaaatttca caaataaagc attttttca    4260
ctgcattcta gttgtggttt gtccaaactc atcaatgtat cttatcatgt ctggatcgct    4320
agctctagag tcgacgatca taatcagcca taccacattt gtagaggttt tacttgcttt    4380
aaaaaacctc ccacacctcc ccctgaacct gaaacataaa atgaatgcaa ttgttgttgt    4440
taacttgttt attgcagctt ataatggtta caaataaagc aatagcatca caaatttcac    4500
aaataaagca tttttttcac tgcattctag ttgtggtttg tccaaactca tcaatgtatc    4560
ttatcatgtc tggatcctat ccatagctga ttggtctaaa atgagataca tcaacgctcc    4620
tccatgtttt ttgttttctt ttaaatgaaa aactttattt tttaagagg agtttcaggt    4680
tcatagcaaa attgagagga aggtacattc aagctgagga gttttcctc tattcctagt    4740
ttactgagag attgcatcat gaatgggtgt aaattttgt caaatgcttt ttctgtgtct    4800
atcaatatga ccatgtgatt tcttcttta acctgttgat gggacaaatt cgttaattg    4860
attttcaaac gttgaaccac ccttacatat ctggaataaa ttctacttgg ttgtggtgta    4920
tatttttga tacattcttg gattcttttt gctaatattt tgttgaaaat gtttgtatct    4980
ttgttcatga gagatattgg tctgttgttt tcttttcttg taatgtcatt ttctagttcc    5040
ggtattaagg taatgctggc ctagttgaat gatttaggaa gtattccctc tgcttctgtc    5100
ttctgaaaga gattgtagaa agttgataca attttttttt ctttaaatat cttgataggc    5160
acgcatgcat tggtgtggaa agtccccagg ctccccagca ggcagaagta tgcaaagcat    5220
gcatctcaat tagtcagcaa ccagcatgca tgcattggtg tggaaagtcc ccaggctccc    5280
cagcaggcag aagtatgcaa agcatgcatc tcaattagtc agcaaccaac cggtaggcct    5340
cgccggcgaa ataatgattt tattttgact gatagtgacc tgttcgttgc aacaaattga    5400
tgagcaatgc ttttttataa tgccaacttt gtacaaaaaa gctgaacgag aaacgtaaaa    5460
tgatataaat atcaatatat aaattagat tttgctaaaa aacagacta cataatactg    5520
taaaacacaa catatccagt cactatgaat caactactta gatggtatta gtgacctgta    5580
tatcagcaca aatagtcca ttatacgcgc gtataatggc aattgtgtgc tgaggggata    5640
acgcaggaaa gaacatgtac tagtatcaca tgtgagcaaa aggccagcaa aaggccagga    5700
accgtaaaaa ggccgcgttg ctggcgtttt tccataggct ccgcccccct gacgagcatc    5760
acaaaaatcg acgctcaagt cagaggtggc gaaacccgac aggactataa agataccagg    5820
cgtttccccc tggaagctcc ctcgtgcgct ctcctgttcc gaccctgccg cttaccggat    5880
acctgtccgc ctttctccct tcgggaagcg tggcgctttc tcatagctca cgctgtaggt    5940
atctcagttc ggtgtaggtc gttcgctcca agctgggctg tgtgcacgaa ccccccgttc    6000
agcccgaccg ctgcgcctta tccggtaact atcgtcttga gtccaacccg gtaagacacg    6060
acttatcgcc actggcagca gccactggta acaggattag cagagcgagg tatgtaggcg    6120
```

-continued

```
gtgctacaga gttcttgaag tggtggccta actacggcta cactagaaga acagtatttg 6180
gtatctgcgc tctgctgaag ccagttacct tcggaaaaag agttggtagc tcttgatccg 6240
gcaaacaaac caccgctggt agcggtggtt ttttgtttg caagcagcag attacgcgca 6300
gaaaaaaagg atctcaagaa gatcctttga tcttttctac ggggtctgac gctcagtgga 6360
acgaaaactc acgttaaggg attttggtca tgagattatc aaaaaggatc ttcacctaga 6420
tccttttaaa ttaaaaatga agttttaaat caatctaaag tatatatgag taaacttggt 6480
ctgacagtta gaaaaactca tcgagcatca aatgaaactg caatttattc atatcaggat 6540
tatcaatacc atatttttga aaaagccgtt tctgtaatga aggagaaaac tcaccgaggc 6600
agttccatag gatggcaaga tcctggtatc ggtctgcgat tccgactcgt ccaacatcaa 6660
tacaacctat taatttcccc tcgtcaaaaa taaggttatc aagtgagaaa tcaccatgag 6720
tgacgactga atccggtgag aatggcaaaa gtttatgcat ttctttccag acttgttcaa 6780
caggccagcc attacgctcg tcatcaaaat cactcgcatc aaccaaaccg ttattcattc 6840
gtgattgcgc ctgagcgaaa cgaaat                                       6866

SEQ ID NO: 2            moltype = DNA   length = 35
FEATURE                 Location/Qualifiers
source                  1..35
                        mol_type = other DNA
                        organism = synthetic construct
SEQUENCE: 2
ttgacagcta gctcagtcct aggtataatg ctagc                             35

SEQ ID NO: 3            moltype = DNA   length = 28
FEATURE                 Location/Qualifiers
source                  1..28
                        mol_type = other DNA
                        organism = synthetic construct
SEQUENCE: 3
ggctcacctt cgggtgggcc tttctgcg                                     28

SEQ ID NO: 4            moltype = DNA   length = 25
FEATURE                 Location/Qualifiers
source                  1..25
                        mol_type = other DNA
                        organism = synthetic construct
SEQUENCE: 4
acaagtttgt acaaaaaagc aggct                                        25

SEQ ID NO: 5            moltype = DNA   length = 25
FEATURE                 Location/Qualifiers
source                  1..25
                        mol_type = other DNA
                        organism = synthetic construct
SEQUENCE: 5
acccagctttt cttgtacaaa gtggt                                       25

SEQ ID NO: 6            moltype = DNA   length = 232
FEATURE                 Location/Qualifiers
source                  1..232
                        mol_type = other DNA
                        organism = synthetic construct
SEQUENCE: 6
aaataatgat ttatttttga ctgatagtga cctgttcgtt gcaacaaatt gatgagcaat 60
gcttttttat aatgccaact tgtacaaaa aagctgaacg agaaacgtaa aatgatataa 120
atatcaatat attaaattag attttgcata aaaaacagac tacataatac tgtaaaacac 180
aacatatcca gtcactatga tcaactact tagatggtat tagtgacctg ta            232

SEQ ID NO: 7            moltype = DNA   length = 232
FEATURE                 Location/Qualifiers
source                  1..232
                        mol_type = other DNA
                        organism = synthetic construct
SEQUENCE: 7
aaataatgat ttatttttga ctgatagtga cctgttcgtt gcaacaaatt gataagcaat 60
gctttcttat aatgccaact tgtacaagaa agctgaacg agaaacgtaa aatgatataa  120
atatcaatat attaaattag attttgcata aaaaacagac tacataatac tgtaaaacac 180
aacatatcca gtcactatga tcaactact tagatggtat tagtgacctg ta            232

SEQ ID NO: 8            moltype = DNA   length = 816
FEATURE                 Location/Qualifiers
source                  1..816
                        mol_type = other DNA
                        organism = synthetic construct
SEQUENCE: 8
ttagaaaaac tcatcgagca tcaaatgaaa ctgcaattta ttcatatcag gattatcaat 60
accatatttt tgaaaaagcc gtttctgtaa tgaaggagaa aactcaccga ggcagttcca 120
taggatggca agatcctggt atcggtctgc gattccgact cgtccaacat caatacaacc 180
tattaatttc cctcgtcaa aaataaggtt atcaagtgag aaatcaccat gagtgacgac 240
tgaatccggt gagaatggca aaagtttatg catttctttc cagacttgtt caacaggcca 300
```

```
gccattacgc tcgtcatcaa aatcactcgc atcaaccaaa ccgttattca ttcgtgattg    360
cgcctgagcg aaacgaaata cgcgatcgct gttaaaagga caattacaaa caggaatcga    420
atgcaaccgg cgcaggaaca ctgccagcgc atcaacaata ttttcacctg aatcaggata    480
ttcttctaat acctggaatg ctgttttccc agggatcgca gtggtgagta accatgcatc    540
atcaggagta cggataaaat gcttgatggt cggaagagca ataaattccg tcagccagtt    600
tagtctgacc atctcatctg taacatcatt ggcaacgcta cctttgccat gtttcagaaa    660
caactctggc gcatcgggct tcccatacaa tcgatagatt gtcgcacctg attgcccgac    720
attatcgcga gcccatttat acccatataa atcagcatcc atgttggaat ttaatcgcgg    780
cctagagcaa gacgtttccc gttgaatatg gctcat                              816

SEQ ID NO: 9           moltype = DNA   length = 589
FEATURE                Location/Qualifiers
source                 1..589
                       mol_type = other DNA
                       organism = synthetic construct
SEQUENCE: 9
tttccatagg ctccgccccc ctgacgagca tcacaaaaat cgacgctcaa gtcagaggtg     60
gcgaaacccg acaggactat aaagatacca ggcgtttccc cctggaagct ccctcgtgcg    120
ctctcctgtt ccgaccctgc cgcttaccgg atacctgtcc gcctttctcc cttcgggaag    180
cgtggcgctt tctcatagct cacgctgtag gtatctcagt tcggtgtagg tcgttcgctc    240
caagctgggc tgtgtgcacg aaccccccgt tcagcccgac cgctgcgcct tatccggtaa    300
ctatcgtctt gagtccaacc cggtaagaca cgacttactg ccactggcag cagccactgg    360
taacaggatt agcagagcga ggtatgtagg cggtgctaca gagttcttga agtggtggcc    420
taactacggc tacactagaa gaacagtatt tggtatctgc gctctgctga agccagttac    480
cttcggaaaa agagttggta gctcttgatc cggcaaacaa accaccgctg gtagcggtgg    540
tttttttgtt tgcaagcagc agattacgcg cagaaaaaaa ggatctcaa              589

SEQ ID NO: 10          moltype = DNA   length = 18
FEATURE                Location/Qualifiers
source                 1..18
                       mol_type = other DNA
                       organism = synthetic construct
SEQUENCE: 10
tagggataac agggtaat                                                   18

SEQ ID NO: 11          moltype = DNA   length = 3683
FEATURE                Location/Qualifiers
source                 1..3683
                       mol_type = other DNA
                       organism = synthetic construct
SEQUENCE: 11
tggtgtggaa agtccccagg ctccccagca ggcagaagta tgcaaagcat gcatctcaat     60
tagtcagcaa ccagcatgca tgcattggtg tggaaagtcc caggctcccc agcaggcag    120
aagtatgcaa agcatgcatc tcaattagtc agcaaccagc atgcatgcat ctatccatag    180
ctgattggtc taaaatgaga tacatcaacg ctcctccatg ttttttgttt tcttttttaaa    240
tgaaaaactt tattttttaa gaggagtttc aggttcatag caaaattgag aggaaggtac    300
attcaagctg aggaagtttt cctctattcc tagtttactg agagattgca tcatgaatgg    360
gtgttaaatt ttgtcaaatg cttttttctgt gtctatcaat atgaccatgt gattttcttc    420
tttaacctgt tgatgggaca aattacgtta attgattttc aaacgttgaa ccacccttac    480
atatctggaa taaattctac ttggttgtgg tgtatatttt ttgatacatt cttggattct    540
ttttgctaat attttgttga aaatgtttgt atctttgttc atgagagata ttggtctgatt    600
gttttctttt cttgtaatgt catttttctag ttccggtatt aaggtaatgc tggcctagtt    660
gaatgattta ggaagtattc cctctgcttc tgtcttctga aagagattgt agaaagttga    720
tacaattttt ttttctttaa atatcttgat aggtggctat ggcagggctt gccgccccga    780
cgttgctgc gagccctggg ccttcacccg aacttggggg ttggggtggg gaaaaggaag    840
aaacgcgggc gtattggtcc caatggggtc tcggtggggt atcgacagag tgccagccct    900
gggaccgaac cccgcgttta tgaacaaacg acccaacacc cgtgcgtttt attctgtctt    960
tttattgccg tcatagcgcg ggttccttcc ggtattgtct ccttccgtgt ttcagttagc   1020
ctccccatc tcccgctcga gctgcaggaa ttccatgtta ttaatagtaa tcaattacgg    1080
ggtcattagt tcatagccca tatatggagt tccgcgttac ataacttacg gtaaatggcc   1140
cgcctggctg accgcccaac gacccccgcc cattgacgtc aataatgacg tatgttccca   1200
tagtaacgcc aatagggact ttccattgac gtcaatgggt ggagtattta cggtaaactg   1260
cccacttggc agtacatcaa gtgtatcata tgccaagtac gccccctatt gacgtcaatg   1320
acggtaaatg gcccgcctgg cattatgccc agtacatgac cttatgggac tttcctactt   1380
ggcagtacat ctacgtatta gtcatcgcta ttaccatggt gatgcggttt tggcagtaca   1440
tcaatgggcg tggatagcgg tttgactcac ggggatttcc aagtctccac cccattgacg   1500
tcaatgggag tttgttttgg caccaaaatc aacgggactt tccaaaatgt cgtaacaact   1560
ccgccccatt gacgcaaatg ggcggtaggc gtgtacggtg ggaggtctat ataagcagag   1620
ctggtttagt gaaccgtcag atcagatcta ccatggtgag caagggcgag gagctgttca   1680
ccggggtgt gcccatcctg gtcgagctgg acggcgacgt aaacggccac aagttcagcg   1740
tgtccggcga gggcgagggc gatgccacct acggcaagct gaccctgaag ttcatctgca   1800
ccaccggcaa gctgcccgtg ccctggccca ccctcgtgac caccctgacc tacggcgtgc   1860
agtgcttcag ccgctacccc gaccacatga agcagcacga cttcttcaag tccgccatgc   1920
ccgaaggcta cgtccaggag cgcaccatct tcttcaagga cgacggcaac tacaagaccc   1980
gcgccgaggt gaagttcgag ggcgacaccc tggtgaaccg catcgagctg aagggcatcg   2040
acttcaagga ggacggcaac atcctggggc acaagctgga gtacaactac aacagccaca   2100
acgtctatat catggccgac aagcagaaga acggcatcaa ggtgaacttc aagatccgcc   2160
acaacatcga ggacggcagc gtgcagctcg ccgaccacta ccagcagaac ccccccatcg   2220
gcgacggccc cgtgctgctg cccgacaacc actacctgag cacccagtcc gccctgagca   2280
```

| | | | |
|---|---|---|---|
| aagaccccaa | cgagaagcgc gatcacatgg tcctgctgga gttcgtgacc gccgccggga | 2340 |
| tcactctcgg | catggacgag ctgtacaagt aagcggccgc tttcgaatct agagcctgca | 2400 |
| gtctcgacaa | gcttgtcgag aagtactaga ggatcataat cagccatacc acatttgtag | 2460 |
| aggttttact | tgctttaaaa aacctcccac acctcccccct gaacctgaaa cataaaatga | 2520 |
| atgcaattgt | tgttgttaac ttgttttattg cagcttataa tggttacaaa taaagcaata | 2580 |
| gcatcacaaa | tttcacaaat aaagcatttt tttcactgca ttctagttgt ggtttgtcca | 2640 |
| aactcatcaa | tgtatcttat catgtctgga tcgctagctc tagagtcgac gatcataatc | 2700 |
| agccatacca | catttgtaga ggttttactt gctttaaaaa acctcccaca cctcccctg | 2760 |
| aacctgaaac | ataaaatgaa tgcaattgtt gttgttaact tgtttattgc agcttataat | 2820 |
| ggttacaaat | aaagcaatag catcacaaat ttcacaaata aagcattttt ttcactgcat | 2880 |
| tctagttgtg | gtttgtccaa actcatcaat gtatcttatc atgtctggat cctatccata | 2940 |
| gctgattggt | ctaaaatgag atacatcaac gctcctccat gttttttgtt ttcttttttaa | 3000 |
| atgaaaaact | ttatttttta agaggagttt caggttcata gcaaaattga gaggaaggta | 3060 |
| cattcaagct | gaggaagttt tcctctattc ctagtttact gagagattgc atcatgaatg | 3120 |
| ggtgttaaat | tttgtcaaat gctttttctg tgtctatcaa tatgaccatg tgattttctt | 3180 |
| ctttaacctg | ttgatgggac aaattacgtt aattgatttt caaacgttga accaccctta | 3240 |
| catatctgga | ataaattcta cttggttgtg gtgtatattt tttgatacat tcttggattc | 3300 |
| tttttgctaa | tattttgttg aaaatgtttg tatctttgtt catgagagat attggtctgt | 3360 |
| tgttttcttt | tcttgtaatg tcattttcta gttccggtat taaggtaatg ctggcctagt | 3420 |
| tgaatgattt | aggaagtatt ccctctgctt ctgtcttctg aaagagattg tagaaagttg | 3480 |
| atacaatttt | ttttcttta aatatcttga taggcacgca tgcattggtg tggaaagtcc | 3540 |
| ccaggctccc | cagcaggcag aagtatgcaa agcatgcatc tcaattagtc agcaaccagc | 3600 |
| atgcatgcat | tggtgtgaa agtcccagg ctccccagca ggcagaagta tgcaaagcat | 3660 |
| gcatctcaat | tagtcagcaa cca | 3683 |

```
SEQ ID NO: 12            moltype = DNA   length = 589
FEATURE                  Location/Qualifiers
source                   1..589
                         mol_type = other DNA
                         organism = synthetic construct
SEQUENCE: 12
```

| | | | |
|---|---|---|---|
| ctagttatta | atagtaatca attacggggt cattagttca tagcccatat atggagttcc | 60 |
| gcgttacata | acttacggta aatggcccgc ctggctgacc gcccaacgac ccccgcccat | 120 |
| tgacgtcaat | aatgacgtat gttcccatag taacgccaat agggactttc cattgacgtc | 180 |
| aatgggtgga | gtatttacgg taaactgccc acttggcagt acatcaagtg tatcatatgc | 240 |
| caagtacgcc | ccctattgac gtcaatgacg gtaaatggcc cgcctggcat tatgcccagt | 300 |
| acatgacctt | atgggactt cctacttggc agtacatcta cgtattagtc atcgctatta | 360 |
| ccatggtgat | gcggttttgg cagtacatca atgggcgtgg atagcggttt gactcacggg | 420 |
| gatttccaag | tctccacccc attgacgtca atgggagttt gttttggcac caaaatcaac | 480 |
| gggactttcc | aaaatgtcgt aacaactccg cccattgac gcaaatgggc ggtaggcgtg | 540 |
| tacggtggga | ggtctatata agcagagctg gtttagtgaa ccgtcagat | 589 |

```
SEQ ID NO: 13            moltype = DNA   length = 720
FEATURE                  Location/Qualifiers
source                   1..720
                         mol_type = other DNA
                         organism = synthetic construct
SEQUENCE: 13
```

| | | | |
|---|---|---|---|
| atggtgagca | agggcgagga gctgttcacc ggggtggtgc ccatcctggt cgagctggac | 60 |
| ggcgacgtaa | acggccacaa gttcagcgtg tccggcgagg gcgagggcga tgccacctac | 120 |
| ggcaagctga | ccctgaagtt catctgcacc accggcaagc tgcccgtgcc ctggcccacc | 180 |
| ctcgtgacca | ccctgaccta cggcgtgcag tgcttcagcc gctaccccga ccacatgaag | 240 |
| cagcacgact | tcttcaagtc cgccatgccc gaaggctacg tccaggagcg caccatcttc | 300 |
| ttcaaggacg | acggcaacta caagacccgc gccgaggtga agttcgaggg cgacaccctg | 360 |
| gtgaaccgca | tcgagctgaa gggcatcgac ttcaaggagg acggcaacat cctggggcag | 420 |
| aagctggagt | acaactacaa cagccacaac gtctatatca tggccgacaa gcagaagaac | 480 |
| ggcatcaagg | tgaacttcaa gatccgccac aacatcgagg acggcagcgt gcagctcgcc | 540 |
| gaccactacc | agcagaacac ccccatcggc gacggccccg tgctgctgcc cgacaaccac | 600 |
| tacctgagca | cccagtccgc cctgagcaaa gaccccaacg agaagcgcga tcacatggtc | 660 |
| ctgctggagt | tcgtgaccgc cgcgggatc actctcggca tggacgagct gtacaagtaa | 720 |

```
SEQ ID NO: 14            moltype = DNA   length = 241
FEATURE                  Location/Qualifiers
source                   1..241
                         mol_type = other DNA
                         organism = synthetic construct
SEQUENCE: 14
```

| | | | |
|---|---|---|---|
| gatcataatc | agccatacca catttgtaga ggttttactt gctttaaaaa acctcccaca | 60 |
| cctcccctg | aacctgaaac ataaaatgaa tgcaattgtt gttgttaact tgtttattgc | 120 |
| agcttataat | ggttacaaat aaagcaatag catcacaaat ttcacaaata aagcattttt | 180 |
| ttcactgcat | tctagttgtg gtttgtccaa actcatcaat gtatcttatc atgtctggat | 240 |
| c | | 241 |

```
SEQ ID NO: 15            moltype = DNA   length = 582
FEATURE                  Location/Qualifiers
source                   1..582
                         mol_type = other DNA
                         organism = synthetic construct
SEQUENCE: 15
```

```
ctatccatag ctgattggtc taaaatgaga tacatcaacg ctcctccatg ttttttgttt    60
tctttttaaa tgaaaaactt tattttttaa gaggagtttc aggttcatag caaaattgag   120
aggaaggtac attcaagctg aggaagtttt cctctattcc tagtttactg agagattgca   180
tcatgaatgc gtgttaaatt ttgtcaaatg cttttttctgt gtctatcaat atgaccatgt  240
gatttttcttc tttaacctgt tgatgggaca aattacgtta attgattttc aaacgttgaa   300
ccacccttac atatctggaa taaattctac ttggttgtgg tgtatatttt ttgatacatt   360
cttggattct ttttgctaat attttgttga aaatgtttgt atctttgttc atgagagata   420
ttggtctgtt gttttctttt cttgtaatgt cattttctag ttccggtatt aaggtaatgc   480
tggcctagtt gaatgattta ggaagtattc cctctgcttc tgtcttctga aagagattgt   540
agaaagttga tacaatttt ttttctttaa atatcttgat ag                       582

SEQ ID NO: 16          moltype = DNA   length = 73
FEATURE                Location/Qualifiers
source                 1..73
                       mol_type = other DNA
                       organism = synthetic construct
SEQUENCE: 16
tggtgtggaa agtccccagg ctccccagca ggcagaagta tgcaaagcat gcatctcaat    60
tagtcagcaa cca                                                       73

SEQ ID NO: 17          moltype = DNA   length = 10836
FEATURE                Location/Qualifiers
source                 1..10836
                       mol_type = other DNA
                       organism = synthetic construct
SEQUENCE: 17
tcgcgcgttt cggtgatgac ggtgaaaacc tctgacacat gcagctcccg gagacggtca    60
cagcttgtct gtaagcggat gccgggagca gacaagcccg tcagggcgcg tcagcgggtg   120
ttggcgggtg tcgggctgg cttaactatg cggcatcaga gcagattgta ctgagagtgc   180
accatatgcg gtgtgaaata ccgcacagat gcgtaaggag aaaataccgc atcaggcgcc   240
attcgccatt caggctgcgc aactgttggg aagggcgatc ggtgcgggcc tcttcgctat   300
tacgccagct ggcgaaaggg ggatgtgctg caaggcgatt aagttgggta acgccagggt  360
tttcccagtc acgacgttgt aaaacgacgg ccagtgaatt ggagatcggt acttcgcgaa   420
tgcgtcgaga tgtagtggcc aggacccaac gctgcccgaa attggccagg acccaacgc   480
tagtctgccc gaaattccga caccatcgaa tggtgcaaaa cctttcgcgg tatgcgatga   540
tagcgcccgg aagagagtca attcagggtg tgaatgtga aaccagtaac gttatacgat   600
gtcgcagagt atgccggtgt ctcttatcag accgtttccc gcgtggtgaa ccaggccagc   660
cacgtttctg cgaaaacgcg ggaaaaagtg gaagcggcga tggcggagct gaattacatt   720
cccaaccgcg tggcacaaca actggcgggc aaacagtcgt tgctgattgg cgttgccacc   780
tccagtctgg ccctgcacgc gccgtcgcaa attgtcgcgg cgattaaatc tcgcgccgat   840
caactgggtg ccagcgtggt ggtgtcgatg gtagaacgaa gcggcgtcga agcctgtaaa   900
gcggcggtgc acaatcttct cgcgcaacgc gtcagtgggc tgatcattaa ctatccgctg   960
gatgaccagg atgccattgc tgtggaagct gcctgcacta atgttccggc gttatttctt  1020
gatgtctctg accagacacc catcaacagt attattttct cccatgaaga cggtacgcga  1080
ctgggcgtgg agcatctggt cgcattgggt caccagcaaa tcgcgctgtt agcgggccca  1140
ttaagttctg tctcggcgcg tctgcgtctg gctggctgg ataaatatct cactcgcaat  1200
caaattcagc cgatagcgga acgggaaggc gactggagtg ccatgtccgg ttttcaacaa  1260
accatgcaaa tgctgaatga gggcatcgtt cccactgcga tgctggttgc caacgatcag  1320
atggcgctgg gcgcaatgcg cgccattacc gagtccgggc tgcgcgttgg tgcggatatt  1380
tcggtagtgg gatacgacga taccgaagac agctcatgtt atatcccgcc gttaaccacc  1440
atcaaacagg attttcgcct gctggggcaa accagcgtgg accgcttgct gcaactctct  1500
cagggccagg cggtgaaggg caatcagctg ttgcccgtct cactggtgaa aagaaaaacc  1560
accctggcgc ccaatacgca aaccgcctct ccccgcgcgt tggccgattc attaatgcag  1620
ctggcacgac aggtttcccg actggaaagc gggcagtgag aattcaataa ttttgtttaa  1680
ctttaagaag gagatataca tatggcgaga gcgcaaaatg atcccctgct gccgggatac  1740
tcgtttaatg cccatctggt ggcgggttta acgccgattg aggccaacgg ttatctcgat  1800
ttttttatcg accgaccgct gggaatgaaa ggttatattc tcaatctcac cattcgcggt  1860
cagggggtgg tgaaaatca gggacagaaa tttgtttgcc gacccgggtga tattttgctg  1920
ttcccgccag gagagattca tcactacggt cgtcatccgg aggctcgcga atggtatgac  1980
cagtggttt actttcgtcc gcgcgcctac tggcatgaat ggcttaactg gccgtcaata  2040
tttgccaata cggggttctt tcgcccggat gaagcgcacc agccgcattt cagcgacctg  2100
tttgggcaaa tcattaacgc cgggcaaggg aagggcgct attcggagct gctggcgata  2160
aatctgcttg agcaattgtt actgcggcgc atggaagcga ttaacgagtc gctccatcca  2220
ccgatggata tcgggtacg cgaggcttgt cagtacatca gcgatcacct ggcagacagc  2280
aattttgata tcgccagcgt cgcacagcat gtttgcttgt cgccgtcgcg tctgtcacat  2340
cttttccgcc agcagttagg gattagcgtc ttaagctggc gcgaggacca acgtatcagc  2400
caggcgaagc tgcttttgag caccacccgg atgcctatcg ccaccgtcgg tcgcaatgtt  2460
ggttttgacg atcaactcta tttctcgcgg gtatttaaaa aatgcaccgg ggccagcccg  2520
agcgagttcc gtgccggttg tgaagaaaaa gtgaatgatg tagccgtcaa gttgtcataa  2580
gcgcaacgca attaatgtaa gttagctcac tcattaggga caattctcat gtttgacagc  2640
ttatcatcga ctgcacggtg caccaatgct tctggcgtca ggcagccatc ggaagctgtg  2700
gtatggctgt gcaggtcgta aatcactgca taattcgtgt cgctcaaggc gcactcccgt  2760
tctgataat gttttttgcg ccgacatcat aacggttctg gcaaatattc tgaaatgagc  2820
tacggcctca acctactact tctagagggc tgcttcctaa tgcaggattt acactttatg  2880
cttccggctc gtatgttgtg tggaattgtg agcggataac aatttcacac atactagagt  2940
cacacaggaa agtactaggt ggacacgtac gcgggtgctt acgaccgtca gtcgcgcgag  3000
cgcgagaatt cgagcgcagc aagcccagcg acacagcgta gcgccaacga agacaaggcg  3060
gccgacctta agcgcgaagt cgagcgcgac ggggccggt tcaggttcgt cgggcatttc  3120
agcgaagcgc cgggcacgtc ggcgttcggg acggcggagc gcccggagtt cgaacgcatc  3180
```

```
ctgaacgaat gccgcgccgg gcggctcaac atgatcattg tctatgacgt gtcgcgcttc   3240
tcgcgcctga aggtcatgga cgcgattccg attgtctcgg aattgctcgc cctgggcgtg   3300
acgattgttt ccactcagga aggcgtcttc cggcagggaa acgtcatgga cctgattcac   3360
ctgattatgc ggctcgacgc gtcgcacaaa gaatcttcgc tgaagtcggc gaagattctc   3420
gacacgaaga accttcagcg cgaattgggc gggtacgtcg gcgggaaggc gccttacggc   3480
ttcgagcttg tttcggagac gaaggagatc acgcgcaacg gccgaatggt caatgtcgtc   3540
atcaacaagc ttgcgcactc gaccactccc cttccggac ccttcgagtt cgagcccgac    3600
gtaatccggt ggtggtggcg tgagatcaag acgcacaaac accttccctt caagccgggc   3660
agtcaagccg ccattcaccc gggcagcatc acggggcttt gtaagcgcat ggacgctgac   3720
gccgtgccga cccggggcga gacgattggg aagaagaccg cttcaagcgc ctgggacccg   3780
gcaaccgtta tgcgaatcct tcgggacccg cgtattgcgg gcttcgccgc tgaggtgatc   3840
tacaagaaga agcggacgg cacgccgacc acgaagattg agggttaccg cattcagcgc    3900
gacccgatca cgctccggcc ggtcgagctt gattgcggac cgatcatcga gcccgctgag   3960
tggtatgagc ttcaggcgtg gttggacggc aggggggcgcg gcaaggggct ttcccgggga  4020
caagccattc tgtccgccat ggacaagctg tactgcgagt gtggcgccgt catgacttcg   4080
aagcgcgggg aagaatcgat caaggactct taccgctgcc gtcgcggaa ggtggtcgac    4140
ccgtccgcac ctgggcagca cgaaggcacg tgcaacgtca gcatgcggc actcgacaag    4200
ttcgttgcgg aacgcatctt caacaagatc aggcacgccg aaggcgacga agagacgttg   4260
gcgcttctgt gggaagccgc ccgacgcttc ggcaagctca ctgaggcgcc tgagaagagc   4320
ggcgaacggg cgaaccttgt tgcggagcgc gccgacgccc tgaacgccct tgaagagctg   4380
tacgaagacc gcgcggcagg cgcgtacgac ggacccgttg gcaggaagca cttccggaag   4440
caacaggcag cgctcgacgc t ccggcagcaa ggggcggaag agcggcttgc cgaacttgaa   4500
gccgccgaag cccgaagct tccccttgac caatgttcc ccgaagacgc cgacgctgac     4560
ccgaccggcc ctaagtcgtg gtgggggcgc gcgtcagtag acgacaagcg cgtgttcgtc   4620
gggctcttcg tagacaagat cgttgtcacg aagtcgacta cgggcagggg gcagggaacg   4680
cccatcgaca agcgcgcttc gatcacgtgg gcgaagccgc cgaccgacga cgacgaagac   4740
gacgcccagg acggcacgga agacgtagcg gcgtaggaat tcaataattt tgtttaactt   4800
taagaaggag atatacatat gaacaatttg catgacatgt ctaaggcgac tcgcatatct   4860
gttgaaacac ttcggttgtt aatctataca gctgattttc gctataggat ctacactgta   4920
gaaaagaaag gcccagagaa gagaatgaga accatttaac aaccttctcg agaacttaaa   4980
gccttacaag gatgggttct acgtaacatt ttagataaac tgtcgtcatc tccttttct    5040
attggatttg aaaagcacca atctattttg aataatgcta ccccgcatat tggggcaaac   5100
tttatactga atattgattt ggaggatttt ttcccaagtt taactgctaa caaagttttt   5160
ggagtgttcc attctcttgg ttataatcga ctaatatctt cagttttgac aaaaatatgt   5220
tgttataaaa atctgctacc acaaggtgct ccatcatcac ctaaattagc taatctaata   5280
tgttctaaac ttgattatcg tattcagggt tatgcaggta gtcggggctt gatatatacg   5340
agatatgccg atgatctcac cttatctgca cagtctatga aaaaggttgt taaagcacgt   5400
gattttttat tttctataat cccaagtgaa ggattggtta ttaactcaaa aaaaacttgt   5460
attagtgggc ctcgtagtca gaggaaagtt acaggtttag ttatttcaca agagaaagtt   5520
gggataggta gagaaaaata taagaaatt agagcaaaga tacatcatat attttgcggt   5580
aagtcttctg agatagaaca cgttagggga tggttgtcat ttattttaag tgtggattca   5640
aaaagccata ggagattaat aacttatatt agcaaattag aaaaaaaata tggaagaac    5700
cctttaaata aagcgaagac ctaatgtgtct tcgttttaaa actaaagctc ataggttgca   5760
aaattgagca cttcttcgtc caactgatac tagagccagg catcaaataa aacgaaaggc   5820
tcagtcgaaa gactgggcct ttcgttttat ctgttgtttg tcggtgaacg ctctcattgt   5880
gctagcatgc ataagaaacc aattgtccat attgcatcag acattgccgt cactgcgtct   5940
tttactggct cttctcgcta accaaaccgg taaccccgct tattaaaagc attctgtaac   6000
aaagcgggac caaagccatg acaaaaacgc gtaacaaaag tgtctataat cacggcagaa   6060
aagtccacat tgattatttg cacggcgtca cactttgcta tgccatagca ttttttatcca   6120
taagattagc ggatcctacc tgacgctttt tatcgcaact ctctactgtt tctccatacc   6180
cgttttttg ggctagcgaa ttcgagctca agaggatacc atatgaaaaa cattaaaaaa   6240
aaccaggtga tgaacctggg cccgaacagc aaactgctga agaatatata aagccagctg   6300
attgaactga acattgaaca gtttgaagcg gcattggcc tgattctggg cgatgcgtat    6360
attcgcagcc gcgatgaagg caaaacctat tgcatgcagt ttgaatgaa aaacaaagcg    6420
tatatgatc atgtgtgat gctgtatgat cagtgggtgc tgagcccgcc gcataaaaaa     6480
gaacgcgtga accatctggg caacctggtg attaccgtggg gcgcgcagac ctttaaacat   6540
caggcgttta acaaactggc gaacctgttt attgtgaaca caaaaaaac cattccgaac    6600
aacctggtgg aaaactatct gaccccgatg agcctggcgt attggtttat ggatgatggc   6660
ggcaaatggg attataacaa aaacagcacc aacaaaagca ttgtgctgaa caccagagc   6720
tttaccttg aagaagtgga atatctggtg aaaggcctgc gcaacaaatt tcagctgaac    6780
tgctatgtga aaattaacaa aaacaaaccg attattata ttgatagcat gagctatctg    6840
atttttata acctgattaa accgtatctg attccgcaga tgatgtataa actgccgaac    6900
accattagca gcgaaacctt tctgaaatga ttaacctagg ctgctgccac cgctgagcaa   6960
taactagcat aacccttgg ggcctctaaa cgggtcttga ggggttttt gatggttgca    7020
ggccccgtgg ccggggact gttctgcagg ggcgccatct cctcactcaa aggcggtaat    7080
acggttatta tcgggatgc cgggaccgac gagtgcagag gcgtcaagc gagcttggcg     7140
taatcatggt catagctgtt tcctgtgtga aattgttatc cgctcacaat tccacacaac   7200
atacgagccg gaagcataaa gtgtaaagcc tggggtgcct aatgagtgag ctaactcaca   7260
ttaattgcgt tgcgctcact gcccgctttc cagtcgggaa acctgtcgtg ccagctgcat   7320
taatgaatcg gccaacgcgc ggggagaggc ggtttgcgta ttgggcgctc ttccgcttcc   7380
tcgctcactg actcgcggcc gcgctgcgct cggtcgttcg gctgcggcga gcggtaggga   7440
taacaggta atgtcatctg gataacagg gtaatgtcat ctaggataa cagggtatgt      7500
catctgggat aacagggtaa tgtatctagg ataacaggg taatgtcatc tgggataaca    7560
gggtaatgtc atctagggat aacagggtat aatgtatcta              7620
gggataacag ggtaatgtca tctgggataa cagggtaatg tcatctaggg ataacagggt   7680
atgtcatctg gataacagg gtaatgtatc taggataaac agggtaatgt catctgggat    7740
aacagggtaa tgtcatctag gataacagg gtatgtcatc tgggataaca gggtaatgta   7800
tctagggata acagggtaat gtcatctggg ataacagggt aatgtcatct agggataaca   7860
gggtatgtca tctgggataa cagggtaatg tatcttgtat ctagggataa cagggtaatt   7920
```

```
atcagctcac tcaaaggcgg taatacggtt atccacagaa tcaggggata acgcaggaaa   7980
gaacatgtga gcaaaaggcc agcaaaaggc caggaaccgt aaaaaggccg cgttgctggc   8040
gttatggaat agactggatg gaggcggata aagttgcagg accacttctg cgctcggccc   8100
ttccggctgc tggtttatt gctgataaat ctggagccgg tgagcgtggg tctcgcggta   8160
tcattgcagc actggggcca gatggtaagc cctcccgtat cgtagttatc tacacgacgg   8220
ggagtcaggc aactatggat gaacgaaata gacagatcgc tgagataggt gcctcactga   8280
ttaagcattg gtaactgtca gaccaagttt actcatatat actttagatt gatttaaaac   8340
ttcattttta atttaaaagg atctaggtga agatccttt tgataatctc atgaccaaaa    8400
tcccttaacg tgagttttcg ttccactgag cgtcagacc cttaataaga tgatcttctt   8460
gagatcgttt tggtctgcgc gtaatctctt gctctgaaaa cgaaaaaacc gccttgcagg   8520
gcggttttc gaaggttctc tgagctacca actctttgaa ccgaggtaac tggcttggag   8580
gagcgcagtc accaaaactt gtcctttcag tttagcctta accggcgcat gacttcaaga   8640
ctaactcctc taaatcaatt accagtggct gctgccagtg gtgcttttgc atgtctttcc   8700
gggttggact caagacgata gttaccggat aaggcgcagc ggtcggactg aacgggggt    8760
tcgtgcatac agtccagctt ggagcgaact gcctacccgg aactgagtgt caggcgtgga   8820
atgagacaaa cgcggccata acagcggaat gacaccggta aaccgaaagg caggaacagg   8880
agagcgcacg agggagccgc caggggaaac gcctggtatc tttatagtcc tgtcgggttt   8940
cgccaccact gatttgagcg tcagatttcg tgatgcttgt caggggggcg gagcctatgg   9000
aaaaacggct ttgccgcggc cctctcactt ccctgttaag tatcttcctg gcatcttcca   9060
ggaaatctcc gccccgttcg taagccattt ccgtcgccg cagtcgaacg accgagcgta    9120
gcgagtcagt gagcgaggaa gcggaatata tcctgtatca catattctgc tgacgcaccg   9180
gtgcagccgtt ttttcctg ccacatgaag cacttcactg acaccctcat cagtgccaac    9240
atagtaagcc agtatacact ccgctagcgc tgaggtctgc ctcgtgaaga aggtgttgct   9300
gactcatacc aggcctgaat cgccccatca tccagccaga aagtgaggga gccacggttg   9360
atgagagctt tgttgtaggt ggaccagttg gtgattttga acttttgctt tgccacggaa   9420
cggtctgcgt tgtcgggaag atgcgtgatc tgatccttca actcagcaaa agttcgattt   9480
attcaacaaa gccacgttgt gtctcaaaat ctctgatgtt acattgcaca agataaaaat   9540
atatcatcat gaacaataaa actgtctgct tacataaaca gtaatacaag gggtgttgaa   9600
gatcctttga gcggccgctc ttttctacgg ggtctgacgc tcagtggaac gaaaactcac   9660
gttaagggat tttggtcatg agattatcaa aaaggatctt cacctagctc cttttaaatt   9720
aaaaatgaag ttttaaatca atctaaagta tatatgagta aacttggtct gacagttacc   9780
aatgcttaat cagtgaggca cctatctcag cgatctgtct atttcgttca tccatagttg   9840
cctgactccc cgtcgtgtag ataactacga tacgggaggg cttaccatct ggccccagtg   9900
ctgcaatgat accgcgagac ccacgctcac cggctccaga tttatcagca ataaaccagc   9960
cagccggaag ggccgagcgc agaagtggtc ctgcaacttt atccgcctcc atccagtcta  10020
ttaattgttg ccgggaagct agagtaagta gttcgccagt taatagtttg cgcaacgttg  10080
ttgccattgc tacaggcatc gtggtgtcac gctcgtcgtt tggtatggct tcattcagct  10140
ccggttccca acgatcaagg cgagttacat gatcccccat gttgtgcaaa aaagcggtta  10200
gctccttcgg tcctccgatc gttgtcagaa gtaagttggc cgcagtgtta tcactcatga  10260
ttatggcagc actgcataat tctcttactg tcatgccatc cgtaagatgc ttttctgtga  10320
ctggtgagta ctcaaccaag tcattctgag aatagtgtat gcggcgaccg agttgctctt  10380
gcccggcgtc aatacgggat aataccgcgc cacatagcag aactttaaaa gtgctcatca  10440
ttggaaaacg ttcttcgggg cgaaaactct caaggatctt accgctgttg agatccagtt  10500
cgatgtaacc cactcgtgca cccaactgat cttcagcatc ttttactttc accagcgttt  10560
ctgggtgagc aaaaacagga aggcaaaatg ccgcaaaaaa gggaataagg gcgacacgga  10620
aatgttgaat actcatactc ttcctttttc aatattattg aagcatttat cagggttatt  10680
gtctcatgag cggatacata tttgaatgta tttagaaaaa taaacaaata ggggttccgc  10740
gcacatttcc ccgaaaagtg ccacctgacg tctaagaaac cattattatc atgacattaa  10800
cctataaaaa taggcgtatc acgaggccct tcgtc                             10836

SEQ ID NO: 18         moltype = DNA    length = 78
FEATURE               Location/Qualifiers
source                1..78
                      mol_type = other DNA
                      organism = synthetic construct
SEQUENCE: 18
gacaccatcg aatggtgcaa aacctttcgc ggtatggcat gatagcgccc ggaagagagt   60
caattcaggg tggtgaat                                                 78

SEQ ID NO: 19         moltype = DNA    length = 960
FEATURE               Location/Qualifiers
source                1..960
                      mol_type = other DNA
                      organism = synthetic construct
SEQUENCE: 19
atggcggagc tgaattacat tcccaaccgc gtggcacaac aactggcggg caaacagtcg   60
ttgctgattg gcgttgccac ctccagtctg gccctgcacg cgccgtcgca aattgtcgcg  120
gcgattaaat ctcgcgccga tcaactgggt gccagcgtgg tggtgtcgat ggtagaacga  180
agcggcgtcg aagcctgtaa agcggcggtg cacaatctcc tcgcgcaacg cgtcagtggg  240
ctgatcatta actatccgct ggatgaccag gatgccattg ctgtggaagc tgcctgcact  300
aatgttccgg cgttatttct tgatgtctct gaccagacac ccatcaacag tattattttc  360
tcccatgaag acggtacgcg actgggcgtg gagcatctgg tcgcattggg tcaccagcaa  420
atcgcgctgt tagcgggccc attaagttct gtctcggcgc gtctgcgtct ggctggctgg  480
cataaatatc tcactcgcaa tcaaattcag ccgatagcgg aacgggaagg cgactggagt  540
gccatgtccg gttttcaaca aaccatgcaa atgctgaatg agggcatcgt tcccactgcg  600
atgctggttg ccaacgatca gatggcgctg ggcgcaatgc gcgccattac gagtccgggg  660
ctgcgcgttg gtgcggatat ttcggtagtg ggatacgacg ataccgaaga cagctcatgt  720
tatatcccgc cgttaaccac catcaaacag gattttcgcc tgctggggca aaccagcgtg  780
gaccgcttgc tgcaactctc tcagggccag gcggtgaagg gcaatcagct gttgcccgtc  840
```

```
tcactggtga aaagaaaaac caccctggcg cccaatacgc aaaccgcctc tccccgcgcg    900
ttggccgatt cattaatgca gctggcacga caggtttccc gactggaaag cgggcagtga    960

SEQ ID NO: 20           moltype = DNA   length = 879
FEATURE                 Location/Qualifiers
source                  1..879
                        mol_type = other DNA
                        organism = synthetic construct
SEQUENCE: 20
atggctgaag cgcaaaatga tccccctgctg ccgggatact cgtttaatgc ccatctggtg    60
gcgggtttaa cgccgattga ggccaacggt tatctcgatt tttttatcga ccgaccgctg   120
ggaatgaaag gttatattct caatctcacc attcgcggtc aggggtggt gaaaaatcag    180
ggacgagaat ttgtttgccg accgggtgat attttgctgt tcccgccagg agagattcat   240
cactacggtc gtcatccgga ggctcgcgaa tggtatcacc agtgggttta ctttcgtccg   300
cgcgcctact ggcatgaatg gcttaactgg ccgtcaatat ttgccaatac ggggttcttt   360
cgcccggatg aagcgcacca gccgcatttc agcgacctgt ttgggcaaat cattaacgcc   420
gggcaagggg aagggcgcta tcggagctg ctggcgataa atctgcttga gcaattgtta    480
ctgcggcgca tggaagcgat taacgagtcg ctccatccac cgatggataa tcgggtacgc   540
gaggcttgtc agtacatcag cgatcacctg gcagacagca attttgatat cgccagcgtc   600
gcacagcatg tttgcttgtc gccgtcgcgt ctgtcacatc ttttccgcca gcagttaggg   660
attagcgtct taagctggcg cgaggaccaa cgtatcagcc aggcgaagct gcttttgagc   720
accaccggga tgcctatcgc caccgtcggt cgcaatgttg gttttgacga tcaactctat   780
ttctcgcggg tatttaaaaa atgcaccggg gccagcccga gcgagttccg tgccggttgt   840
gaagaaaaag tgaatgatgt agccgtcaag ttgtcataa                          879

SEQ ID NO: 21           moltype = DNA   length = 241
FEATURE                 Location/Qualifiers
source                  1..241
                        mol_type = other DNA
                        organism = synthetic construct
SEQUENCE: 21
gcgcaacgca attaatgtaa gttagctcac tcattaggca caattctcat gtttgacagc    60
ttatcatcga ctgcacggtg caccaatgct tctggcgtca ggcagccatc ggaagctgtg   120
gtatggctgt gcaggtcgta aatcactgca taattcgtgt cgctcaaggc gcactcccgt   180
tctggataat gttttttgcg ccgacatcat aacggttctg caaatattc tgaaatgagc    240
t                                                                    241

SEQ ID NO: 22           moltype = DNA   length = 31
FEATURE                 Location/Qualifiers
source                  1..31
                        mol_type = other DNA
                        organism = synthetic construct
SEQUENCE: 22
tttacactt atgcttccgg ctcgtatgtt g                                     31

SEQ ID NO: 23           moltype = DNA   length = 1818
FEATURE                 Location/Qualifiers
source                  1..1818
                        mol_type = other DNA
                        organism = synthetic construct
SEQUENCE: 23
gtggacacgt acgcgggtgc ttacgaccgt cagtcgcgcg agcgcgagaa ttcgagcgca     60
gcaagcccag cgacacagcg tagcgccaac gaagacaagg cggccgacct tcagcgcgaa   120
gtcgagcgcg acggggccg gttcaggttc gtcgggcatt tcagcgaagc gccgggcacg   180
tcggcgttcg ggacggcgga gcgcccggag ttcgaacgca tcctgaacga atgccgagcn   240
gggcggctca acatgatcat tgtctatgac gtgtcgcgct tctcgcgcct gaaggtcatg   300
gacgcgattc cgattgtctc ggaattgctc gccctgggcg tgacgattgt ttccactcag   360
gaaggcgtct tccggcaggg aaacgtcatg gacctgattc acctgattat gcggctcgac   420
gcgtcgcaca aagaatcttc gctgaagtcg gcgaagattc tcgacacgaa gaaccttcaa   480
cgcgaattgg gcgggtacgt cggcgggaag gcgccttacg gcttcgagct tgtttccgag   540
acgaaggaga tcacgcgcaa cggccgaatg gtcaatgtcg tcatcaacaa gcttgcgcac   600
tcgaccactc cccttaccgg accttcgag ttcgagcccg acgtaatccg gtggtggtgg    660
cgtgagatca agacgcacaa acaccttccc ttcaagccgg gcagtcaagc cgccattcac   720
ccgggcagca tcacggggct ttgtaagcgc atggacgctg acgccgtgcc gaccggggc    780
gagacgattg gaagaagac cgcttcaagc gcctgggacc cggcaaccgt tatgcgaatc   840
cttcgggacc cgcgtattgc gggcttcgcc gctgaggtga tctacaagaa gaagccggac   900
ggcacgccga ccacgaagat tgagggttac cgcattcagc gcgacccgat cacgctccgg   960
ccggtcgagc ttgattgcgg accgatcatc gagcccgctg agtggtatga gcttcaggcg  1020
tggttgaca caggggggcg cggcaagggg ctttcccggg ggcaagccat tctgtccgcc  1080
atggacaagc tgtactgcga gtgtggcgcc gtcatgactt cgaagcgcgg ggaagaatcg  1140
atcaaggact cttaccgctg ccgtcgccgg aaggtggtcg accgtccgc acctgggcag  1200
cacgaaggca cgtgcaacgt cagcatggcg gcactcgaca agttcgttgc ggaacgcatc  1260
ttcaacaaga tcaggcacgc cgaaggcgac gaagagacgt ggcgcttcct gtgggaagcc  1320
gccccgacgct tcggcaagct cactgaggcg cggcggaacg ggcgaacctt  1380
gttgcggagc gcgccgacgc cctgaacgcc cttgaagagc tgtacgaaga ccgcgcggca  1440
ggcgcgtacg acgacccgt tggcaggaag cacttccgga agcaacaggc agcgctgacg  1500
ctccggcagc aaggggcgga agagcggctt gccgaacttg aagccgccga agccccgaag  1560
cttccccttg accaatggtt ccccgaagac gccgacgctg acccgaccgg ccctaagtcg  1620
tggtgggggc gcgcgtcagt agacgacaag cgcgtgttcg tcgggctctt cgtagacaag  1680
```

```
atcgttgtca cgaagtcgac tacgggcagg gggcagggaa cgcccatcga gaagcgcgct    1740
tcgatcacgt gggcgaagcc gccgaccgac gacgacgaag acgacgccca ggacggcacg    1800
gaagacgtag cggcgtag                                                  1818

SEQ ID NO: 24           moltype = DNA  length = 969
FEATURE                 Location/Qualifiers
source                  1..969
                        mol_type = other DNA
                        organism = synthetic construct
SEQUENCE: 24
atgaacaatt tgcatgacat gtctaaggcg actcgcatat ctgttgaaac acttcggttg    60
ttaatctata cagctgattt tcgctatagg atctacactg tagaaaagaa aggcccagag    120
aagagaatga gaaccattta ccaaccttct cgagaactta aagccttaca aggatgggtt    180
ctacgtaaca ttttagataa actgtcgtca tctccttttt ctattggatt tgaaaagcaa    240
caatctattt tgaataatgc taccccgcat attggggcaa actttatact gaatattgat    300
ttggaggatt ttttcccaag tttaactgct aacaaagttt tggagtgtt ccattctctt    360
ggttataatc gactaatatc ttcagttttg acaaaaaat gttgttataa aaatctgcta    420
ccacaaggtg ctccatcatc acctaaatta gctaatctaa tatgttctaa acttgattat    480
cgtattcagg gttatgcagg tagtcggggc ttgatatata cgagatatgc cgatgatctc    540
acctatctg cacagtctat gaaaaaggtt gttaaagcac gtgatttttt attttctata    600
atcccaagtg aaggattggt tattaactca aaaaaaactt gtattagtgg gcctcgtagt    660
cagaggaaag ttacaggttt agttatttca caagagaaaa ttgggataag tagagaaaaa    720
tataaagaaa ttagagcaaa gatacatcat atatttgcg gtaagtcttc tgagataaga    780
cacgttaggg gatggttgtc atttatttta agtgtggatt caaaaagcca taggagatta    840
ataacttata ttagcaaatt agaaaaaaaa tatggaagaa acccttaaaa taagcgaag    900
acctaatggt cttcgtttta aaactaaagc tcataggttg aaaaattgag cacttcttcg    960
tccaactga                                                            969

SEQ ID NO: 25           moltype = DNA  length = 72
FEATURE                 Location/Qualifiers
source                  1..72
                        mol_type = other DNA
                        organism = synthetic construct
SEQUENCE: 25
caaataaaac gaaaggctca gtcgaaagac tgggcctttc gttttatctg ttgtttgtcg    60
gtgaacgctc tc                                                        72

SEQ ID NO: 26           moltype = DNA  length = 285
FEATURE                 Location/Qualifiers
source                  1..285
                        mol_type = other DNA
                        organism = synthetic construct
SEQUENCE: 26
aagaaaccaa ttgtccatat tgcatcagac attgccgtca ctgcgtcttt tactggctct    60
tctcgctaac caaaccggta accccgctta taaaagcat tctgtaacaa agcgggacca    120
aagccatgac aaaaacgcgt aacaaaagtg tctataatca cggcagaaaa gtccacattg    180
attatttgca cggcgtcaca cttttgctatg ccatagcatt tttatccata agattagcgg    240
atcctacctg acgcttttta tcgcaactct ctactgtttc tccat                    285

SEQ ID NO: 27           moltype = DNA  length = 708
FEATURE                 Location/Qualifiers
source                  1..708
                        mol_type = other DNA
                        organism = synthetic construct
SEQUENCE: 27
atgaaaaaca ttaaaaaaaa ccaggtgatg aacctgggcc cgaacagcaa actgctgaaa    60
gaatataaaa gccagctgat tgaactgaac attgaacagt ttgaagcggg cattggcctg    120
attctgggcg atgcgtatat tcgcagccgc gatgaaggca aaacctattg catgcagttt    180
gaatggaaaa acaaagcgta tatggatcat gtgtgcctgc tgtatgatca gtgggtgctg    240
agcccgccgc ataaaaaaga acgcgtgaac catctggatg acctggtgat tacctggggc    300
gcgcagacct ttaaacatca ggcgtttaac aaactggcga acctgtttat tgtgaacaac    360
aaaaaaaacca ttccgaacaa cctggtgaaa aactatctga ccccgatgag cctggcgtat    420
tggtttatgg atgatggcgg caaatgggat tataacaaaa acagcaccaa caaaagcatt    480
gtgctgaaca cccagagctt tacctttgaa gaagtgaat atctggtgaa aggcctgcgc    540
aacaaattc agctgaactg ctatgtgaaa attaacaaaa acaaaccgat tatttatatt    600
gatagcatga gctatctgat tttttataac ctgattaaac cgtatctgat tccgcagatg    660
atgtataaac tgccgaacac cattagcagc gaaacctttc tgaaatga                 708

SEQ ID NO: 28           moltype = DNA  length = 48
FEATURE                 Location/Qualifiers
source                  1..48
                        mol_type = other DNA
                        organism = synthetic construct
SEQUENCE: 28
ctagcataac cccttggggc ctctaaacgg gtcttgaggg gttttttg                  48

SEQ ID NO: 29           moltype = DNA  length = 94
FEATURE                 Location/Qualifiers
source                  1..94
```

```
                                mol_type = other DNA
                                organism = synthetic construct
SEQUENCE: 29
tgattcggtg gcaatcctga gtgacgcagc agataagtag gtatccgttt gaaaaacttt     60
tctgaccgtc cgactataga cacggtggct tagt                                 94

SEQ ID NO: 30           moltype = DNA  length = 25
FEATURE                 Location/Qualifiers
source                  1..25
                        mol_type = other DNA
                        organism = synthetic construct
SEQUENCE: 30
gttcagcttt cttgtacaaa gttgg                                           25

SEQ ID NO: 31           moltype = DNA  length = 25
FEATURE                 Location/Qualifiers
source                  1..25
                        mol_type = other DNA
                        organism = synthetic construct
SEQUENCE: 31
ggttgaaaca tgttttttcg acttg                                           25

SEQ ID NO: 32           moltype = DNA  length = 25
FEATURE                 Location/Qualifiers
source                  1..25
                        mol_type = other DNA
                        organism = synthetic construct
SEQUENCE: 32
acccagcttt cttgtacaaa gttgg                                           25

SEQ ID NO: 33           moltype = DNA  length = 25
FEATURE                 Location/Qualifiers
source                  1..25
                        mol_type = other DNA
                        organism = synthetic construct
SEQUENCE: 33
ggttgaaagt acaaaaaagc aggct                                           25

SEQ ID NO: 34           moltype = DNA  length = 25
FEATURE                 Location/Qualifiers
source                  1..25
                        mol_type = other DNA
                        organism = synthetic construct
SEQUENCE: 34
gttcagcttt cttgtacaaa gtggt                                           25

SEQ ID NO: 35           moltype = DNA  length = 16
FEATURE                 Location/Qualifiers
source                  1..16
                        mol_type = other DNA
                        organism = synthetic construct
SEQUENCE: 35
taatcgtatt tataat                                                     16

SEQ ID NO: 36           moltype = DNA  length = 25
FEATURE                 Location/Qualifiers
source                  1..25
                        mol_type = other DNA
                        organism = synthetic construct
SEQUENCE: 36
caagtcgaaa aaacatgaaa cttgt                                           25

SEQ ID NO: 37           moltype = DNA  length = 16
FEATURE                 Location/Qualifiers
source                  1..16
                        mol_type = other DNA
                        organism = synthetic construct
SEQUENCE: 37
taatatttat gctaat                                                     16

SEQ ID NO: 38           moltype = DNA  length = 21
FEATURE                 Location/Qualifiers
source                  1..21
                        mol_type = other DNA
                        organism = synthetic construct
SEQUENCE: 38
tttccacacc aaccggtagg c                                               21

SEQ ID NO: 39           moltype = DNA  length = 21
```

```
FEATURE             Location/Qualifiers
source              1..21
                    mol_type = other DNA
                    organism = synthetic construct
SEQUENCE: 39
gccggcgtac aggtcactaa t                                                    21

SEQ ID NO: 40       moltype = DNA  length = 21
FEATURE             Location/Qualifiers
source              1..21
                    mol_type = other DNA
                    organism = synthetic construct
SEQUENCE: 40
aaaggtgtgg ttggccatcc g                                                    21

SEQ ID NO: 41       moltype = DNA  length = 17
FEATURE             Location/Qualifiers
source              1..17
                    mol_type = other DNA
                    organism = synthetic construct
SEQUENCE: 41
gtcagcaacc aaccggt                                                         17

SEQ ID NO: 42       moltype = DNA  length = 23
FEATURE             Location/Qualifiers
source              1..23
                    mol_type = other DNA
                    organism = synthetic construct
SEQUENCE: 42
tggagttccg cgttacataa ctt                                                  23

SEQ ID NO: 43       moltype = DNA  length = 21
FEATURE             Location/Qualifiers
source              1..21
                    mol_type = other DNA
                    organism = synthetic construct
SEQUENCE: 43
agactgcagg ctctagattc g                                                    21
```